US005757983A

United States Patent [19]

Kawaguchi et al.

[11] Patent Number: 5,757,983

[45] Date of Patent: May 26, 1998

[54] DOCUMENT RETRIEVAL METHOD AND SYSTEM

[75] Inventors: Hisamitsu Kawaguchi; Mitsuru Akizawa, both of Hachioji; Kanji Kato, Tokorozawa; Atsushi Hatakeyama, Kokubunji; Hiromichi Fujisawa, Tokorozawa, all of Japan

[73] Assignee: Hitachi, Ltd., Tokyo, Japan

[21] Appl. No.: 517,722

[22] Filed: Aug. 21, 1995

Related U.S. Application Data

[63] Continuation of Ser. No. 855,090, Mar. 20, 1992, abandoned, which is a continuation-in-part of Ser. No. 555,483, Aug. 9, 1990, Pat. No. 5,168,533.

[30] Foreign Application Priority Data

Mar. 20, 1991 [JP] Japan .................................... 3-080547

[51] Int. Cl.$^{6}$ ................................ G06K 9/54; G06K 9/60

[52] U.S. Cl. ........................... 382/305; 382/218; 382/229

[58] Field of Search .................................... 382/305, 306, 382/229, 218, 224, 226, 227, 228; 364/419.19, 419.13, 419.07

[56] References Cited

U.S. PATENT DOCUMENTS

| | | | |
|---|---|---|---|
| 2,506,949 | 4/1950 | Cochran et al. | 395/600 |
| 4,450,520 | 5/1984 | Hollaar et al. | 364/200 |
| 4,516,166 | 5/1985 | Tellone | 360/72.1 |
| 4,591,974 | 5/1986 | Dornbush et al. | 364/200 |
| 4,870,568 | 9/1989 | Kahle et al. | 364/200 |

FOREIGN PATENT DOCUMENTS

| | | |
|---|---|---|
| A-0 266 586 | 5/1988 | European Pat. Off. . |
| 0 437 615 A1 | 7/1991 | European Pat. Off. . |
| 63 198124 | 8/1988 | Japan . |
| WO 90/16036 | 2/1990 | WIPO . |

OTHER PUBLICATIONS

"An Intelligent System for Document Retrieval in Distributed Office Environments", by U. Mukhopadhyay et al, Journal of the American Society for Information Science, vol. 37, No. 3, May 1986, pp. 123–135.

"Synchronized Disk Interleaving", by M. Y. Kim, IEEE Transactions on Computers, vol. C–35, No. 11, Nov. 1986, pp. 978–988.

"APS Text Search and Retrieval Classroom Manual," USPTO , Jun. 1989, pp. 1.1–4.28.

Yokosawa Kazuhiko, "Human-Based Character String Image Retrieval from Textual Images", Nov. 1989, pp. 1068–1069.

*Primary Examiner*—Leo Boudreau
*Assistant Examiner*—Phuoc Tran
*Attorney, Agent, or Firm*—Antonelli, Terry, Stout, & Kraus, LLP

[57] ABSTRACT

A document retrieval method and system for retrieving, from a document database storing document data in the form of character codes, a document which contains given search terms and which meets a given search query condition. From documents loaded from the document database, a document containing terms which match the search terms is searched to generate document identification (ID) information including a document identifier of the searched document and containing match terms found to match with the search terms as well as term identifiers of the match terms and position information of the match terms in the searched document. A decision is then made as to whether or not the position information of the match terms satisfies a positional condition specified in the search query condition concerning a positional relation between the search terms, and match information is then generated indicating satisfaction of the search query condition when the positional condition is satisfied. Through a proximity condition decision, it is ascertained whether the match terms satisfy an inter-term distance condition specified in the search query condition. Through a contextual condition decision, it is determined whether the match terms satisfy a concurrence condition specifying concurrence of the search terms in a same subsentence, a same sentence or a same paragraph. Through a logical condition, it is decided whether the match terms satisfy a logical condition between the search terms specified in the search query condition.

39 Claims, 43 Drawing Sheets

FIG. 2A

SEARCH TERM 1 : “文書”
SEARCH TERM 2 : “検索
① DOCUMENT EXAMPLE #1
DOCUMENT CONTENT : 文書の内容を読んで検索する。………………

7 CHARACTER

FIG. 2B

SEARCH TERM 1 : “文書”
SEARCH TERM 2 : “検索
② DOCUMENT EXAMPLE #2
DOCUMENT CONTENT : 文書の内容を理解して検索を行う。…………

8 CHARACTER

FIG. 2C

SEARCH TERM 1 : “文書”
SEARCH TERM 2 : “検索
③ DOCUMENT EXAMPLE #3
DOCUMENT CONTENT : 検索の結果に基づいて該当文書の内容を表示する。…

10 CHARACTER

FIG. 2D

SEARCH TERM 1 : “文書”
SEARCH TERM 2 : “検索
④ DOCUMENT EXAMPLE #4
DOCUMENT CONTENT : 文書の理論的な構造を意識した検索を行う。………

12 CHARACTER

⟨MATCH RESULT INFORMATION OF SEARCH TERMS⟩

| TEXT: | "……文章理解を用いた検索システムである。……" |
|---|---|

CHARACTER POSITION: 0　30 31 32 33 34 35 36 37 38 39 40 41 42 43 44 45 46 47 48

SEARCH TERM "文書":
(MATCH TERM IDENTIFIER =T1)

MATCH RESULT INFORMATION
(T1, 31, 32)

<CONCEPT OF PROXIMITY CONDITION DECISION>

<CONCEPT OF LOGICAL CONDITION DECISION>

< DOCUMENT IDENTIFIER DETECTING CIRCUIT >

F I G. 12
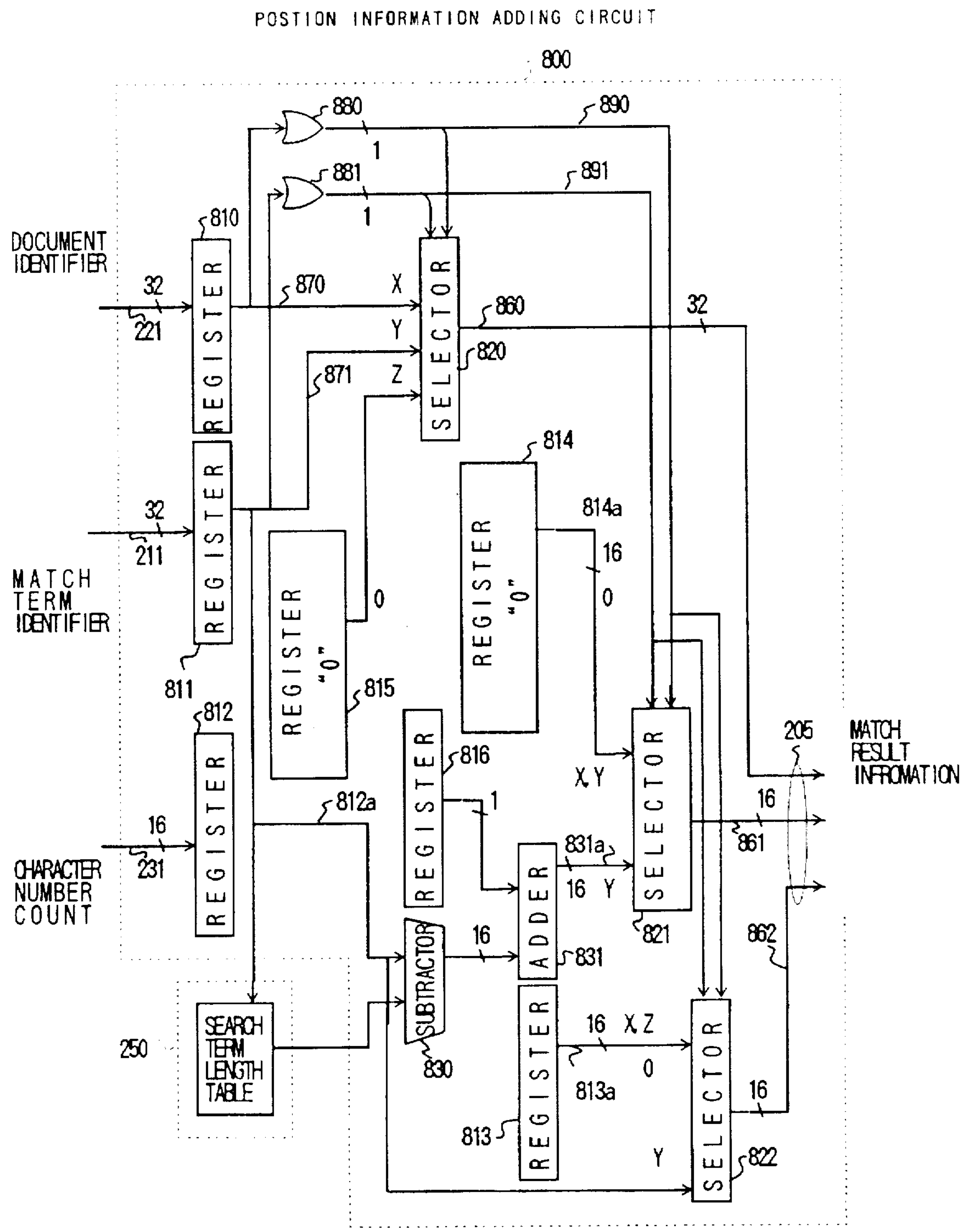

F I G. 1 3
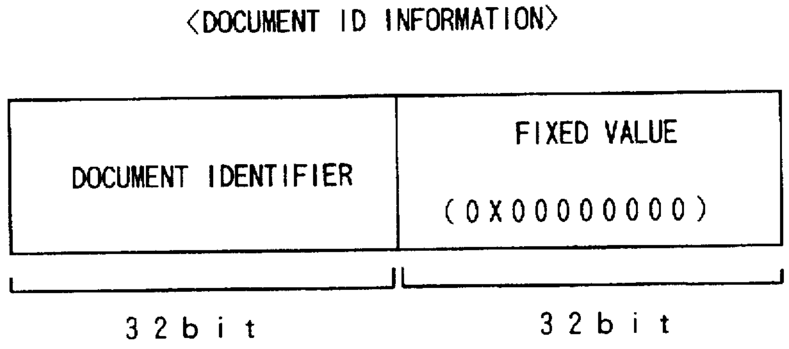
F I G. 1 4
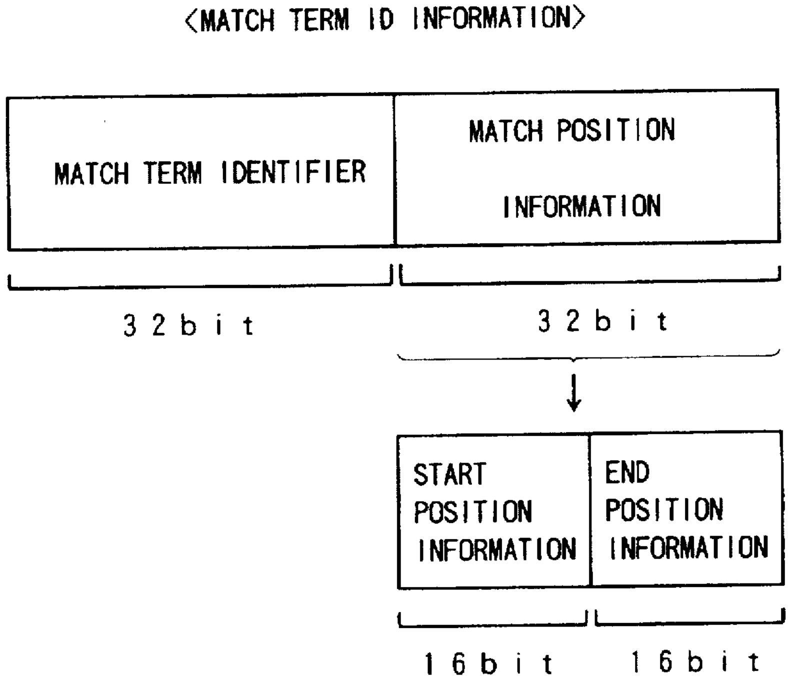

<PROXIMITY CONDITION DECISION PROCESSING PROCEDURE>

<PROCESSING STEPS OF PROXIMITY CONDITION (FIRST PART)>

<CONTEXTUAL CONDITION>

<CONTEXTUAL CONDITION DECISION PROCESSING PROCEDURE>

F I G. 2 2 A
<CONTEXTUAL CONDITION PROCESSING STEPS (FIRST PART)>
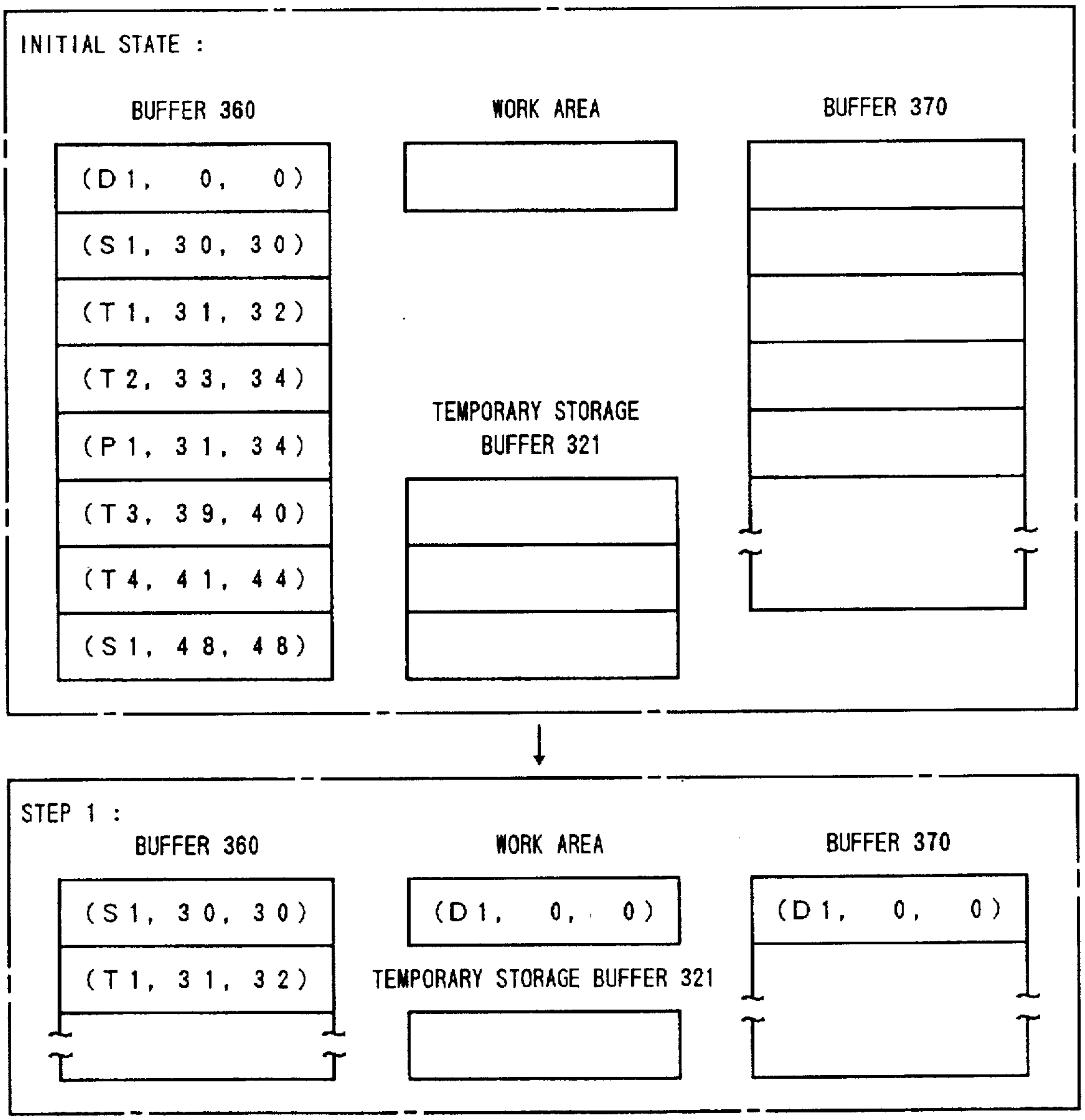

<CONTEXTUAL CONDITION PROCESSING STEPS (SECOND PART)>

<CONTEXTUAL CONDITION PROCESSING STEP (THIRD PART)>

STRUCTURE OF WORD NUMBER COUNT CIRCUIT

FIG. 27C

<STRUCTURE OF DELIMITER TABLE>

231a

| ADDRESS | DELIMITER FLAG |
|---|---|
| 0 | 1 |
| 1 | 1 |
| ⋮ | ⋮ |
| 22 ( " ) | 1 |
| 23 ( # ) | 0 |
| ⋮ | ⋮ |
| 26 ( & ) | 0 |
| 27 ( ' ) | 1 |
| 28 ( ( ) | 1 |
| 29 ( ) ) | 1 |
| 2A ( * ) | 0 |
| 2B ( + ) | 0 |
| 2C ( , ) | 1 |
| 2D ( − ) | 0 |
| 2E ( . ) | 1 |
| 2F ( / ) | 1 |
| 30 ( 0 ) | 0 |
| ⋮ | ⋮ |
| 39 ( 9 ) | 0 |
| 3A ( : ) | 1 |
| ⋮ | ⋮ |
| 3F ( ? ) | 1 |
| 40 ( @ ) | 0 |
| ⋮ | ⋮ |
| 5A ( Z ) | 0 |
| 5B ( [ ) | 1 |
| 5C ( \ ) | 0 |
| 5D ( ] ) | 1 |
| 5E ( ^ ) | 0 |
| 5F ( _ ) | 0 |
| 60 ( ` ) | 1 |
| 61 ( a ) | 0 |
| ⋮ | ⋮ |
| 7A ( z ) | 0 |
| 7B ( { ) | 1 |
| ⋮ | ⋮ |
| FF | 0 |

FIG. 28C

| COMPOUND CONDITION FLAG | | | SELECT SIGNAL FOR MULTIPLEXER CHANGE-OVER CIRCUIT 393 | SELECT SIGNAL FOR MULTIPLEXER CHANGE-OVER CIRCUIT 394 | SELECT SIGNAL FOR MULTIPLEXER CHANGE-OVER CIRCUIT 395 | QUERY CONDITIONS |
|---|---|---|---|---|---|---|
| $2^2$ | $2^1$ | $2^0$ | | | | |
| 0 | 0 | 0 | d 1 | — | — | NONE |
| 0 | 0 | 1 | a 1 | — | — | ONLY LOGICAL CONDITIONS |
| 0 | 1 | 0 | b 1 | — | b 3 | ONLY CONTEXTUAL CONDITIONS |
| 0 | 1 | 1 | b 1 | — | a 3 | CONTEXTUAL AND LOGICAL CONDITIONS |
| 1 | 0 | 0 | c 1 | c 2 | — | ONLY PROXIMITY CONDITIONS |
| 1 | 0 | 1 | c 1 | b 2 | — | PROXIMITY AND LOGICAL CONDITIONS |
| 1 | 1 | 0 | c 1 | a 2 | b 3 | PROXIMITY AND CONTEXTUAL CONDITIONS |
| 1 | 1 | 1 | c 1 | a 2 | a 3 | PROXIMITY, CONTEXTUAL AND LOGICAL CONDITIONS |
| 1 | 1 | 1 | c 1 | a 2 | a 3 | DOCUMENT ID INFORMATION |

F I G. 3 1
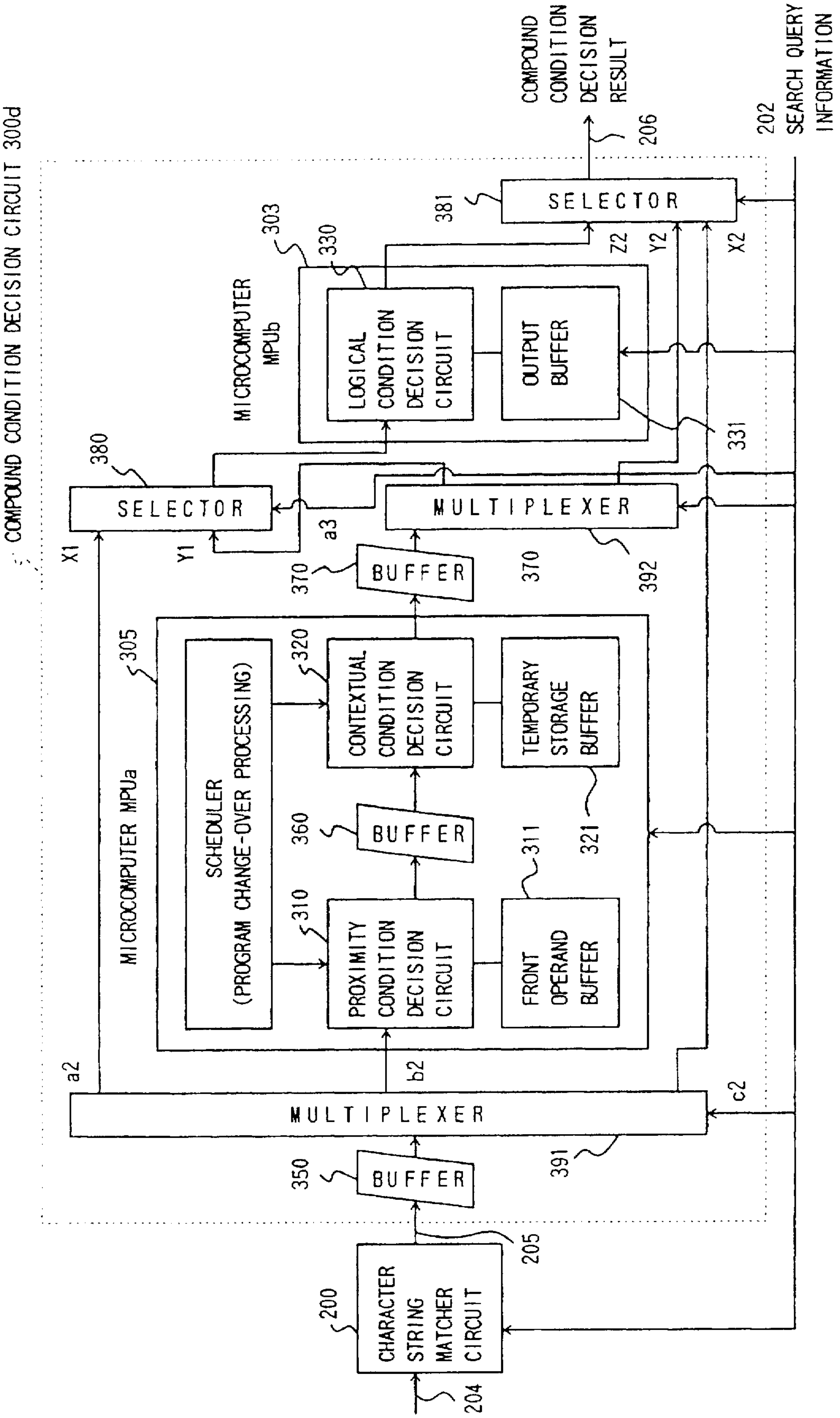

DOCUMENT RETRIEVAL METHOD AND SYSTEM

CROSS REFERENCE

This application is a continuation application of Ser. No. 07/855,090, filed Mar. 20, 1992, now abandoned, which is a continuation in-part application of our U.S. application Ser. No. 555,483, filed Aug. 9, 1990 (PCT JP 90/00774, filed Jun. 14, 1990), now U.S. Pat. No. 5,168,533, the disclosure of which is hereby incorporated by reference.

BACKGROUND OF THE INVENTION

The present invention relates generally to an information processing system and particularly to a full text search or full document retrieval in an information retrieval system. In particular, the present invention is concerned with a text or document search and retrieval method and system which are capable of executing a compound (or complex) condition decision processing such as proximity condition decision, contextual condition decision and logical condition decision processings at a high speed and which can probitably find application in the search or retrieval of texts or documents (hereinafter collectively referred to as the documents) from document databases, word processors, document filing systems and others.

In recent years, there has arisen an increasing importance on a large scale database service for making available not only the secondary information (bibliographic information), exemplified by document information and patent information, but also the primary information (original or textual information). In the database search system known heretofore, document search or retrieval has been performed with the aid of auxiliary information such as keywords, classification codes and the like which are controlled in a thesaurus. However, such a document retrieval system suffers from a serious limitation with regard to the document screening or filtering capability. As a matter of fact, the number of documents retrieved as a result of the search will amount to several tens or even several hundreds. Consequently, in order to find the target document, a searcher must read the documents resulting from the document retrieval to check the contents thereof in the final stage. This is, of course, a great disadvantage in terms of efficiency and economy. Besides, since the classification system itself changes in the course of time lapse, the keywords and the classification codes have to be updated from time to time, presenting a problem. Furthermore, because the keyword assignment or index preparation takes a lot of time, new documents are usually registered en bloc in a large number through a batch processing. Consequently, availability of registered information through the document retrieval is always accompanied with more or less time lag, incurring another problem.

As one of the measures for tackling the problems mentioned above, there can be mentioned a full text search system or a full document search system, in other words, which makes it possible for the searcher to retrieve a target document by consulting directly the texts thereof with the aid of search terms which can arbitrarily be designated or selected by the searcher.

In reality, there have been proposed several document retrieval systems for realizing the full text search or full document search, a typical one of which is disclosed in Lee A. Hollaar: "Text Retrieval Computer", March 1979. This known text retrieval system is shown in FIG. 1 of the accompanying drawings and described below.

Referring to the figure, the document retrieval system generally denoted by a numeral 1 includes a search control unit 101 which is in charge of control of the whole system and communication with a host computer. More specifically, the search control unit 101 analyzes a search request query received from the host computer to supply the information resulting from the analysis to a character string matcher 200 and a compound condition decision unit 300 as search query information 202. Further, the search control unit 101 controls a storage control circuit 104 to allow the document data 204 stored in a character string storage 105 to be read out to the character string matcher 200.

The character string matcher 200 checks the document data 204 for determining character strings which coincide or match with the search terms specified in the search query. When relevant character strings are found, information 205 identifying the detected character strings is output to the compound or complex condition decision unit 300, which then checks the character string identifying information 205 as to whether logical condition such as AND or OR condition and the like specified in the search query are satisfied or not. When the complex or compound condition such as the logical condition mentioned above is satisfied, the identifier information of the relevant document and the contents thereof are sent back to the host computer as retrieval result information 206.

In the literature cited above, there are proposed undermentioned conditions in addition to the logical condition as the search query condition on the assumption that the documents of concern are written in English.

"A.n.B" (1-1)

"<A, B>n" (1-2)

"A AND B IN SENT" (1-3)

The query condition statement (1-1) "A.n.B" commands that such a document be searched in which two search terms "A" and "B" appear in this order and in which the two search terms "A" and "B" are positioned closely to each other within a distance therebetween which corresponds to n or less words.

On the other hand, the query condition statement (1-2) "<A, B>n" means that a document be searched in which two search terms "A" and "B" occur regardless of the order in which these terms appear (i.e. regardless whether the term "A" precedes "B" or vice versa) and in which these search terms are distanced from each other by n or less words.

In this conjunction the search query condition specifying the extent of positional closeness (proximity) between the search terms as exemplified by the statements (1-1) and (1-2) will hereinafter be referred to as the proximity condition.

Finally, the search query condition "A AND B IN SENT" given by the statement (1-3) commands that such a document be searched in which the terms "A" and "B." occur simultaneously in a same sentence in any order.

The query condition specifying the decision as to concurrence of two search terms in a same field or context such as a sentence and a paragraph will hereinafter be referred to as the contextual condition.

As will be apparent from the above, there are proposed as the compound conditions the search query conditions such as the proximity condition, the contextual condition and the like which specify the conjunctional relations between the search terms in respect to the intervening distance and the contextual relation. By adopting these query conditions, the document search can be realized by taking into account the semantical conjunction or relation between the search terms (key words) more specifically when compared to the search relying only on the logical condition, whereby the document screening can be accomplished with a high ratio, assuring an enhanced accuracy of the search result.

It should however be understood that any concrete method for realizing the proximity condition and the contextual condition is not taught in the literature cited above.

In the full text or document search, an enormous amount of time is required, because the document data are directly subjected to the search. Under the circumstances, there has already been proposed character string search dedicated hardware referred to as the term comparator as an approach for realizing the document retrieval with the search terms at a high speed. A specific example of such a term comparator is disclosed, for example, in JP-A-60-105039. The term comparator disclosed in this publication is capable of performing the character string matching or collation at as high a rate as several mega bytes/sec. to several ten mega bytes/sec. However, this known term comparator is imparted with only the function equivalent to that of the character string matcher 200 mentioned previously and is incapable of realizing the decision functions for the compound conditions such as the proximity condition, contextual condition and the logical condition which play important roles in screening or sieving the documents in the retrieval.

It is further noted that the compound condition decision unit 300 of the prior system must be able to perform the decision processing on a large number of terms (hereinafter referred to as the match terms) which result from the character string matching processing at a substantially same high speed as that of the matching speed of the character matcher 200. This is because the search speed of the whole system is lowered when the processing speed of the compound condition decision unit 300 is low, making it impossible to shorten the search time as a whole. For this reason, the compound or complex condition decision unit 300 has to be capable of performing the decision processing for the proximity condition, the contextual condition and the logical condition at a high speed.

SUMMARY OF THE INVENTION

Accordingly, it is an object,,of the present invention to provide a document retrieval method and system which incorporate an improved compound condition decision facility such as the proximity, contextual and logical condition decision facilities and which can realize a specific document retrieval with a high screening ratio particular to the full text search.

Another object of the present invention is to provide an improved compound condition decision method and system which are capable of performing the decision processings on combinations of the proximity condition, contextual condition and/or logical condition at a speed equivalent to that of the character string matcher implemented in the hardware.

In view of the above and other objects which will be apparent as the description of the present invention proceeds, there is provided, according to an aspect of the invention, a document retrieval method which comprises a character string matching step and a compound condition decision step or steps, as described below.

In the character string matching step, when terms coinciding or matching with designated or specified search terms are found in a document, there is output as the match result information a document identifier which serves to identify the document, identifiers of the match terms (i.e. terms for which coincidence with the search terms is found) and start and end character positions of the match terms, wherein when a contextual condition is designated or specified in the search query and when character strings representing a contextual relation given by the contextual condition are found in the document, there are output as the match result information the document identifier, context or field identifying character string identifiers and start and end character positions of the context (field) identifying character strings.

The compound condition decision step comprises a proximity condition decision step, a contextual condition decision step or a logical condition decision step or combination (s) thereof.

In the proximity condition decision step, a decision is made on the basis of the match result information output from the character string matching step as to whether a proximity condition designated in the search query statement in terms of a number of characters intervening between the search terms is satisfied, whereon start and end character positions of the preceding (front) and succeeding (rear) match terms which satisfy the proximity condition of concern are output as match result information representing the result of the decision made by the proximity condition decision step. This match result information is added to the match result information output from the character string matching step.

In the contextual condition decision step, when a proximity condition is specified in the search query statement, the concurrence decision is made on the basis of the match result information output from the proximity condition decision step as to whether the match terms concur in a same sub-sentence, a same sentence or a same paragraph as specified in the search query statement, whereon start and end character positions of preceding and succeeding context or field identifying character strings, respectively, which meet the condition, are output as the match result information, being added to the match result information output from the proximity condition decision step. On the other hand, unless the proximity condition is contained in the search query statement, the concurrence decision is made on the basis of the match result information output from the character string matching step as to whether the match terms concur in a same sub-sentence (such as phrase, clause etc.), a same sentence or a same paragraph as specified in the search query statement, whereon start and end character positions of preceding and succeeding field identifying character strings, respectively, which meet the condition, are output as the information, being added to the match result information output from the character string matching step.

In the logical condition decision step, a logical condition between the search terms as specified in the search query is performed on the basis of the match result information output from the proximity condition decision step when the proximity condition is contained in the search query or on the basis of the match result information output from the contextual condition decision step when both the proximity condition and the contextual condition are-contained in the search query or when the contextual condition is contained in the search query or on the basis of the match result information output from the character string matching step when only the logical condition is specified in the search query statement, whereby the information meeting the logical condition is output, being added to the match result information output from the preceding decision step, as the final or ultimate search result information.

According to another aspect of the present invention, there is provided a document retrieval system which comprises a character string matching unit and a compound condition decision unit which in turn includes a proximity condition decision facility, a contextual condition decision facility and a logical condition decision facility, which are described below.

In the character string matching facility, when terms coinciding or matching with designated or specified search terms are found in a document, there is output as match result information a document identifier identifying the document, identifiers of the match terms (i.e. terms for which coincidence with the search terms is found) as well as start and end character positions of the match terms, wherein when a contextual condition is specified in the search query information and when character strings meeting a contextual relation given by the contextual condition are found in the document, there are output as the match information the document identifier, field identifying character string identifiers as well as start and end character positions of the field identifying character strings.

In the proximity condition decision facility, decision is made on the basis of the match result information output from the character string matching step as to whether a proximity condition designated in the search query statement in terms of a number of characters intervening between the search terms is satisfied, wherein start and end character positions of the front and rear match terms which satisfy the proximity condition of concern are output as the match result information representing the result of the decision made by the proximity condition decision step. This match information is added to the match result information output from the character string matching facility.

In the contextual condition decision facility, the concurrence decision is made on the basis of the match result information output from the proximity condition decision facility as to whether the match terms concur in a same sub-sentence (such as phrase, clause etc.), a same sentence or a same paragraph as specified in the search query statement, whereon start and end character positions of preceding and succeeding field identifying character strings, respectively, which meet the concurrence condition, are output as the match result information, being added to the match information output from the proximity condition decision facility.

In the logical condition decision facility, decision for a logical condition between the match terms as specified in the search query is performed on the basis of the match result information output from the contextual condition decision facility, whereby the match result information meeting the logical condition is output, as the final or ultimate search result information on a document-by-document basis.

As will be appreciated from the above description, since the identifiers of the match terms and the start and end character positions of the match terms in the document are output as the result of the character string matching, when a contextual condition is designated, the identifiers of the field identifying character strings as well as start and end character positions thereof in the document are output as the match result information, the proximity condition decision can be effectuated by checking coincidence of the match term identifiers with the search terms specified in the search query statement, while the inter-character distance condition specified in the search query statement can be decided by checking the match with the start and end character positions of the match terms.

The contextual condition decision is effectuated by detecting coincidence with the match term identifiers obtained through the character string matching and the proximity condition decision, while the condition for the range or field in which the search terms designated in the search query condition concur can be decided through comparison of the start and end character positions of the search terms with the positions of the identifiers of the preceding and succeeding field identifying character strings, respectively.

The decision on the logical condition between the search terms as specified in the search query statement can be realized by checking the coincidence of the match term identifiers obtained as the result of the character string matching, the proximity condition decision and the contextual condition decision and by deciding whether the identifiers of the match terms found as coinciding with the search terms satisfy the logical condition.

By implementing the character string matcher and the compound condition decision facilities in the manner described above, there can be realized consistently the specific document retrieval peculiar to the full search text.

Furthermore, by executing the proximity condition decision processing, the contextual condition decision processing and the logical condition decision processing by using three microcomputers, respectively, these processings can be performed without need for establishing synchronism among the processings. In other words, such a pipeline arrangement can be adopted in which the microcomputers start the associated condition decision processings independent of one another upon storage of the match result information in respective input buffers, whereby the compound or complex condition decision processing can be realized at an increased speed.

BRIEF DESCRIPTION OF THE DRAWINGS

FIGS. 2A to 2D are views showing examples of compound condition decisions for illustrating the underlying concept of the invention;

FIGS. 8 to 27 show a first embodiment of the condition decision processing;

FIG. 21 is a PAD diagram for illustrating a contextual condition decision processing procedure;

FIGS. 22A and 22B are views for illustrating a first part of contextual condition processing steps;

FIG. 24 is a view for illustrating an example of the output resulting from the contextual condition decision processing;

FIG. 25 is a PAD diagram for illustrating a logical condition decision processing;

FIG. 27C is a view showing a structure of a delimiter table;

FIG. 28C is a view for illustrating a structure of a delimiter table;

FIG. 31 is a block diagram showing a general arrangement of the document retrieval system according to a fifth embodiment of the invention;

DESCRIPTION OF THE PREFERRED EMBODIMENTS

Figure 1:
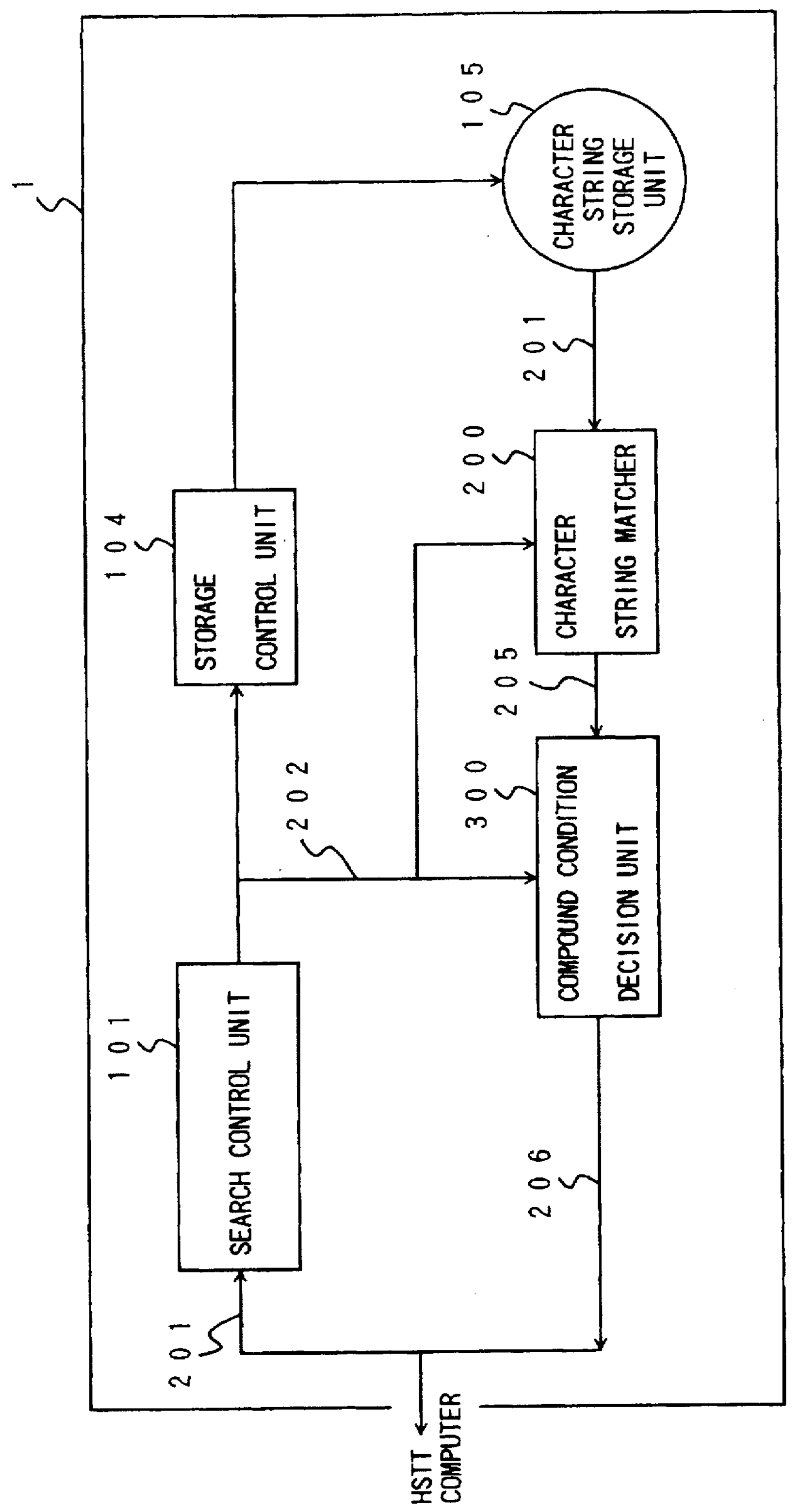
FIG. 1 is a block diagram showing a general arrangement of a prior art document retrieval system.

Now, the present invention will be described in conjunction with exemplary or preferred embodiments.

However, before entering into detailed description of the embodiments, the concept of the complex or compound condition decision functions in the document retrieval incarnating the teachings of the invention will be elucidated.

In the proximity condition which is one of the compound conditions, an inter-character distance condition designating an upper and/or lower limit to a number of characters existing between search terms in the case of Japanese language or an inter-word distance condition designating an upper and/or lower limit to a number of words intervening between search terms in the case of English language are specified, whereon the search is carried out on the basis of the inter-character or inter-word distance condition.

In the case of Japanese language, the following search condition statements may be mentioned as examples of the inter-character distance condition.

文書 [8C]検索 (2-1)

文書 [10c]検索 (2-2)

文書 [8c, 10c]検索 (2-3)

文書 <10c>検索 (2-4)

The search query condition statement (2-1) "文書 [8C] 検索 commands that such a document or text be searched and retrieved in which two search terms "文書" and "検索" appear in this order and in which eight or less characters are sandwiched between these two search terms. Accordingly, texts of the contents such as illustrated in FIGS. 2A and 2B, by way of example, are subject to the search.

The query condition statement (2-2) "文書 [10c] 検索" states that such a document or text be searched in which two search terms "文書" and "検索" appear in such proximity to each other in which no more than ten characters are interposed between these two search terms regardless of the order in which they appear in the document or text, i.e. regardless of whether the search terms "文書" appear before "検索" or vice versa. Accordingly, texts such as those illustrated in FIGS. 2A, 2B and 2C, by way of example, are to be searched.

The query condition statement (2-3) of "文書 [8c, 10c] 検索" commands that such a text be searched in which the two search terms 文書 and 検索 appear with such proximity to each other that a number of characters no less than eight and no more than ten intervene between these two search terms regardless of the order in which the two search terms occur. Accordingly, such texts as illustrated in FIGS. 2B and 2C are to be searched.

The query condition statement (2-4) 文書<10c>検索" means that such a text be searched in which two search terms "文書" and "検索" appear with a distance therebetween which corresponds to ten or more characters, regardless of the sequential order of these search terms. Accordingly, texts such as illustrated in FIGS. 2C and 2D are subject to the search.

As the inter-word distance condition (in the case of English text search), there may be mentioned the following, by way of example:

"text [8Wl search" (3-1)

"text [10w] search" (3-2)

"text [8w, 10W] search (3-3)

"text <10w> search" (3-4)

The query condition statement (3-1) "text [8W] search" commands that such a text be searched and retrieved in which two search terms "text" and "search" appear in this order and in which eight or less words are sandwiched between these two search terms.

The condition statement (3-2) "text E10w] search" states that such a text be searched in which two search terms "text" and "search" appear in such proximity to each other in which no more than ten words are interposed between these two search terms regardless of the the order in which they appear in the text, i.e. regardless of whether the search term "text" appear before "search" or vice versa.

The query condition statement (3-3) "text [8w, 10w] search" commands that such a text be searched in which the two search terms "text" and "search" occur with such proximity to each other that a number of words no less than eight and no more than ten intervene between these two search terms regardless of the order in which the two search terms appear.

The condition statement (3-4) "text <10*w*>search" means that such a text be searched in which two search terms "text" and "search" appear with a distance therebetween which corresponds to ten or more words, regardless of the sequential order of these search terms.

It will be understood from the foregoing for what function the proximity condition serves.

Now, a contextual condition for the search will be considered. For both of Japanese and English text searches, there may be mentioned the following examples of the contextual condition.

"文書 [P] 検索", "text [P] search" (4-1)

"文書 [p] 検索", "text [p] search" (4-2)

"文書 [S] 検索", "text [S] search" (4-3)

"文書 [s] 検索", "text [s] search" (4-4)

"文書 [PH] 検索", "text [PH] search" (4-5)

"文書 [ph] 検索", "text [ph] search" (4-6)

The meanings of the abovementioned exemplary contextual conditions will be elucidated in conjunction with Japanese text (or document) search.

The contextual condition statement (4-1) reading "文書 [P] 検索" states that a document or text in which the two search terms "文書" and "検索" appear in a same paragraph in this order be searched.

The contextual condition statement (4-2) reading "文書 [p] 検索" states that a document or text in which the two search terms "文書" and "検索" occur in a same paragraph be searched without taking into account the order in which the search terms appear.

The contextual condition statement (4-3) "文書 [S] 検索" states that a document or text in which the two search terms "文書" and "検索" appear in a same sentence in this order be searched.

The contextual condition statement (4-4) reading "文書 [s] 検索 states that a document or text in which the two search terms "文書" and "検索" appear in a same sentence be searched without taking into account the order in which the search terms occur.

The contextual condition statement (4-5) reading "文書 [PH] 検索" states that a document or text in which the two search terms "文書" and "検索" appear in a same sub-sentence in this order be searched. In this conjunction, the term "sub-sentence" indicates a phrase, clause or the like punctuated by punctuation symbols such as comma "," and stop "." and the like in the case of a Japanese sentence while meaning a phrase, clause or the like punctuated by punctuation symbols such as comma "," and period "." in the case of a English sentence, only for convenience of the description.

The contextual condition statement (4-6) reading "文書 [ph] 検索" states that a document or text in which the two search terms "文書" and "検索" appear in a same sub-sentence be searched without taking into account the order in which the search terms occur.

It will now be understood for what function the contextual condition serves.

Finally, in the search for both Japanese and English texts or documents, there is to be mentioned a logical condition which may be exemplified as follows.

"文書 [AND] 検索", "text [AND] search" (5-1)

"文書 [OR] 検索", "text [OR] search" (5-2)

"文書 [NOT] 検索", "text [NOT] search" (5-3)

The logical conditions mentioned above will be elucidated in conjunction with the search of text written in Japanese.

The logical condition statement (5-1) "文書 [AND] 検索" means that such a text or document be searched in which the search terms "文書" and "検索" appear concurrently.

The logical condition statement (5-2) reading "文書[OR] 検索" means that such a text or document be searched in which either search term "文書" or "検索" appears.

The logical condition statement (5-3) of "文書 [NOT] 検索" means that a document or text which contains a search term "文書" and which does not contain a search term "検索" be retrieved.

The function of the logical condition will be understood from the above. The proximity condition, the contextual condition and the logical condition explained above constitute the compound conditions which are to be realized in the text search or document retrieval according to the invention.

Before entering into description of exemplary embodiments of the invention, definition or elucidation will be made of the concepts "character string matching (or collation) of search term", "proximity condition decision", "contextual condition decision" and "logical condition decision" which are basic processings involved in carrying out the present invention.

Figure 3:
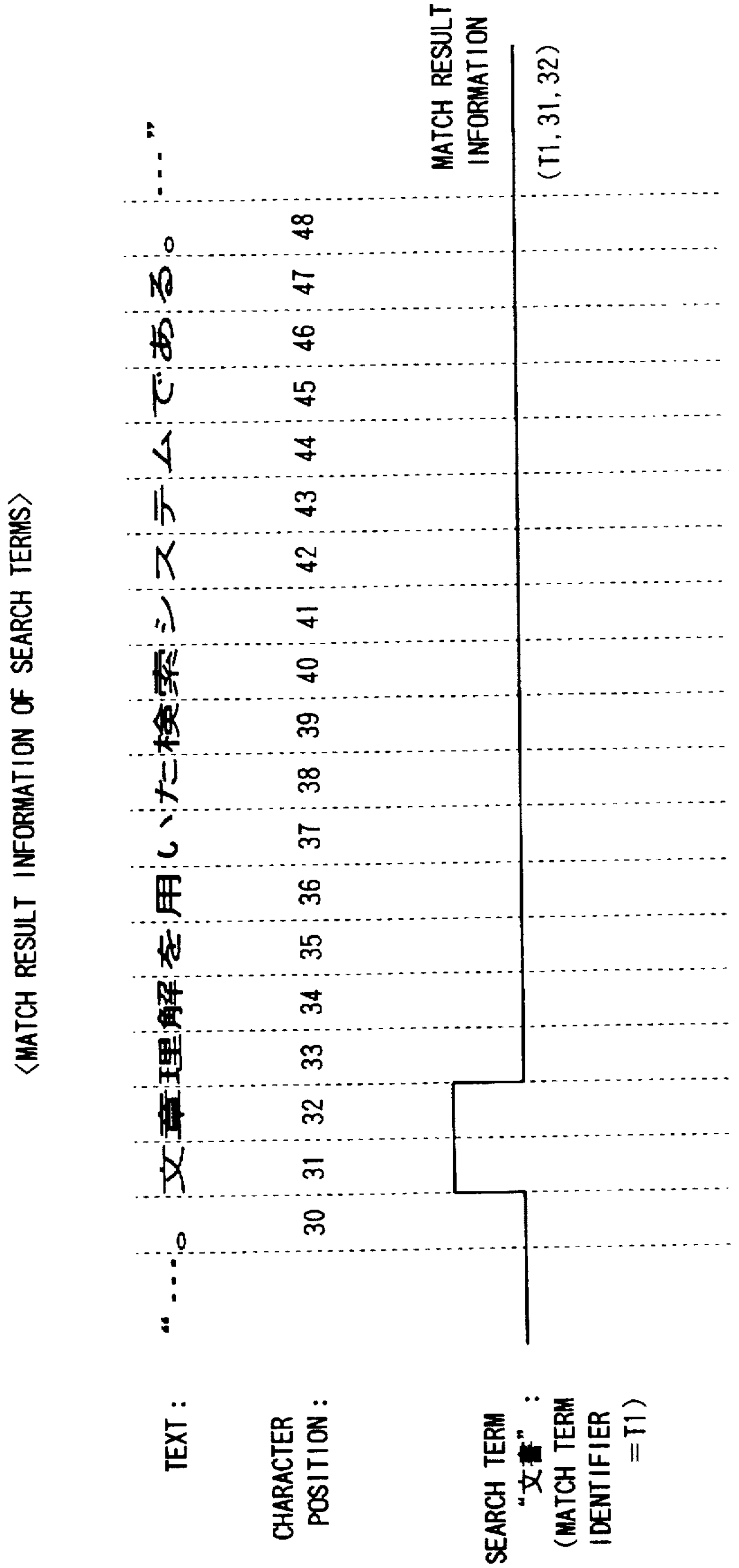
FIG. 3 is a view for illustrating a structure of match information of search terms.

In the first place, referring to FIG. 3, description will be directed to a character matching scheme for a search term as well as formats of document information to be inputted and match result information to be output. It is supposed that "文書" is selected as a search term and that a text reading "...・文書理解を用いた検索システムである・..." is input to a character string matching facility. In that case, document identification or ID information and match term ID information obtained as the result of the character string matching are represented by following expressions (6-1) and (6-2), respectively.

(D1, 0, 0) (6-1)

(T1, Xs, Xe) (6-2)

In the expression (6-1) of the document ID information, D1 represents a text identifier while two other terms represent constants of zero, respectively.

Further, in the expression (6-2) for the match term ID information, T1 represents an identifier of the term for which the matching with the search term is found (hereinafter referred to as the match term identifier), Xs represents a position of a start character of a match term searched in the text, and Xe represents a position of an end character of the match term as searched.

In the case of the example shown in FIG. 3, the document ID information is given by (D1, 0, 0), while the match term ID information of 文書 is represented by (T1, 31, 32).

Figure 4:
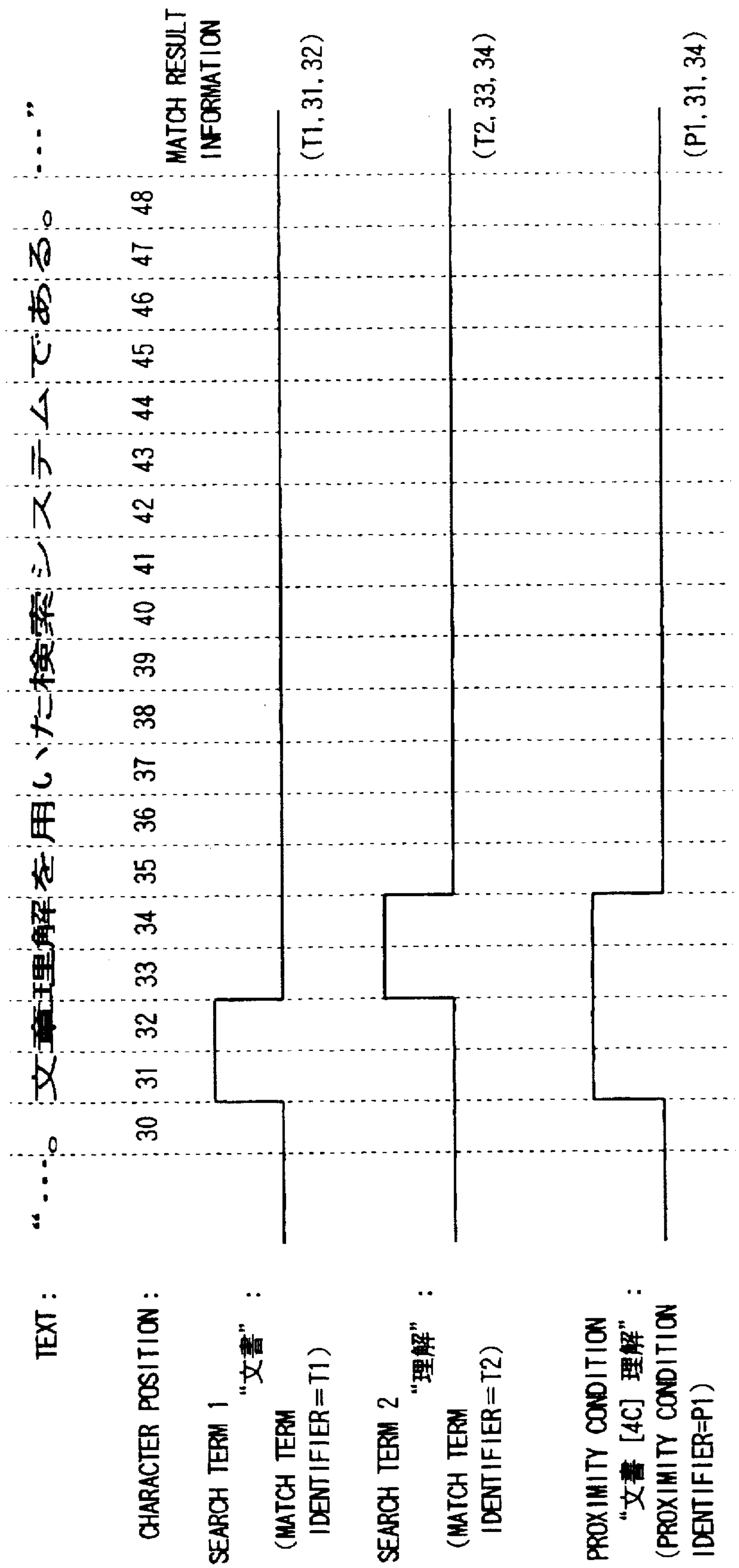
FIG. 4 is a view for illustrating, by way of example, the concept of proximity condition decision processing.

Next, description will be turned to a proximity condition decision scheme and formats for input and output of search query and match result information by reference to FIG. 4. It is assumed, by way of example only, that the proximity condition 文書 [4C] 理解" commanding that such a text be searched in which terms "文書" and "理解" appear in this order and in which these terms are located close to each other with a distance corresponding to four or less characters is set and that a text reading "... 文書理解を用いた検索システムである . . . . " is input to the character string matching facility.

At first, the terms "文書" and "理解" are loaded in the character string matching facility as the search terms. When the text mentioned above is then input, the character matching processing is executed for the two search terms "文書" and "理解", as a result of which there are obtained the document ID information and the match term ID information which are expressed as follows:

(D1, 0, 0) (6-3)

(T1, 31, 32) (6-4)

(T2, 33, 34) (6-5)

The expression (6-3) represents the document ID information. The expression (6-4) represents the match term ID information for the search term "文書". Finally, the expression (6-5) represents the match term ID information for the search term 理解.

Figure 5:
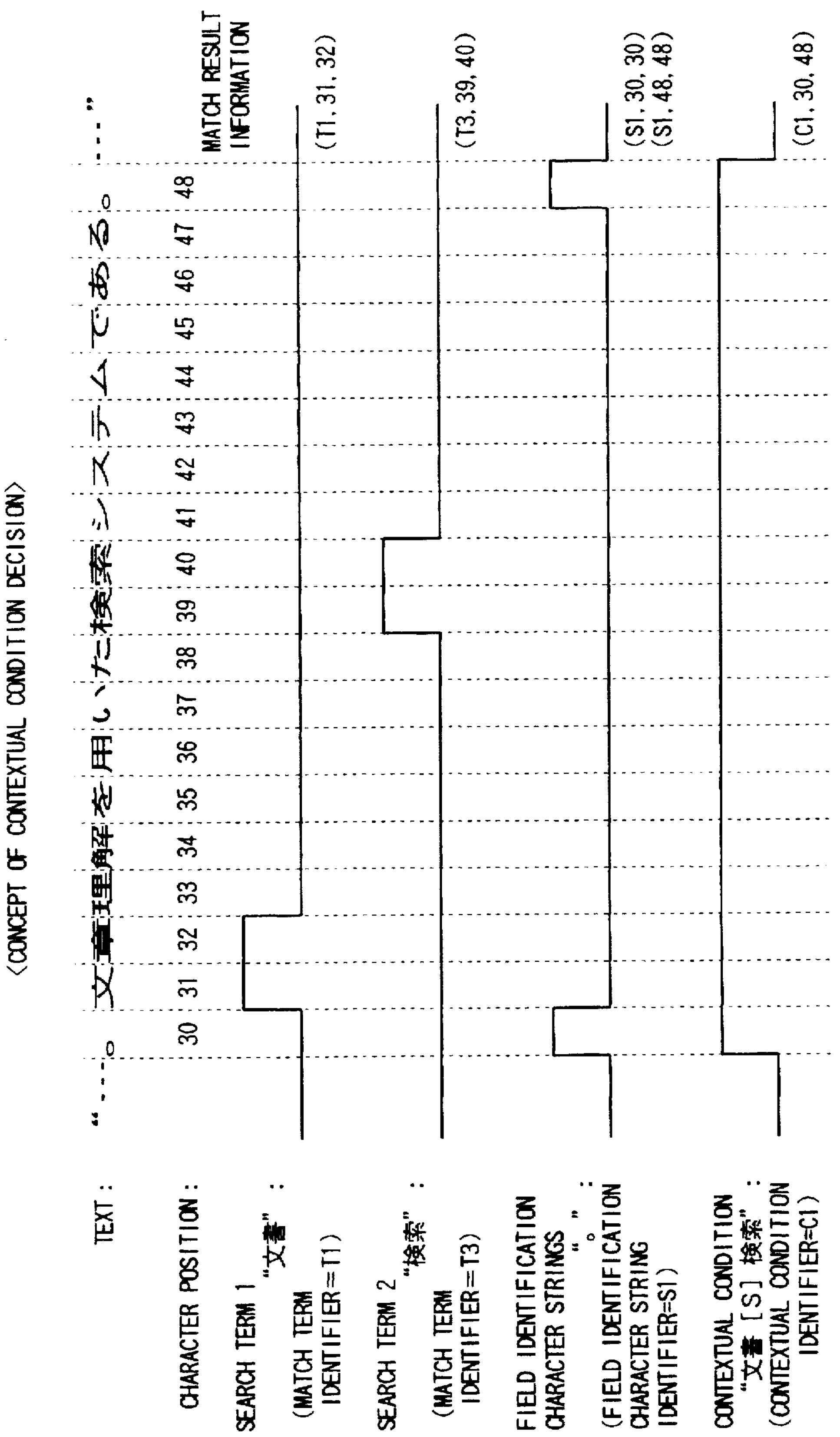
FIG. 5 is a view for illustrating, by way of example, the concept of contextual condition decision processing.

Next, referring to FIG. 5, description will be turned to a contextual condition decision scheme as well as formats for input and output of search query and match result information. It is assumed, by way of example, that a contextual condition "文書 [S] 検索" reading that such a text be searched in which terms "文書" and "検索" appear concurrently in this order in a same sentence is loaded and that a text reading ". . . ・文書理解を用いた検索システムである ・ . . . " (and having a text identifier of "1") is input to the character string matching facility. Because the terms "文書" and "検索" are designated as the search terms and because the contextual condition is given, not only the search terms "文書" and "検索" but also a character string "." for identifying the field is set in the character string matching facility. Accordingly, in the character string matching facility, matching processing is performed for the three search terms mentioned above, as a result of which the match term ID information represented by the following expressions are output.

(D1, 0, 0) (6-7)

(S1, 30, 30) (6-8)

(T1, 31, 32) (6-9)

(T3, 39, 40) (6-10)

(S1, 48, 48) (6-11)

In the match term ID information represented by expressions (6-8) and (6-11), S1 is an identifier of "." for identifying the field.

Figure 6:
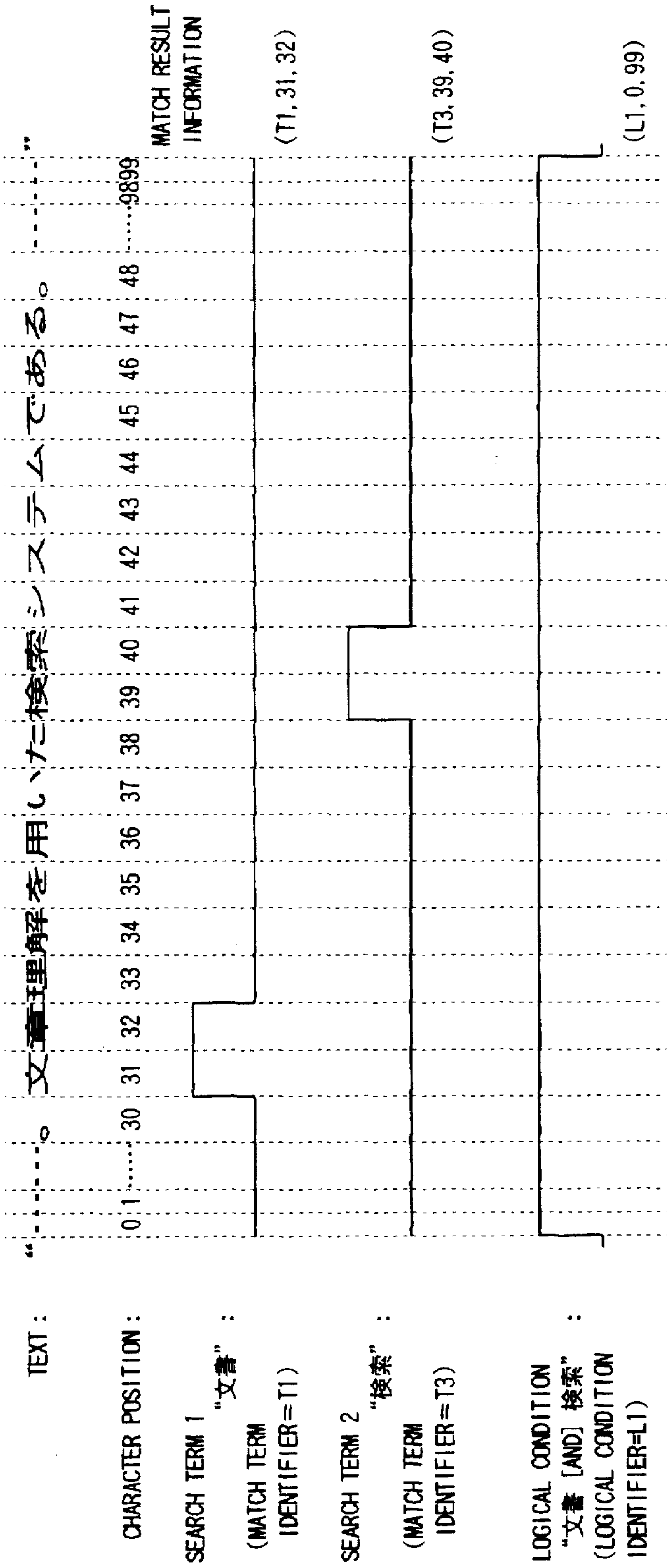
FIG. 6 is a view for illustrating, by way of example, the concept of logical condition decision processing.

Finally, referring to FIG. 6, description will be made of a logical condition decision scheme as well as formats for input and output of search query and match result information. In this connection, it is assumed, for example, that a logical condition "文書" [AND] "検索" commanding that a text be searched in which two search terms "文書" and "検索" appear concurrently in a same text is set and that a text "... ・文書理解を用いた検索システムである . . . . " is input to the character string matching facility.

In this case, "文書" and "検索" are first set in the character string matching facility as the search terms. Subsequently, upon inputting of the text mentioned above, the character string matching facility outputs the match term ID information represented by the following expressions:

(D1, 0, 0) (6-13)

(T1, 31, 32) (6-14)

(T3, 39, 40) (6-15)

The expression (6-13) represents the document ID information, (6-14) represents the match term ID information for the search term "文書", and (6-15) represents the match term ID information for the term "検索".

Next, a series of processings involved in the character string matching and the compound condition decisions which constitute basic processings in carrying out the present invention will be described by reference to FIG. 7.

Figure 7:
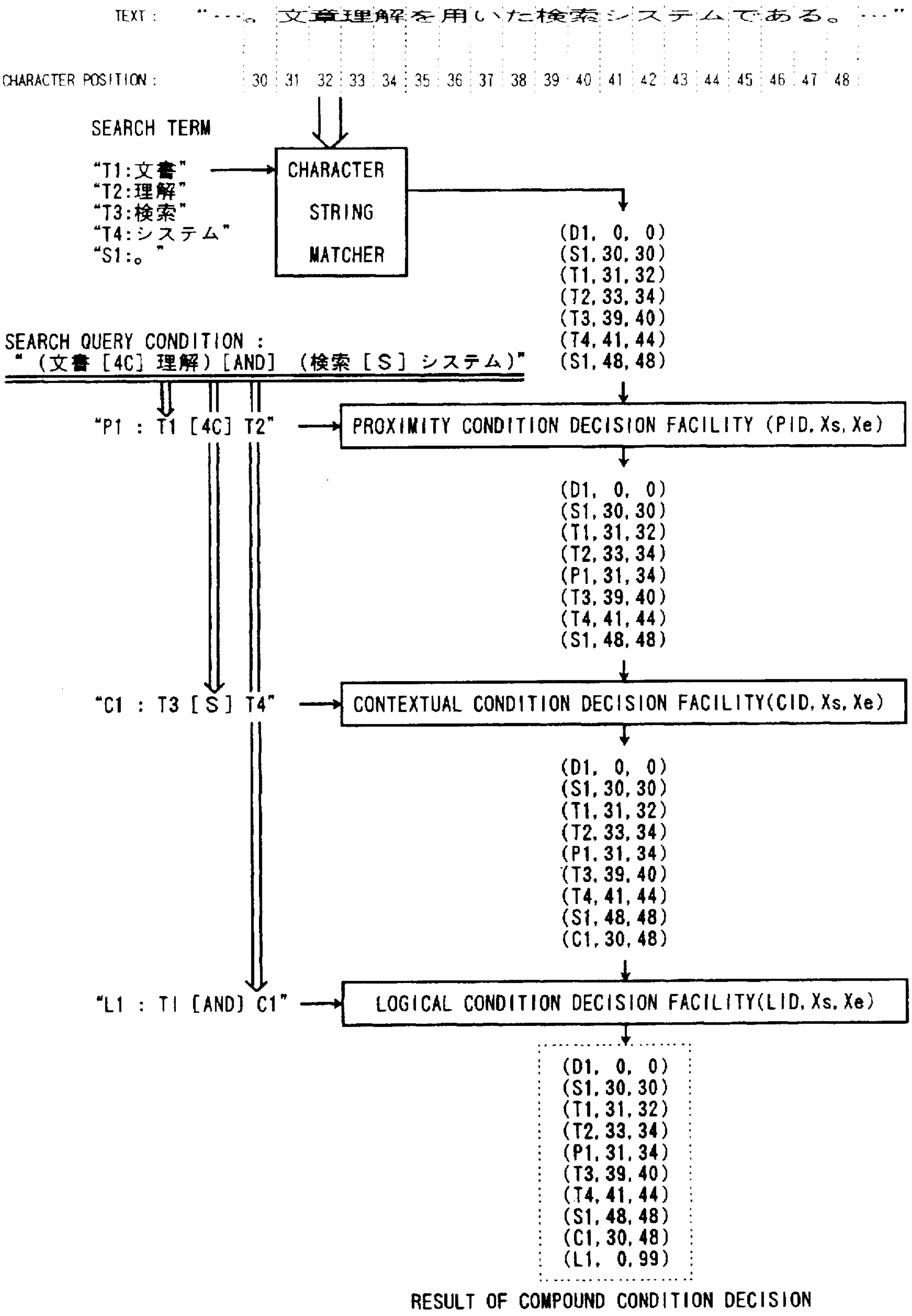
FIG. 7 is a view for illustrating basic conjunction relations among the condition decision processings illustrated in FIGS. 3 to 6, respectively.

In the case of the example illustrated in FIG. 7, it is assumed that an input search query statement reads "(文書 [4C] 理解) [and] 検索[S] システム" (6-18)

and that there is input a text reading

"...文書理解を用いた検索システムである . . . ." (6-19)

In the first place, a search control circuit 101 (described hereinafter) sets search control information in a manner described below. As the search terms, there are selected "文書", "理解" and "システム" designated in the search query statement. In that case, the terms "文書", "理解", "検索" and "システム" are assigned or allocated with identifiers T1, T2, T3 and T4, respectively. Furthermore, the field identifying condition "[S]" is given in the search query statement, wherein "S1" is assigned as the identifier. Additionally, the search query statement can be divided into a proximity condition part, a contextual condition part and a logical condition part, wherein "P1: T1 [4C] T2" is set as the proximity condition with "C1: T3 [4C] T4" being set as the contextual condition while "L1: P1 [AND] C1" is set as the logical condition, wherein P1, C1 and L1 represent identifiers of the proximity condition, the contextual condition and the logical condition, respectively. A flow of the compound condition decision processing will be explained by reference to FIG. 7 on the assumptions made above.

Upon inputting of the document data or text in the character matching facility, the document identifier D1 stored at the start of the document is detected and outputted as the match information (D1, 0, 0). Subsequently, when a match term coinciding or matching with the search term as designated is found in the text or document undergoing the search processing, the identifier of the match term is output as well as the start character position and the end character position of the match term as the match position information as the match result information. By way of example, for the term "文書", (T1, 31, 32) is output as the match result information, wherein "T1" represents the match term identifier with "31" and "32" representing the start and end character positions thereof, respectively.

Thus, the match result information for one text is of such an array structure in which the text identifier is followed by the match result information for the search term. In the character string matching facility, the matching processing described above is repetitively executed on a document-by-document basis until all the document data have completely been read. More specifically, upon inputting of the text mentioned previously, there is obtained from the character matching facility the match result information mentioned below.

| | |
|---|---|
| (D1, 0, 0) | (6-20) |
| (S1, 30, 30) | (6-21) |
| (T1, 31, 32) | (6-22) |
| (T2, 33, 34) | (6-23) |
| (T3, 39, 40) | (6-24) |
| (T4, 41, 44) | (6-25) |
| (S1, 48, 48) | (6-26) |

where the expression (6-20) represents the document or text identifier, while expressions (6-22), (6-23), (6-24) and (6-25) represent the match term ID information of "文書", "理解", "検索" and "システム", respectively. Further, the expressions (6-21) and (6-26) represent match term ID information of the field identifying character strings ".", respectively.

Subsequently, the proximity condition decision facility performs the processing relevant to the proximity condition "文書 [4C] 理解", i.e. "P1:T1 [4C] T2" on the basis of the information mentioned above. In this proximity condition statement, "P1" represents the identifier of this proximity condition.

In the case of this example of the proximity condition, the inter-character distance is calculated to be zero, i.e. (33−32) −1=1−1=0, from the end character position "32" contained in the match term ID information (T1, 31, 32) of the match term "文書" which coincides with the search term "文書" located beforehand in the proximity condition statement and the start character position "33" contained in the match term ID information (T2, 33, 34) of the match term "理解" which coincides with the search term "理解" located afterward in the proximity condition statement on the other hand. This means that the match terms "文書" and "理解" are distanced from each other by less than four characters, as commanded by the proximity condition. Accordingly, the proximity condition decision facility decides that the abovementioned proximity condition "P1: T1 [4C] T2" is satisfied.

As a result of the decision for the proximity condition, in addition to the match result information (6-20) to (6-26) output from the character string matching facility, the match result information (P1, 31, 34) given by the expression (6-27) is output, as follows:

| | |
|---|---|
| (D1, 0, 0) | (6-20) |
| (S1, 30, 30) | (6-21) |
| (T1, 31, 32) | (6-22) |
| (T2, 33, 34) | (6-23) |
| (P1, 31, 34) | (6-27) |
| (T3, 39, 40) | (6-24) |
| (T4, 41, 44) | (6-25) |
| (S1, 48, 48) | (6-26) |

In the match result information (D1, 31, 34) newly added and given by the expression (6-27), P1 represents the identifier PID of the given proximity condition "文書 [4C] 理解", "31" represents the start character position (generally designated by "Xs") of the match term ID information (T1, 31, 32) for the match term "文書" which coincides with the search term "文書" located beforehand in the proximity condition statement as satisfied, and "34" represents the end character position (generally designated by "Xe") of the match term ID information (T2, 33, 34) for the match term "理解" which coincides the search term "理解" located subsequently in the abovementioned proximity condition. (Hereinafter, the match result information such as (P1, 31, 34) mentioned above will also be referred to as the proximity condition ID information. Similarly, the match information resulting from the contextual condition decision processing will also be referred to as the contextual condition ID information, while the match information resulting from the logical condition decision procesing will be termed the logical condition ID information as well. Further, these ID information will collectively be referred to as the compound condition ID information.)

Next, in the contextual condition decision facility, concurrence condition decision is performed for the contextual condition "検索 [S] システム", i.e. "C1:T3 [4C] T4" on the basis of the match result information enumerated above. In the statement "C1: T3 [4C] T4", C1 represents the identifier of this contextual condition.

In the case of the instant example, the range of the field, i.e. sentence, is given by a range extending from 30-th character position which is the start character position of the match term ID information (S1, 30, 30) of the match term "." coinciding with the field identifying character string "." designated in the contextual condition to the 48-th character position which is the end character position of the match term ID information (S1, 48, 48) of the match term "." coinciding with the succeeding field identifying character string ".", i.e. a range given by the expressions (6-21) to (6-26). In the case of the example now under consideration, the search terms "文書" and "検索" designated by the contextual condition of concern are contained in this order within the field (sentence) of the range mentioned above. Accordingly, it is decided that the contextual condition "検索 [S] システム" is satisfied. At this juncture, it should be mentioned that the sequential or orderly relationship between "検索" and "システム" is determined by comparing the end character position "39" of "検索" with the start character position "41" of "システム". In other words, the end character position identifier "40" of "検索" is compared with the start character position identifier "41". Since 40<41, it can be determined that the term "検索" is located in precedence to "システム".

As a result of the contextual condition decision, in addition to the match result information (6-20) to (6-27) obtained from the proximity condition decision processing, the match result information (C1, 30, 40) given by the undermentioned expression (6-28) is output, as follows:

| | |
|---|---|
| (D1, 0, 0) | (6-20) |
| (S1, 30, 30) | (6-21) |
| (T1, 31, 32) | (6-22) |
| (T2, 33, 34) | (6-23) |
| (P1, 31, 34) | (6-27) |
| (T3, 39, 40) | (6-24) |
| (T4, 41, 44) | (6-25) |

-continued

| | |
|---|---|
| (S1, 48, 48) | (6-26) |
| (C1, 30, 48) | (6-28) |

In the match result information (C1, 30, 48) newly added as the result of the contextual condition decision processing, "C1" represents the identifier (generally denoted by CID) of the instant contextual condition, "30" (start position information) represents the start character position of the match term ID information for the match term "·" which coincides with the context or field identifying character string "·" located in precedence in the designated contextual condition, and "48" (end position information) represents the end character position of the match term ID information (S1, 48, 48) of the match term "·" coinciding with the field identifying character string "·" located subsequently in the designated contextual condition.

The match result information enumerated above is now input to a logical condition decision facility to undergo the logical condition decision processing concerning the logical condition "L1: P1 [AND] C1", wherein L1 represents the identifier of this logical condition.

In the case of the instant example, the logical condition facility checks whether the two conditions, i.e. "P1: T1 [4C] T2" representing the proximity condition "文書 [4C] 解析" and "C1: T3 [4C] T4" representing the contextual condition "検索 [S] システム" exist concurrently in one text. When both of these conditions are satisfied simultaneously, it is then decided that the logical condition "L1: P1 [AND] C1" is satisfied. Consequently, the match result information (L1, 0, 99) given by the undermentioned expression (6-29) is output in addition to the outputs (6-20) to (6-28) of the contextual condition decision facility described previously, as follows:

| | |
|---|---|
| (D1, 0, 0) | (6-20) |
| (S1, 30, 30) | (6-21) |
| (T1, 31, 32) | (6-22) |
| (T2, 33, 34) | (6-23) |
| (P1, 31, 34) | (6-27) |
| (T3, 39, 40) | (6-24) |
| (T4, 41, 44) | (6-25) |
| (S1, 48, 48) | (6-26) |
| (C1, 30, 48) | (6-28) |
| (L1, O, 99) | (6-29) |

In the abovementioned match result information (L1, 0, 99) output from the logical condition decision facility, "L1" represents the identifier (generally denoted by LID) of the result of the instant logical condition decision processing, and "0" and "99" represent the start and end character positions, respectively, of the text undergone the search processing.

As will be appreciated from the foregoing description, there is employed according to the invention the compound condition decision facilities which are composed of the proximity condition decision facility for determining the inter-term distance condition given in terms of a number of characters existing between search terms designated in the search query statement, the contextual condition decision facility for determining the concurrence condition of the search terms in a same sub-sentence, a same sentence or a same paragraph, and the logical condition decision facility for determining the logical condition existing-between the search terms specified in the search query statement. Owing to this feature of the invention, it is possible to carry out the document screening search with greater detail, which is especially favorable to the full text search. Further, by virtue of such arrangement that utterly the same format is adopted for the input/output information of the proximity condition decision processing, the contextual condition decision processing and the logical condition decision processing which constitute the compound condition decision processing, these individual decision processings can be executed distributively through pipeline processing, whereby the compound condition decision processings can be performed at an increased speed.

Now, referring to FIG. 8, a document retrieval system according to a first embodiment of the invention will be described. Although the illustrated document retrieval system has a general arrangement similar to that of the prior art system shown in FIG. 1, the former differs from the latter in respect to structures of a character string matcher circuit 200 and a compound condition decision circuit 300.

Figure 8:
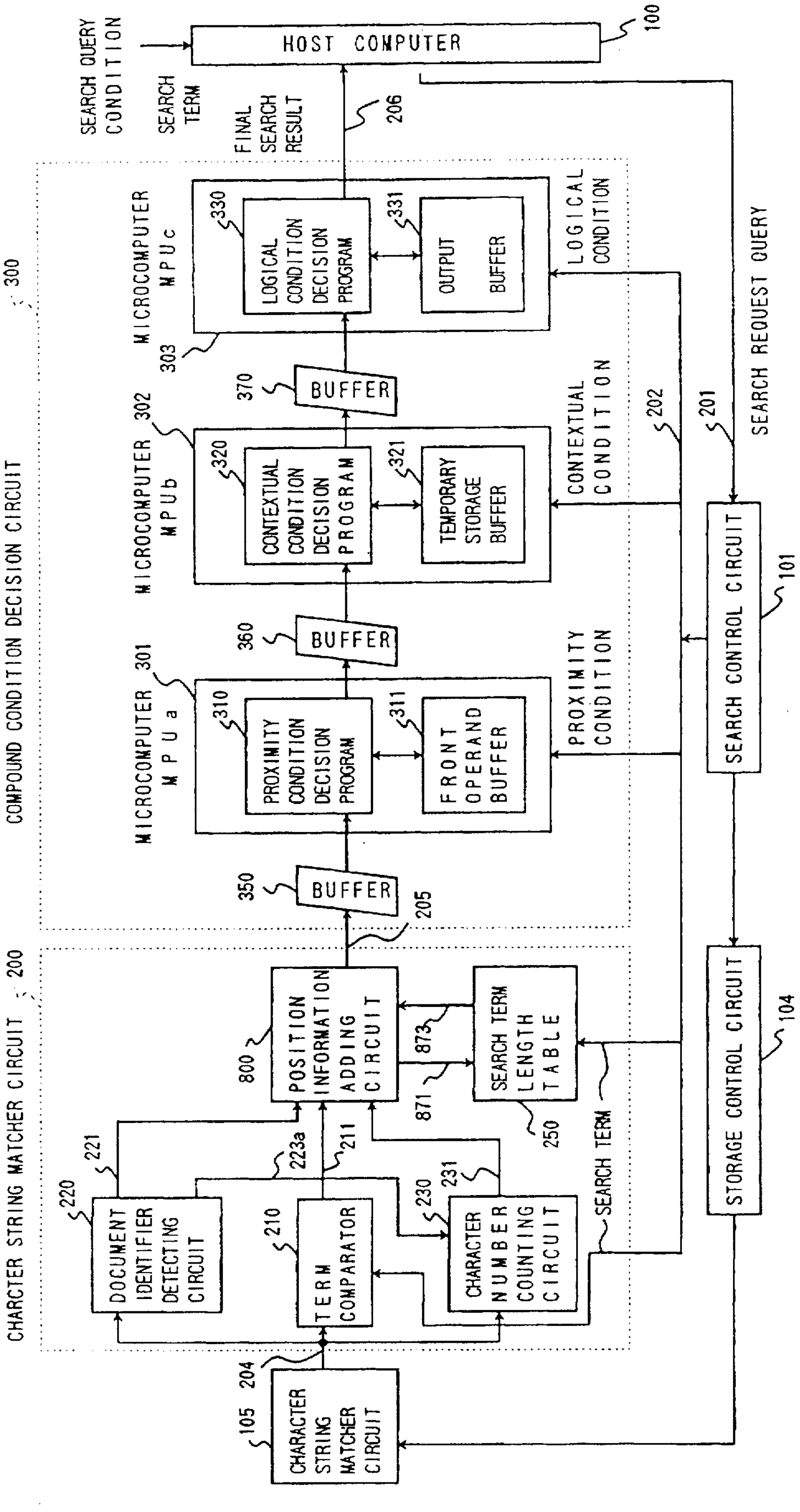

Referring to FIG. 8, the search query conditions and search terms loaded from a host computer 100 are input to a search control circuit 101 as a search query request 201. The search control circuit 101 sends as query information 202 the search terms to the character string matcher circuit 200 while outputting to the compound condition decision circuit 300 the proximity condition, contextual condition and the logical condition. Further, the search control circuit 101 controls a storage control circuit 104 to cause a character string storage circuit 105 to output document data 204 to the character string matcher circuit 200.

The character string matcher circuit 200 is arranged so as to compare or collate search terms (i.e. keys for the search) sent from the search control circuit 101 with text or document data 204 read out from the character string storage circuit 105 under the control of the storage control circuit 104. When terms matching or coinciding with the search terms are found in the document data, the match term ID information is sent to the compound condition decision circuit 300 as the match result information 205.

The compound condition decision circuit 300 decides, on the basis of the compound condition information supplied from the search control circuit 101 as to whether or not the match term ID information supplied from the character string matcher circuit 300 satisfies the compound condition. When the compound condition is satisfied, the corresponding match term ID information and the compound condition ID information are output as the final search result information 206 on a document-by-document basis.

First, description will be made in detail of the character string matcher circuit 200.

The character string matcher circuit 200 is composed of a term comparator 210, a text identifier detecting circuit 220, a character number counting circuit 230, a position information adding circuit 800 and a search term length table 250.

The term comparator 210 serves for comparing or collating the document data 204 supplied thereto with the designated or input search terms. When there are found in the document data 204 match terms which coincide with the search terms, match term identifiers 211 (positive integer data) which are the identifiers of the match terms are sent to the position information adding circuit 800. Unless the match term is detected, data "0" (zero) is supplied to the position information adding circuit 800. In this manner, the match term identifier 211 having a value of zero means that the identifier data is invalid (false), while the match term identifier 211 having a positive integer value represents valid data which indicates the match term identifier. As a typical structure of the term comparator 210 designed to serve for the function described above, there may be mentioned the one disclosed in JP-A-60-105039.

Figure 9:
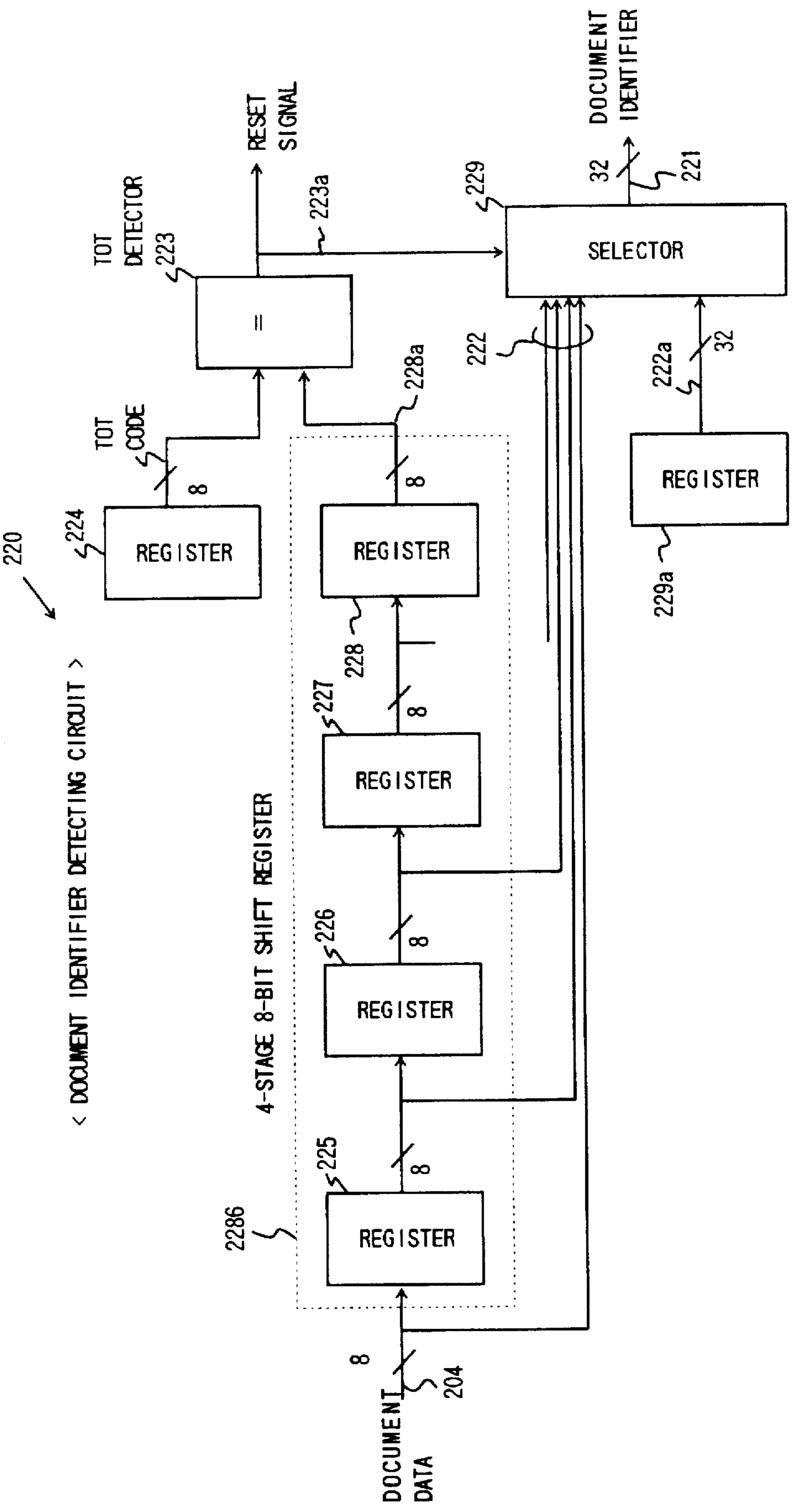
Figure 11:
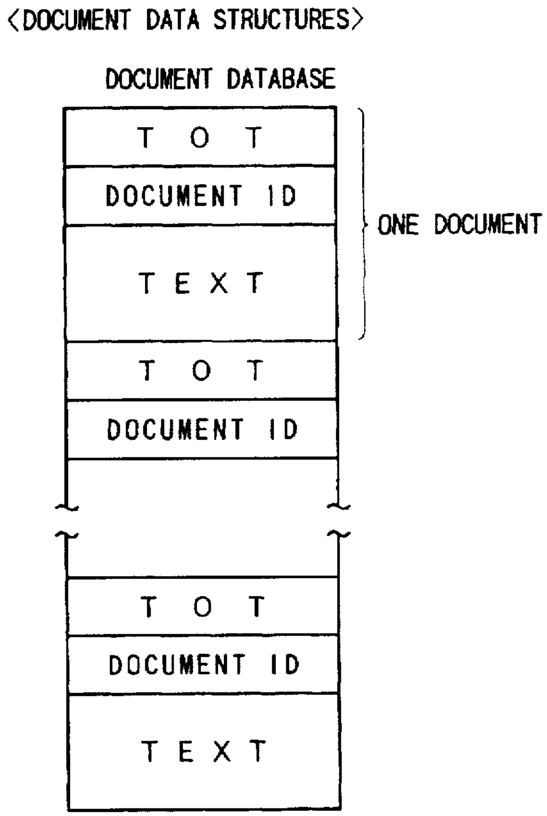

The document identifier detecting circuit 220 is composed of registers 224 to 228 and 229*a*, a comparator 223 and a selector 229, as is shown in FIG. 9. The register 224 is initially loaded with a top-of-text code (TOT in abbreviation) which is affixed to the start of document data on a document-by-document basis, as shown in FIG. 11, while the register 229*a* is initialized to "0" (zero). The document data 204 sent on an eight-bit basis are input sequentially to a four-stage shift register 228*b* which is constituted by the registers 225 to 228. The comparator 223 performs comparison as to whether or not a final stage output 228*a* of the shift register 228*b* is same as the top-of-text code TOT stored in the register 224. Outputs of the registers 225 to 228 are sent to a selector 229 as output data of 32 bits. When the final register stage output 228*a* represents the top-of-text code (TOT), a select signal 223*a* is issued by the comparator 223, whereby the 32-bit output data 222 is selected as the document identifier 221 to be subsequently sent out to the position information adding circuit 800. So long as no select signal 223*a* is sent to the selector 229, the latter selects "0" (zero) placed in the register 229*a*. In this manner, every time the top-of-text code (TOT) affixed to the start of the document data on the document-by-document basis is detected, the 32-bit text identifier 221 is sent to the position information adding circuit 800, while the text identifier 221 of value "0" (zero) is sent to the position information adding circuit 800 so long as no TOT is detected.

The character number counter circuit 230 counts the number of character codes, each having 8 bits, from the start of the document data 204 supplied thereto on a document-by-document basis and converts the number of character codes to a number of characters each constituted by two bytes. The output of the character number counter circuit 230 is then sent out to the position information adding circuit 800. For resetting the character code count value for every document, a TOT detection signal 223*a* output from the document identifier detecting circuit 220 is utilized.

Figure 10:
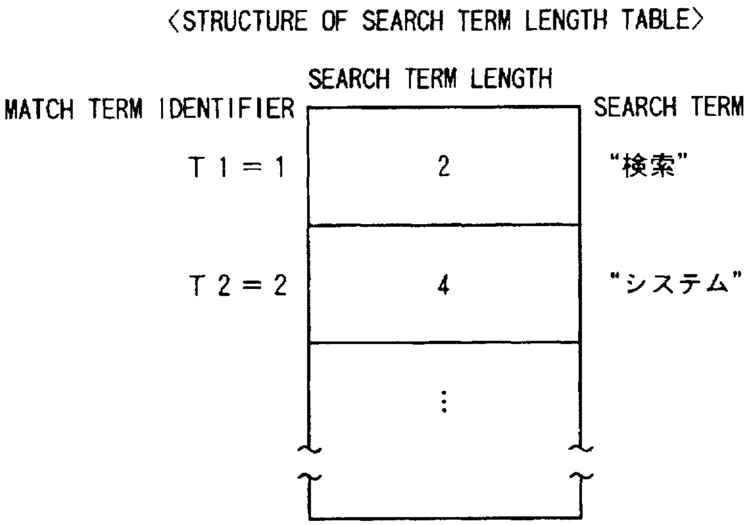

In the search term length table 250, there is stored in a slot having an address designated by the match term identifier 211 a length of the corresponding search term, as illustrated in FIG. 10. The search term length table 250 receives the match term identifier from the position information adding circuit 800 and sends back the search term length information 873 corresponding to the match term identifier to the position information adding circuit 800. In the case of the example illustrated in FIG. 10, there are set in the search term length table 250 an integer value "2" representing the length of the search term "検索" having the match term identifier T1 of "1" and an integer value "4" representing the length of the search term "システム" having the match term identifier T2 of "2". Accordingly, when the search term length table 250 receives "1" as the match term identifier 211 (FIG. 8) corresponding to "検索", by way of example, the search term length of "2" is sent back-to the position information adding circuit 800.

The position information adding circuit 800 is composed of registers 810 to 816, OR gates 880 to 881, selectors 820 to 822, a subtracter 830 and an adder 831, as shown in FIG. 12.

Upon initialization of the position information adding circuit 800, the registers 813, 814 and 815 are set to "0" (zero), outputting "0" to the respective selectors 820, 821 and 822. On the other hand, the register 812 is placed with "1", outputting "1" to the adder 831.

When both the select signals 890 and 891 are "0", each of the selectors 820 to 822 selects a Z-port. (It should be noted that X- and Z-ports are each shown schematically as a single port in FIG. 12.) More specifically, the individual selectors 820 to 822 select the registers 813, 814 and 815, respectively, as a result of which "0" is output as the match result information 205 from the outputs of the selectors 820 to 822, respectively. It should further be mentioned that when the select signal 890 is "1" with the select signal 891 being "0", the X-port is selected, while the Y-port is selected when the select signal 890 is "0" with the select signal 891 being "1".

The register 810 is loaded with the document identifier 221 every time the document identifier 221 is sent from the document identifier detection circuit 220 and at the same time output to the selector 820 and the OR gate 880. When the document identifier 221 assumes a value other than "0" (zero), this indicates detection of other than the document identifier. When the document identifier 221 is stored in the register 810, the OR gate 880 executes ORing operation between the individual bits of the document identifier 221, whereupon the select signal 890 representing the result of the ORing operation is sent to the selectors 820 to 822.

When the document identifier 221 has been stored in the register 810, the value of the document identifier 221 is other than "0" (zero). Accordingly, the result 890 of the ORing operation of the OR gate 880 is "1". Consequently, "1" is output to the selectors 820 to 822, resulting in the X-port being selected in each of the selectors 820 to 822. Thus, there are output as the match result information 205 the document identifier 221 stored in the register 810 as the ID information, information "0" (zero) stored in the register 814 as the start position information and information "0" (zero) stored in the register 813 as the end position information. Thus, the document identifier information is constituted by the 32-bit document identifier and 32-bit fixed value of zero in which both the start position information and the end position information are "0", respectively.

The register 811 stores the match term identifier 211 every time the match term identifier 211 is sent thereto from the comparator 210, wherein the match term identifier 211 is output to the selector 820, the OR gate 881 and the search term length table 250. Further, the search term length information 873 is read out from the search term length table 250 in accordance with the match term identifier 211 and is output to the subtracter 830. At this juncture, it should be mentioned that the match term identifier of "0" (zero) means that no matching with the search term has been found. Further, the register 812 is loaded with the character number count 231 as the end position information 812*a* of the match term every time the character number count information 231 is sent to the register 812 from the character number counter circuit 230, and at the same time the character number count information 231 is output to the subtracter 830 and the selector 822. In the subtracter 830, the search term length 873 is subtracted from the end character position information 812*a*. The start position information 831*a* of the match term added with "1" (one) by the adder 831 is output to the selector 821.

Upon storage of the match term identifier 211 in the register 811, the OR gate 881 executes ORing operation between the individual bits of the match term identifier 211, whereby the select signal 891 resulting from the ORing operation of bits of the match term identifier 211 is sent to the selectors 820 to 822.

Accordingly, when the match term identifier 211 has been stored in the register 811, the output of the OR gate 881 assumes a value of "1" because the match term identifier 211 is not "0". As a result, the select signal 891 assuming the value of "1" is sent to the selectors 820 to 822, whereby the port Y is selected in each of these selectors. Thus, there are available, as the match result information 205, the match term identifier 211 stored in the register 811 as the ID information, the start position information 831*a* output from the adder 831 as the start position information and the end position information 812*a* stored in the register 812 as the end position information. In other words, the match term ID information is output in the form of a combination of the match term identifier of 32 bits and the match position information of 32 bits including the start position information of 16 bits and the end position information of 16 bits, as can be seen in FIG. 14.

As will be appreciated from the above description, the match result information can be expressed by a general form of (Tn, Xs, Xe), where Tn represents the document identifier or match term identifier, Xs represents the start position information of the match term and Xe represents the end position information of the match term. Accordingly, in the case of the example of the match result information "T2, 33, 34" shown in FIG. 3, "T2" represents the match term identifier, "33" represents the start position information and "34" represents the end position information.

Figure 15:
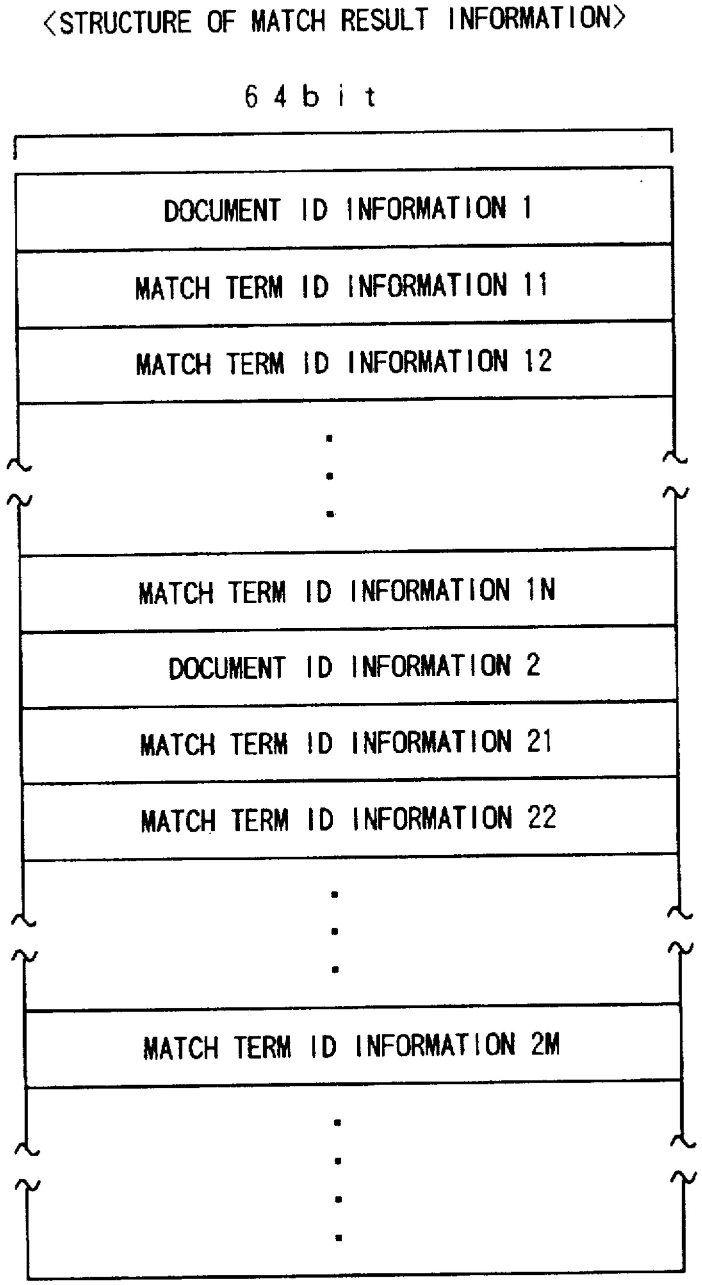

Through cooperation of the term comparator 210, the document identifier detecting circuit 220, the character number counting circuit 230, the search term length table 250 and the position information adding circuit 800 described above, the match result information of a structure such as illustrated in FIG. 15 is output from the character string matcher circuit 200 for each of the documents. It will be seen from this figure that the match result information for each document contains the document ID information at the start which is followed by an array of the match term ID information.

Further, it will be noted that the document ID information is of a same structure as the match term ID information and thus can be regarded as the match term ID information in which the position information is "0" (zero). For this reason, the document ID information can be handled in a similar manner as the match term ID information, making it possible to perform a batch processing without need for paying attention to the structure of the document ID information.

By virtue of the structure of the match result information 205 output from the character string matcher circuit 200 which is constituted by the document ID information and the match term ID information, as described above, it is possible to display the document data retrieved as the result of the search and containing the match terms coinciding with the search terms on a display screen in such a manner as to facilitate the understanding by a searcher. More specifically, by displaying the match terms coinciding with the search terms in a reversed color on the retrieved document data displayed on the screen, the searcher can easily understand which of the search terms has found a match in which document.

For realizing the display mentioned above, the document in which the match with the search terms is found is identified by making use of the document ID information. Subsequently, the location in the document at which the matching has been found is discriminatively determined by utilizing the start position information Xs and the end position information Xe contained in the match term information, whereon the location as determined is displayed in a reverse color. More specifically, the color of the character indicated by Xs is reversed from white to black or vice versa and the color of the character indicated by Xe is reversed from black to white or vice versa, as a result of which the term in the document for which the match or coincidence with the search term has been found can be displayed in a distinct color.

In the foregoing, the character string matcher circuit 200 has been described in detail.

Next, operation of the character string circuit 200 will be explained in conjunction with a concrete example. It is first assumed, by way of example, that there is given a search query statement which reads as follows:

"Q=((文書 [4C] 理解) [S] システム) [AND] (文書 [S] 検索)" (7-1)

In the case of the instant example, five search term information "T1: 文書", "T1: 理解", "T3: 検索", "T4: システム" and "S1: ·" are supplied from the search control circuit 101 to the term comparator 210, wherein the lengths of these search terms are placed in the search term length table. At this juncture, it can be understood that T1, T2, T3, T4 and S1 represent the match term identifiers for the search terms "文書", "理解", "検索", "システム" and "°", respectively. The search term information "S1: °" commands detection of "°" as the field identifying character string (hereinafter referred to as "context marker") for a sentence in correspondence to the designation of the sentence as the field by the contextual condition "[S]".

It is again assumed that the input text reads as follows:

"...文書理解を用いた検索システムである...." (7-2)

Figure 16:
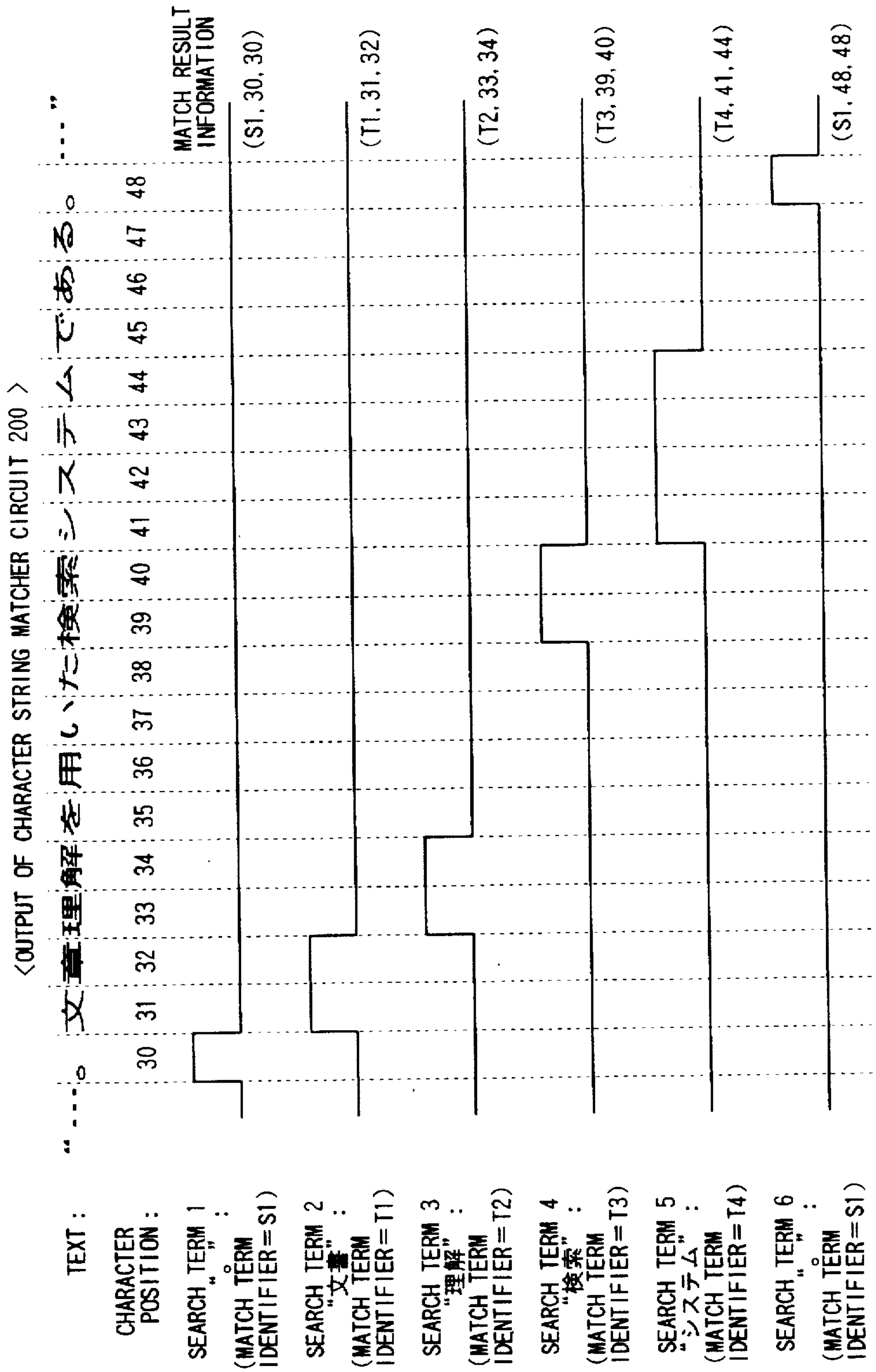

The document identifier is assumed to be presented by D1. In response to the inputting of the document data mentioned above, the character string matcher circuit 200 outputs, as the matching result 205, the match result-information mentioned below and illustrated in FIG. 16.

| | |
|---|---|
| (D1, 0, 0) | (8-1) |
| (S1, 30, 30) | (8-2) |
| (T1, 31, 32) | (8-3) |
| (T2, 33, 34) | (8-4) |
| (T3, 39, 40) | (8-5) |
| (T4, 41, 44) | (8-6) |
| (S1, 48, 48) | (8-7) |

The expression (8-1) represents the document ID information, in which D1 represents the document identifier and two succeeding terms represent constants each of "0" (zero).

The expressions (8-2) and (8-7) represent the match term ID information of the field or context marker ".". The expression (8-3) represents the match term ID information of "文書". Similary, the expression (8-4), (8-5) and (8-6) represent the match term ID information of "理解", 検索" and "システム", respectively. In these expressions, S1, T1, T2, T3 and T4 represent the match term identifiers of ".", "文書", "理解", "検索" and "システム", respectively.

The match result information 205 given by (8-1) to (8-7) is sent to the compound condition decision circuit 300 as the inputs thereto.

Now, description is turned to the condition decision processing performed by the compound condition decision circuit 300.

As shown in FIG. 8, the compound condition decision circuit 300 includes three microcomputer MPUa301, MPUb302 and MPUc303. The microcomputer MPUa301 executes a proximity condition decision program 310. The microcomputer MPUb302 executes a contextual condition decision program 320. The microcomputer MPUc303 executes a logical condition decision program 330. Further, interposed between these microcomputers are buffers 350, 360 and 370 each constituted by a first-in/first-out memory (hereinafter also referred to as FIFO in abbreviation) which serves for data transfer between the microcomputers MPU.

First, the decision processing performed by the proximity condition decision program 310 will be described. The proximity condition decision program 310 reads out the match result information 205 loaded in the buffer 350 from the character string matcher circuit 200 and makes decision as to whether the proximity condition designated by the search query information 202 is satisfied or not.

As an example of the proximity condition, there may be mentioned the query statement "文書 [4C] 理解" of the expression (7-1). This query statement "文書 [4C] 理解" commands that a document be searched in which two search terms "文書" and "理解" appear in this order and in which these two search terms are in such proximity to each other that they are distanced by no more than four characters. In this conjunction, the search query statement may be considered as a kind of operation formula. Accordingly, the term "文書" may be referred to as a front operand Ta with the term "検索" being termed a rear operand Tb, while "[4C]" is referred to as the operation. Further, the identifier representing the proximity condition now under consideration is represented by "Pi". The identifier "Pi" is assigned a code which can be distinguished from that of the match term identifier. By the definition mentioned above, the proximity condition can be described as "Pi: Ta [nC] Tb". In the description which follows, this definition is adopted.

It should be recalled that there are other types of operations for the proximity conditions such as those mentioned below.

"Pi: Ta [nC, mC] Tb"

"Pi: Ta <nC>Tb"

"Pi: Ta [nc] Tb"

"Pi: Ta [nc, mc] Tb"

"Pi: Ta <nc>Tb"

Figure 17:
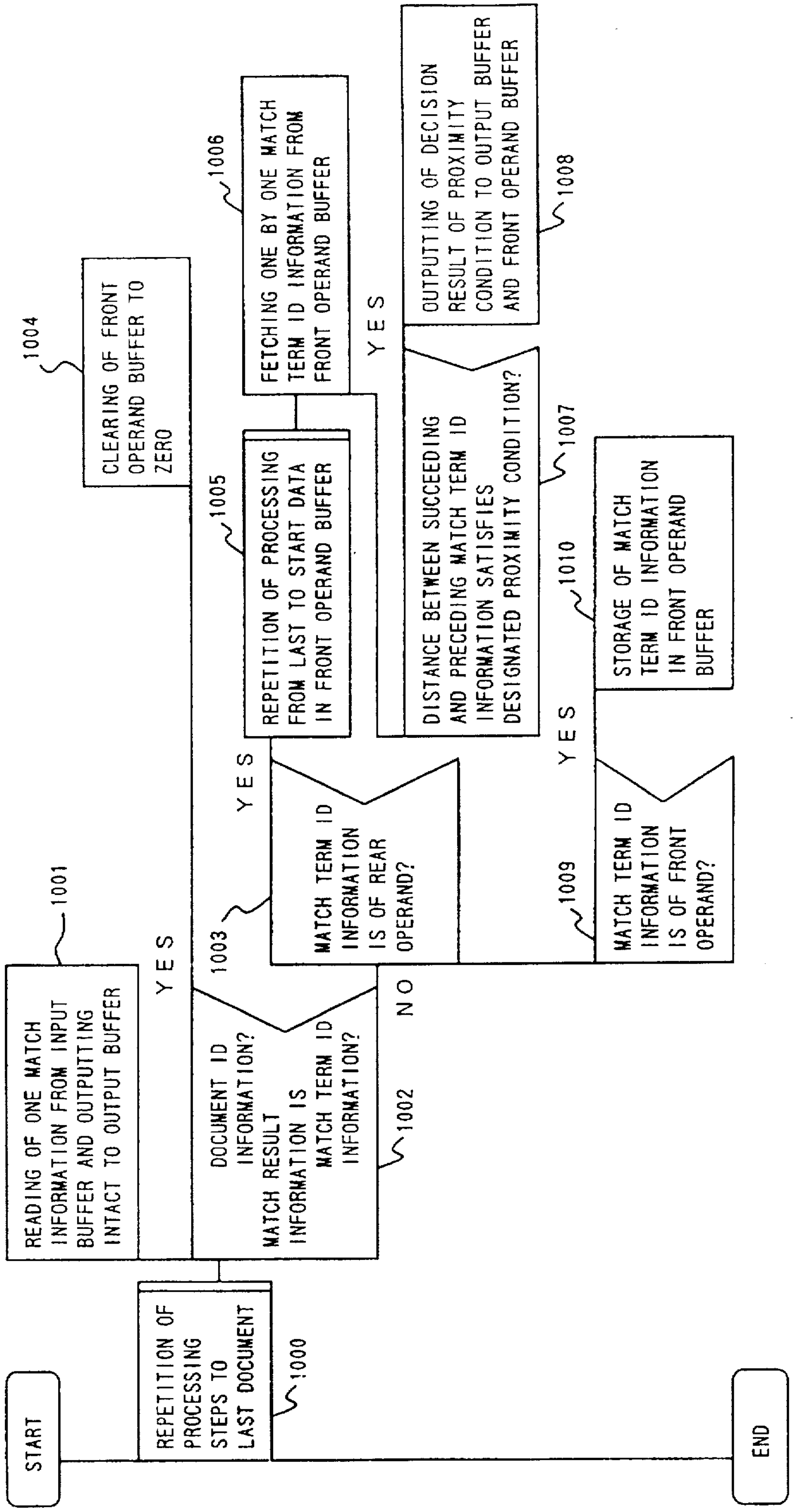

A proximity condition processing procedure will now be described in detail by reference to FIG. 17.

In a repetition (loop) processing step 1000, steps 1001 to 1010 are repeatedly executed until all the match result information 202 stored in the buffer 350 have completely been read out, including that for the last document.

In the match result information read processing step 1001, one piece of match result information 205 is read out from the buffer 350 to be transferred to the buffer 360.

In the match result information processing step 1002, it is checked whether the match result information 205 fetched in the match result information read processing step 1002 is the document identifier information or the match term identifier information. When 32 LSBs (less significant bits) of the match result information represent "0" (zero), the match result information 205 is decided to be the document identifier. In that case, an initialization step 1004 is executed on a document-by-document basis. Through this initialization processing, the front operand buffer 31 is cleared to zero to be used as a work area. On the other hand, when the match result information 205 is decided to be the match term identifier information, a rear operand identifying processing step 1003 is executed.

In the rear operand identifying processing step 1003, the match term identifier contained in the match term ID information is checked to determine whether or not the match term satisfies the proximity condition as the rear operand. To this end, the distance to the match term ID information stored in the front operand buffer 311 mentioned later is determined to decide whether the designated proximity condition is satisfied or not.

Hereinafter, the match term ID information concerning the search term designated as the front operand will be referred to as the front match term ID information, while the match term ID information concerning the search term designated as the rear operand will be referred to as the rear match term ID information.

In a front operand buffer repetition processing step 1005, decision is made concerning the proximity condition for the front match term ID information stored-in the front operand buffer 311 and the rear match term ID information designated as the rear operand. In this proximity condition decision, the front match term ID information is read out from the front operand buffer 311 in a front match term ID information read processing step 1006. Next, in a proximity condition decision processing step 1007, it is decided whether the designated proximity condition is satisfied or not by comparing the front match term ID information as read out with the rear match term ID information. When the proximity condition is satisfied, the result of the decision is output as the match result information to the buffer 360 and the front operand buffer 311.

In the front operand identifying processing step 1009, the match term identifier of the match term ID information designated as the front operand as well as the match term ID information of the match term designated as the rear operand is output to the front operand buffer 311. This is because there may arise a situation in which two proximity conditions such as "Pi: Ta [nC] Tb" and "Pj: Tb [nC] Tc", for example, are designated concurrently. In that case, since the term "Tb" is designated not only as the rear operand but also as the front operand, both the rear operand identifying processing step 1003 and the front operand identifying processing step. 1009 are required for the term "Tb". To this end, the rear operand identifying processing step 1003 and the front operand identifying processing step 1009 are performed separately from each other.

By repeatingly executing the processing steps mentioned above on the match result information stored in the buffer 350, the proximity condition decision processing can be realized.

The processing procedures outlined above will be explained in more detail in connection with a specific example. It is assumed that the search query condition as given reads "Q=((文書 [4C] 理解) [S] システム) [AND] (文書 [S] 理解)" as in the case of the statement (7-1) mentioned hereinbefore. For each of the condition decision programs, the individual query condition statements are set separately, respectively, resulting from the analysis performed by the search control circuit 101. More specifically, the proximity condition decision program 310 is supplied with a proximity condition part "文書 [4C] 理解" of the instant query condition statement (7-1) in the form of "P1: T1 [4C] T2", where P1 represents the proximity condition identifier with T1 and T2 representing the search term identifiers for "文書" and "理解", respectively.

Figure 19:
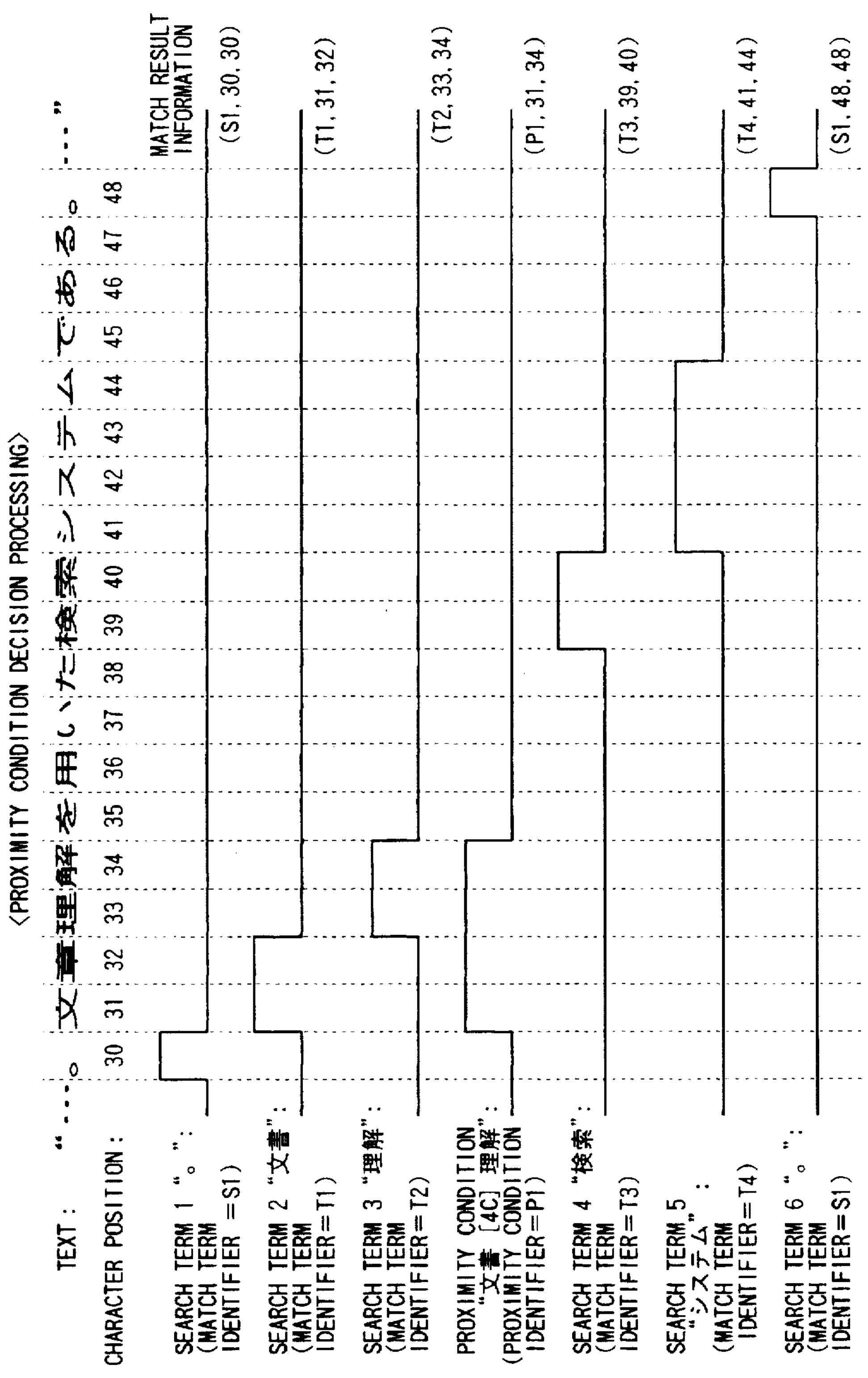

Assuming now that a text (7-2) reading ". . . 文書理解を用いた検索システムである . . . ."

is input, the character string matcher circuit 200 outputs to the buffer 350 the match result information (8-1) to (8-7) illustrated in FIG. 19 and mentioned below.

| | |
|---|---|
| (D1, 0, 0) | (8-1) |
| (S1, 30, 30) | (8-2) |
| (T1, 31, 32) | (8-3) |
| (T2, 33, 34) | (8-4) |
| (T3, 39, 40) | (8-5) |
| (T4, 41, 44) | (8-6) |
| (S1, 48, 48) | (8-7) |

The expression (8-1) represents the document ID information, wherein D1 represents the document identifier, and (8-2) and (8-7) represent the match term ID information for "。". The expressions (8-3), (8-4), (8-5) and (8-6) represent the match term ID information for "文書", "理解", "検索" and "システム", respectively. Further, S1, T1, T2, T3 and T4 represent the match term identifiers for "。", "文書", "理解", "検索" and "システム", respectively.

Figure 18A:
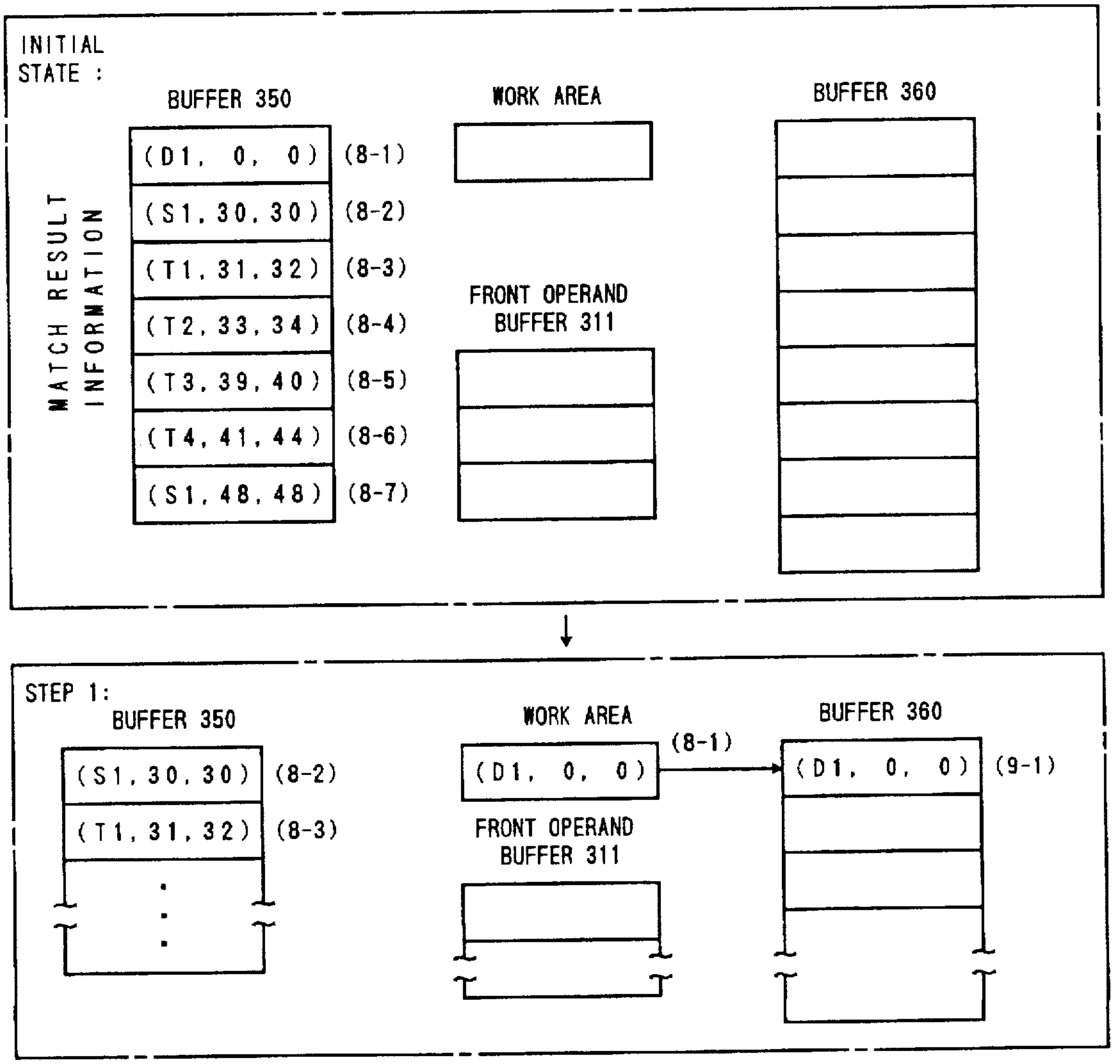
Figure 18B:
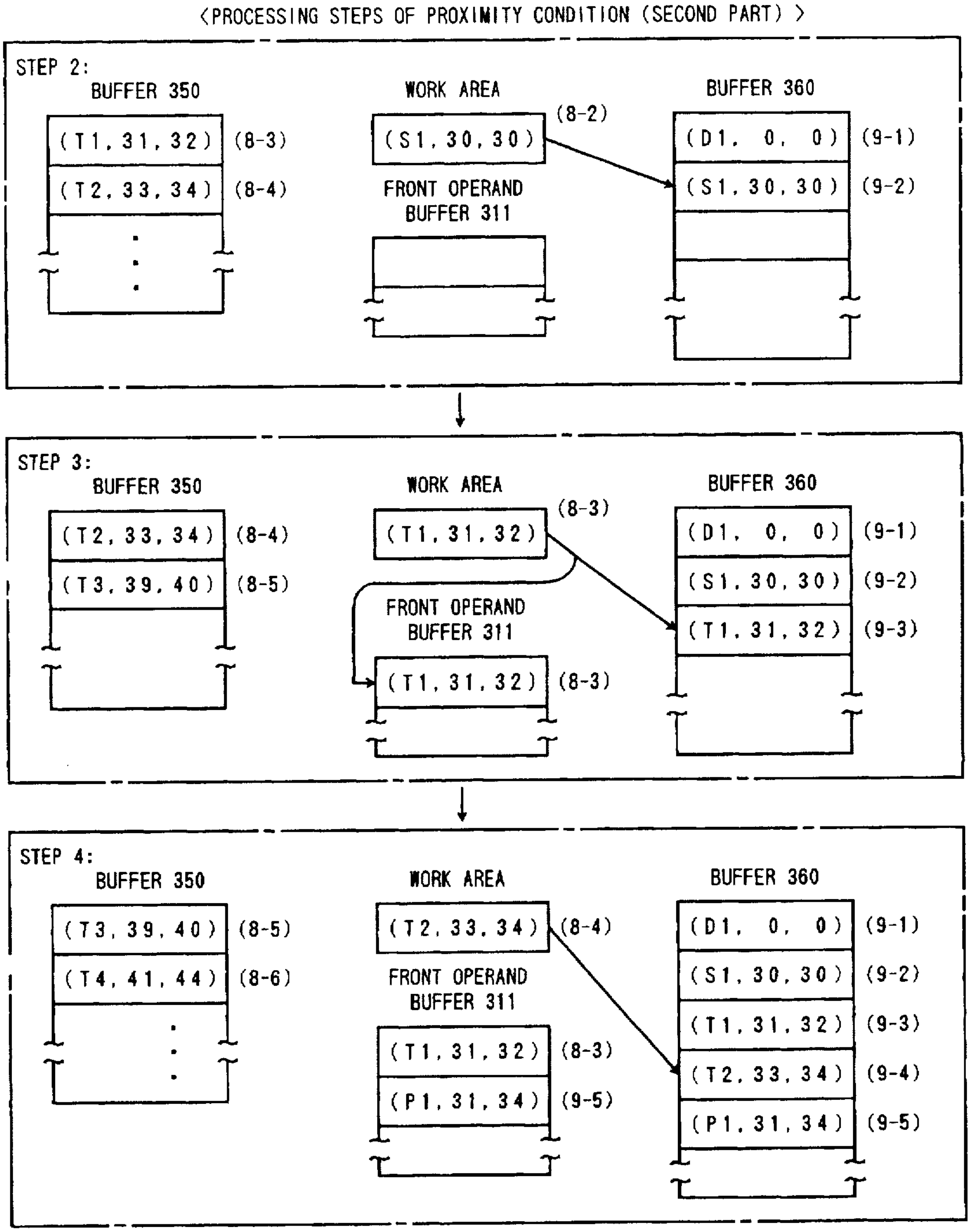

Based on these conditions, description will be made stepwise of the proximity condition decision processing by referring to FIG. 17. In the initial state, the match result information (8-1) to (8-7) are stored in the buffer 350, while the front operand buffer 311 and the buffer 360 are cleared to zero, as illustrated in FIGS. 18A and 18B.

Upon execution of the proximity condition decision processing program, the match result information 205 is read out from the buffer 350 one by one, whereby the decision processing is performed for the proximity condition "P1: T1 [4C] T2".

In a first step, the read or fetch processing step 1001 (step 1 in FIG. 17) is executed, as a result of which the match result information (8-1), i.e. (D1, 0, 0), is loaded in the work area of the program, as shown in a step 1 of FIG. 18A, to be subsequently output intact to the buffer 360 as the match result information. Next, a match result information identifying processing step 1002 (FIG. 17) is executed to check whether or not the match result information (D1, 0, 0) is the document ID information. Since two rear terms of the match result information (D1, 0, 0) are both "0" (zero), i.e. since the 32 LSBs (less significant bits) are "0" (zero), the match result information (D1, 0, 0) is determined to be the document ID information. Thus, the initialization step 1004 is executed, whereby the front operand buffer 311 constituting an internal work area is cleared to zero.

Subsequently, in a second step (step 2 in FIG. 18B), the match result information read or fetch processing step 1001 (FIG. 17) is again executed, as a result of which the match result information (8-2), i.e. (S1, 30, 30) is fetched to be loaded straightforwardly in the buffer 360. Subsequently, the match result information identifying processing step 1002 (FIG. 17) is executed to thereby check whether the match result information (8-2) represents the document ID information or the term ID information. Since 32 LSBs of this match result information (S1, 30, 30) are not "0" (zero), it is decided that the match result information (8-2) is not the document ID information but the match term ID information. Subsequently, in the rear operand identifying processing step 1003 (FIG. 17), it is checked whether or not the match term ID information corresponds to the term designated as the rear operand in the proximity condition.

The search term designated as the rear operand of the proximity condition "P1: T1 [4C] T2" is T2, which does not coincide with the rear operand of the match term S1 under consideration. Accordingly, the processing-steps 1005 to 1008 are not executed but the front operand identifying processing step 1009 is executed. In this processing step 1009, it is checked whether or not the match term ID information (8-2) mentioned above corresponds to the term designated as the front operand in the proximity condition "P1: T1 [4C] T2". Since the match term of concern is S1 and does not coincide with the front operand, the processing step 1010 is not executed. Thus, the processing comes to an end without storing the match term in the front operand buffer 311.

In a third step (step 3 in FIG. 18B), the read processing 1001 of the loop 1000 is executed, whereby the third match result information (8-3) or (T1, 31, 32) is fetched to be loaded in the buffer 360 as in the case of the second match result information. At the same time, the match result information identifying processing step 1002 is executed to check whether the match result information (T1, 31, 32) is the document ID information or the match term ID information. Since this match result information (8-3) is the match term ID information, the rear operand identifying processing step 1003 is executed, which is then followed by execution of the front operand identifying processing step 1009, because the match term is irrelevant to the rear operand. Since the match term ID information (8-3) or (T1, 31, 32) is designated as the front operand in the proximity condition "P1: T1 [4C] T2", a front operand storage processing step 1010 is executed, whereby the match term ID information (8-3) is stored in a front operand buffer 311, as is illustrated in FIG. 18B.

In a fourth step (step 4 in FIG. 18B ), the read processing 1001 is executed through the repetition loop 1000, whereby the fourth match result information (8-4) or (T2, 33, 34) is fetched to be loaded in the buffer 360 as in the case of the third match result information. Subsequently, the match result information identifying processing step 1002 is executed to check whether the match result information (T2, 33, 34) is the document ID information or the match term ID information. Since this match result information (8-4) is the match term ID information, the rear operand identifying processing step 1003 is executed.

Since the match term ID information (8-4) or (T2, 33, 34) is designated as the rear operand of the proximity condition "P1: T1 [4C] T2", the proximity condition decision processing including processing steps 1005 to 1008 is executed. At first, the front operand buffer read processing step 1006 is executed to fetch the front match term ID information (8-3) stored in the front operand buffer 311. Subsequently, the proximity condition decision processing step 1007 is executed to check the inter-term distance between the front match term ID information (8-3) and the rear match term ID information (8-4). Because the end position Xe of the front match term ID information (8-3) or (T1, 31, 32) is "32", while the start position of the rear match term ID information (8-4) or (T2; 33, 34) is "33", it is decided that the distance of concern given in the terms of a number of intervening characters is zero. This means that the designated condition that the distance not be greater than four characters is satisfied. Consequently, the decision result output processing step 1008 is executed, as a result of which there is output to the front operand buffer 311 and the buffer 360, the proximity condition ID information (P1, 31, 34) containing the start position "31" which corresponds to that of the information (8-3), the end position "34" which corresponds to that of the information (8-4) and the match term identifier P1, as is shown in FIG. 19. Also refer to the step 4 shown in FIG. 18B.

Furthermore, through the repetition or loop processing 1000, the fetch processing step 1001 is executed, whereby the fifth match result information (8-5) or (T3, 39, 40) is fetched to be loaded in the buffer 360 as in the case of the fourth match result information. Subsequently, the match result information identifying processing step 1002 is executed to check whether the match result information (T3, 39, 40) is the document ID information or the match term ID information. Since this match result information (8-5) is not designated in the proximity condition, neither the rear operand identifying processing step 1003 nor the front operand identifying processing step 1009 is executed, but a succeeding proximity condition decision processing is started.

In succession, the proximity condition decision processing is repetitively carried out in similar manner up to the last match term information (8-7).

Through the proximity condition decision processing described above, the match term ID information (9-1) to (9-8) illustrated in FIG. 19 and mentioned below are stored in the buffer 360 (FIG. 18B).

| | |
|---|---|
| (D1, 0, 0) | (9-1) |
| (S1, 30, 30) | (9-2) |
| (T1, 31, 32) | (9-3) |
| (T2, 33, 34) | (9-4) |
| (P1, 31, 34) | (9-5) |
| (T3, 39, 40) | (9-6) |
| (T4, 41, 44) | (9-7) |
| (S1, 48, 48) | (9-8) |

At this juncture, it should be noted that the proximity condition decision result (9-5) is stored as the match term ID information, in the ascending order of the end position information. By virtue of this feature, the processing for checking all the combinations of the field and the match terms with regard to the inclusion relation can be spared in the contextual condition decision processing described below, whereby overhead as involved can correspondingly be reduced.

The match term ID information mentioned above is supplied to the contextual condition decision program 320.

Next, description will be made of the decision processing performed by the contextual condition decision program 320.

In execution of the contextual condition decision program 320, the match result information sent to the buffer 360 from the proximity condition decision program 310 is read out to be checked as to whether it satisfies the contextual condition designated in the search query information 202.

As an example of the contextual condition, there may be mentioned the search query statement (7-1) reading "文書 [S] 検索". This statement commands that such a document be searched in which two search terms "文書" and "検索" make appearance in a same sentence in this order.

In this conjunction, the identifier of the contextual condition is hereinafter referred to as the contextual condition identifier and represented by Ci. This identifier Ci is assigned with a code which can be discriminated from the match term identifier. Based on these definitions, the contextual condition may be described as "Ci: Ta [S] Tb". The following description will be made on the basis of these definitions.

As other examples of the contextual condition, there may be mentioned:

"Ci: Ta [P] Tb",

"Ci: Ta [PH] Tb",

"Ci: Ta [p] Tb",

"Ci: Ta [s] Tb",

"Ci: Ta [ph] Tb"

Figure 20:
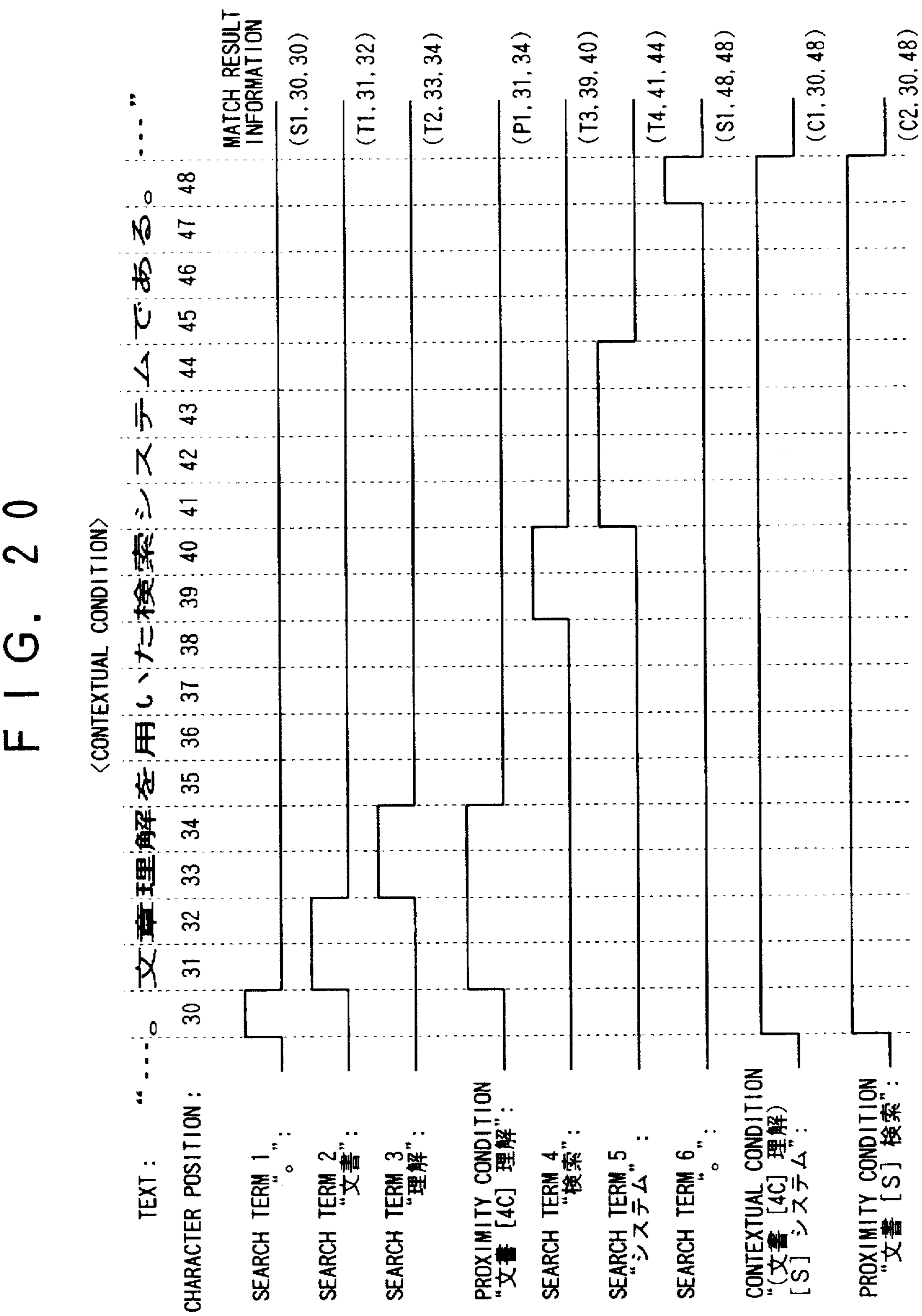

The concept underlying the contextual condition will be described on the assumption that the outputs of the proximity condition decision processing are those exemplified in FIG. 20. Assuming, by way of example, that a text reading "....文書理解を用いた検索システムである...." (7-2) is loaded, then the information (9-1) to (9-8) mentioned below is sent to the contextual condition decision processing program 320 from the proximity condition decision program 310 via the buffer 360.

| | |
|---|---|
| (D1, 0, 0) | (9-1) |
| (S1, 30, 30) | (9-2) |
| (T1, 31, 32) | (9-3) |
| (T2, 33, 34) | (9-4) |
| (P1, 31, 34) | (9-5) |
| (T3, 39, 40) | (9-6) |
| (T4, 41, 44) | (9-7) |
| (S1, 48, 48) | (9-8) |

The expression (9-1) represents the document ID information, wherein D1 represents the document identifiers and two succeeding parameters represent "0" (zero), respectively.

The expressions (9-2) and (9-8) represent the match term ID information for the context marker "。". Similarly, the expressions (9-3), (9-4), (9-6) and (9-7) represent the match term ID information of "文書", "理解", "検索" and "システム", respectively, wherein S1, T1, T2, T3 and T4 represent the match term identifiers for "。", "文書", "理解", "検索" and "システム", respectively. Further, the expression (9-5) represents the proximity condition ID information for the matched proximity condition "文書 [4C] 理解", wherein P1 represents the proximity condition identifier for the proximity condition "文書 [4C] 理解".

On the basis of the match information mentioned above, a concurrence decision is first executed concerning the contextual condition "Ci: Ta [S] Tb" in which the sequential order of the match term identifiers is designated. In this conjunction, the identifier "Ta" will be referred to as the zeroth identifier with the identifier "Tb" being referred to as the first identifier.

The concurrence decision decides whether or not all the identifiers designated in the contextual condition occur. For determining whether the concurrence condition is satisfied or not, concurrence counters are used. The concurrence counters are provided in one-to-one correspondence to the designated contextual conditions.

A method of controlling the concurrence counter for the contextual condition in which the order of the match term identifiers is designated will be described below.

The sentence range or contextual range prescribed by the contextual condition "Ci: Ta [S] Tb" extends from the match result information (9-2) of the context maker "。" to the match result information (9-8) of the context maker "。" appearing in succession. Accordingly, the range of the sentence lies between the expressions (9-2) and (9-8) or between the match result information (S1, 30, 30) and (S1, 48, 48). Under the circumstances, the match result information is checked sequentially, starting from the expression (9-2) or the match result information (S1, 30, 30). When the context marker "。" appears, the cooccurrence counter is reset to "0" (zero), whereon it is checked whether the match result information designated in the contextual condition appears.

The value of the concurrence counter is not changed until the zeroth identifier "Ta" contained in the contextual condition appears. In other words, in the state in which the value of the concurrence counter is "0" (zero), appearance or occurrence of the zeroth identifier "Ta" is monitored. Upon appearance of the match result information for this identifier "Ta", the concurrence counter is incremented. Namely, the value of the concurrence counter is changed from "0" to "1".

Subsequently, in the state in which the value of the concurrence counter indicates "1", occurrence of the first identifier Tb designated in the contextual condition is monitored. Upon appearance of the first identifier "Tb", the value of the concurrence counter is incremented. Namely, the value of the concurrence counter is updated to "2" from "1". Incrementing of the concurrence counter value to "2" means that all the identifiers designated in the contextual condition under consideration have occurred. Thus, it can be decided that the concurrence condition is satisfied. In this manner, the concurrence decision for the contextual condition in which the order of occurrence of the match term identifiers is designated is performed by controlling or monitoring the concurrence counter.

Checking of the concurrence counter is performed at a time point when the succeeding context marker appears, as will be described hereinafter. Next, the match result information (9-8) or (S1, 48, 48) for the succeeding context marker occurs. At that time point, the concurrence counter has the count value of "2", which means that the identifiers of two, match terms designated in the contextual condition have appeared and that the concurrence condition is satisfied. Accordingly, the contextual condition ID information of the contextual condition thus satisfied is output. In that case, the start position information "30" of the preceding context marker "·" is set at the end position of the contextual condition ID information. Further, as the identifier of the contextual condition ID information, the identifier "Ci" of the contextual condition is set. In this manner, the contextual condition ID information of (Ci, 30, 48) is output.

Next, description will be turned to a concurrence counter control method for the contextual condition "Cj: Ta [s] Tb" where the order in which the match term identifiers occur is of no concern.

The range of the field or sentence extends from (9-2) to (9-8) or (S1, 30, 30) to (S1, 48, 48), as in the case of the contextual condition "Ci: Ta [S] Tb" described above.

Accordingly, the match result information (9-2) to (9-8) or (S1, 30, 30) to (S1, 48, 48) is sequentially checked, starting from (S1, 30, 30). Upon first appearance of the context marker "·", the concurrence counter is reset to zero, which is then followed by checking the occurrence of the match result information designated in the contextual condition. Upon appearance of the match result information of the identifier "Tb", the value of the concurrence counter is incremented. Namely, it is updated to "1" from "0". At this juncture, it should be mentioned that when the match result information of the identifier "Tb" having previously occurred appears again in the same field or sentence, the value of the concurrence counter is not changed.

Subsequently, upon occurrence of the match result information of the identifier "Ta", the value of the concurrence counter is updated from "1" to "2". This means that both identifiers designated in the contextual condition have appeared. Thus, it can be decided that the concurrence condition is satisfied. Thereafter, the value of the concurrence counter is not changed even when the match result information of the identifier "Ta" having already occurred appears again in the same field or sentence.

When the match result information (9-8) of (S1, 48, 48) for the succeeding context marker "·" takes place, the contextual condition ID information of the contextual condition under consideration is output, because the concurrence counter holds "2", meaning that the concurrence condition is satisfied. Thus, the contextual condition ID information (Cj, 30, 48) is output. By controlling the concurrence counter in this manner, it is possible to make concurrence decision for the contextual condition in which the order of occurrences of the term identifiers is of no concern.

As will be understood from the foregoing, the concurrence decision can be effectuated by controlling the concurrence counter in the manner described above.

Figure 21:
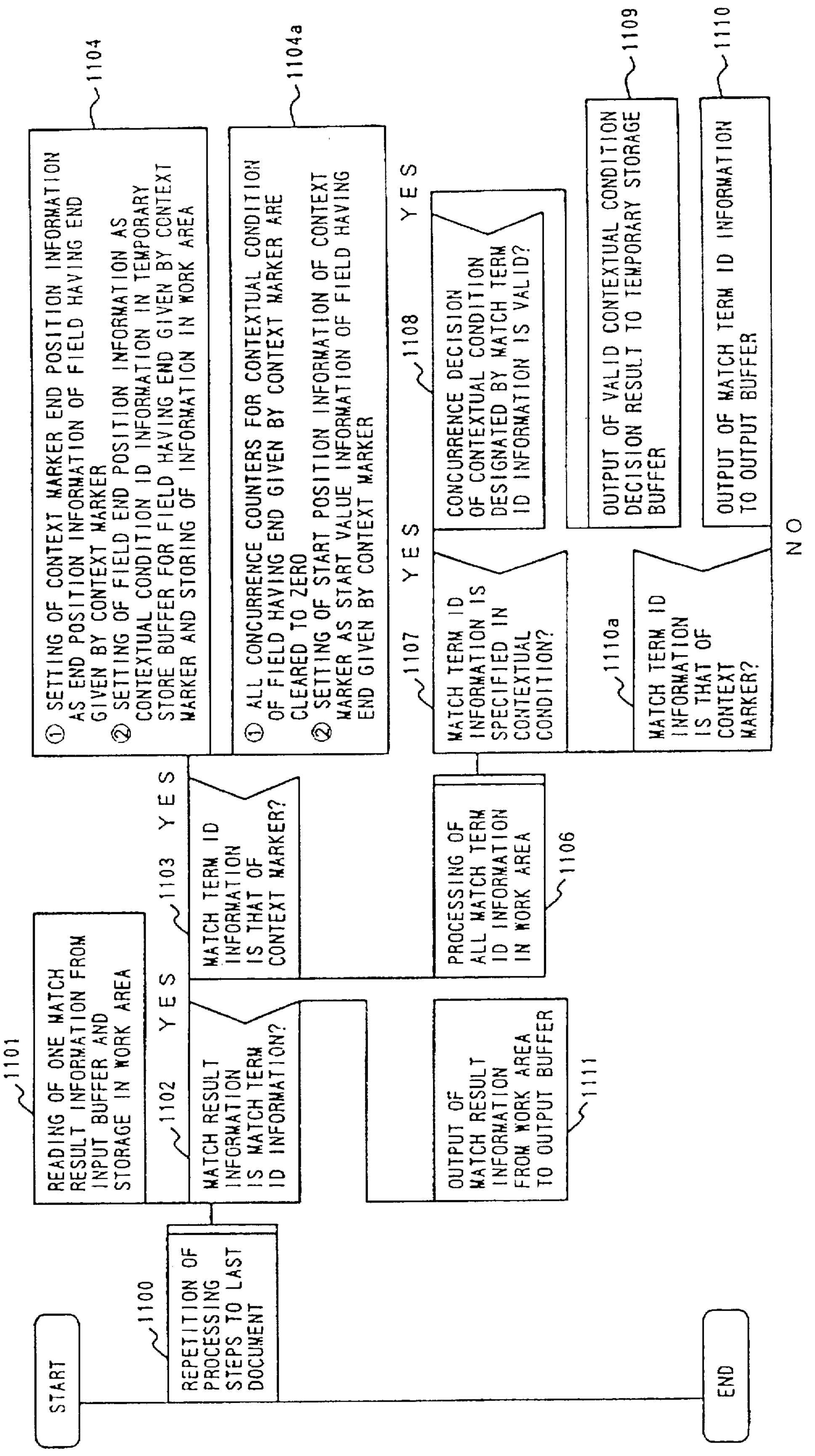

A contextual condition processing procedure will now be described in detail by reference to FIG. 21.

In a repetition or loop processing step 1100, steps 1101 to 1112 are repeatedly executed until all the match result information stored in the buffer 360 have completely been read out, including that for the last document.

In the match result information fetch processing step 1101, one piece of match result information is read out from the buffer 360 to be transferred to a work area.

In the match result information processing step 1102, it is checked whether or not the match result information fetched in the match result information read processing step 1101 is the match term ID information. Namely, when 32 LSBs (less significant bits) of the match result information are not "0" (zero), the match result information is determined to be the match term identifier. In that case, a context marker identifying processing step 1103 is executed for detecting the context marker. For information other than the match term ID information, a match result information output processing step 1112 is executed for outputting the match result information to the buffer 370.

In the field marker identifying processing step 1103, the match term identifier contained in the match term ID information is checked to decide whether or not it is the context marker designated in the contextual condition. When the match term identifier represents the context marker, a post-processing step 1104 is executed.

In the post-processing step 1104, the end position information of the field or sentence undergone the concurrence decision processing described previously is stored in the work area. This field ID information is output to a buffer 370 in a match term ID information processing step 1110, which will be described hereinbefore.

Subsequently, a pre-processing step 1104*a* is executed for making preparation of execution of the concurrence decision to a succeeding sentence for which the context marker now under consideration constitutes the punctuation mark. First, the concurrence counter for the contextual condition concerning the field or sentence having the instant context marker as the punctuation mark is reset to zero. Further, the start position information of the instant context marker is set as the start position information of the field or sentence having the punctuation mark given by the instant context marker.

The reason for executing again the contextual condition decision by storing the contextual condition ID information in the work area is to take into consideration a nest structure of the contextual condition. The term "nesting", is intended to indicate a statement structure in which a contextual condition designates another contextual condition, as exemplified by "Cj: (Ta [s] Tb) [p] Tc", commanding that a document be searched in which two search terms "Ta" and "Tb" appear in a same sentence regardless of the order of occurrence thereof and in which this sentence and a search term "Tc" appear in a same paragraph regardless of the order of occurrence thereof.

In a decision procedure to this end, the contextual condition mentioned above is divided or separated into:

"Ci: Ta [s] Tb", and

"Cj: Ci [p] Tc"

whereon the designated contextual condition (nested contextual condition), i.e. the contextual condition concerning the sentence included in the paragraph and given by "Ci: Ta [s] Tb" in the case of the abovementioned example is first checked.

Assuming that the contextual condition for this sentence is satisfied, the contextual condition ID information of the sentence is stored in a temporary storage buffer. Subsequently, at the time when the context marker of this sentence appears, the end position information is set at the contextual condition ID information of this sentence to thereby complete the contextual condition ID information The contextual condition ID information of this sentence is stored in the work area, while the nesting contextual condition which designates the contextual condition nested therein, i.e. the contextual condition "Cj: Ci [p] Tc" concerning the paragraph in the case of the abovementioned example, is subjected to the decision processing. Assuming that the match term ID information of the match term identifier "Tc" appears in succession, the decision is then made that the contextual condition for the paragraph is satisfied, as a result of which the contextual condition ID information of that paragraph is stored in the temporary storage buffer. Thereafter, upon appearance of the context marker of the paragraph, the end position information is placed in the contextual condition ID information of that paragraph to thereby complete the contextual condition ID information. Through the processing described above, the nest contextual condition "Cj: (Ta [s] Tb) [p] Tc" is realized.

After execution of the context marker identifying processing step 1103, a work area loop processing step 1106 is executed. In this loop step 1106, the concurrence decision processing steps 1107 to 1110 are repeatedly executed for all the match term ID information stored in the work area through the match result information read processing step 1101 and the post-processing step 1104.

In a contextual condition designation identifying processing step 1107, designation as the contextual condition is checked on the basis of the match term identifiers of the match term ID information stored in the work area. Upon determination as the designated contextual condition, the concurrence decision processing step 1108 is executed to check whether or not the value of the concurrence counter incremented every time the match term identifier designated in the contextual condition makes appearance in the sentence is "2". The concurrence counter value of "2" indicates that two match term identifiers designated in the contextual condition have been found and that the contextual condition is satisfied. In that case, a temporary storage processing step 1109 is executed for storing the contextual condition identifier of the relevant contextual condition in the temporary storage buffer 321.

Subsequently, a context marker identifying processing step 1110*a* is executed, whereon the match term ID information output processing step 1110 is executed unless the information is the match term ID information of the context marker. In the case of the illustrated embodiment, the match term ID information is output to the buffer 370.

By repeatedly executing the individual processing steps described above for the match result information stored in the buffer 360, the contextual condition decision processing can be realized.

The processing procedures outlined above will be explained in more detail in connection with a specific example. It is assumed that the query condition reads "Q=((文書 [4C] 理解) [S] システム) [AND] (文書 [s] 検索)"

given by the expression (7-1) mentioned hereinbefore. For each of the condition decision programs, the individual condition statements are set separately, respectively, which result from the analysis performed by the search control circuit 101.

More specifically, the contextual condition decision program 320 is supplied with contextual condition parts "文書 [4C] 理解" and "シス [s] テム" of the instant query condition statement (7-1) In this case, the contextual condition "(文書 [4C] 検索) [s] システム" is represented in the form of "C1: P1 [S] T3", where P1 represents the identifier of the proximity condition "文書 [4C] 理解", T3 represents the search term identifier of "システム" and C1 represents the identifier of the contextual condition.

Similarly, the contextual condition "文書 [s] 文書" is given in the form of "C2: T1 [s] T4", where C2 represents the identifier of the contextual condition, and T1 and T4 represent the search term identifiers of "文書" and "検索", respectively.

Assuming now that a text (7-2) reading ". . . · 文書理解を用いた検索システムである · . . . " input, the proximity condition decision program 310 outputs to the buffer 360 the match result information (9-1) to (9-8) illustrated in FIG. 18 and mentioned below.

| | |
|---|---|
| (D1, 0, 0) | (9-1) |
| (S1, 30, 30) | (9-2) |
| (T1, 31, 32) | (9-3) |
| (T2, 33, 34) | (9-4) |
| (P1, 31, 34) | (9-5) |
| (T3, 39, 40) | (9-6) |
| (T4, 41, 44) | (9-7) |
| (S1, 48, 48) | (9-8) |

In the case of the instant example now under consideration, it is decided whether or not the contextual condition "(文書[4C] 理解) [S] システム" and the contextual condition "文書 [s] 検索" are satisfied in a sentence punctuated by punctuation marks given by the context marker match result information (9-2) and (9-8), respectively.

Based on these assumptions, description will now be made of the contextual condition decision processing by referring to FIGS. 22A; 22B and 23A; 23B. In the initial state illustrated in FIGS. 22A and 22B, the match result information (9-1) to (9-8) are stored in the buffer 360, while a temporary storage buffer 321 and a buffer 370 are cleared to zero.

Upon execution of the contextual condition decision processing program 320, the match result information is read out from the buffer 360 one by one, whereon the decision processing is performed for the contextual conditions "C1: P1 [S] T3" and "C2: T1 [s] T4".

Figure 22B:
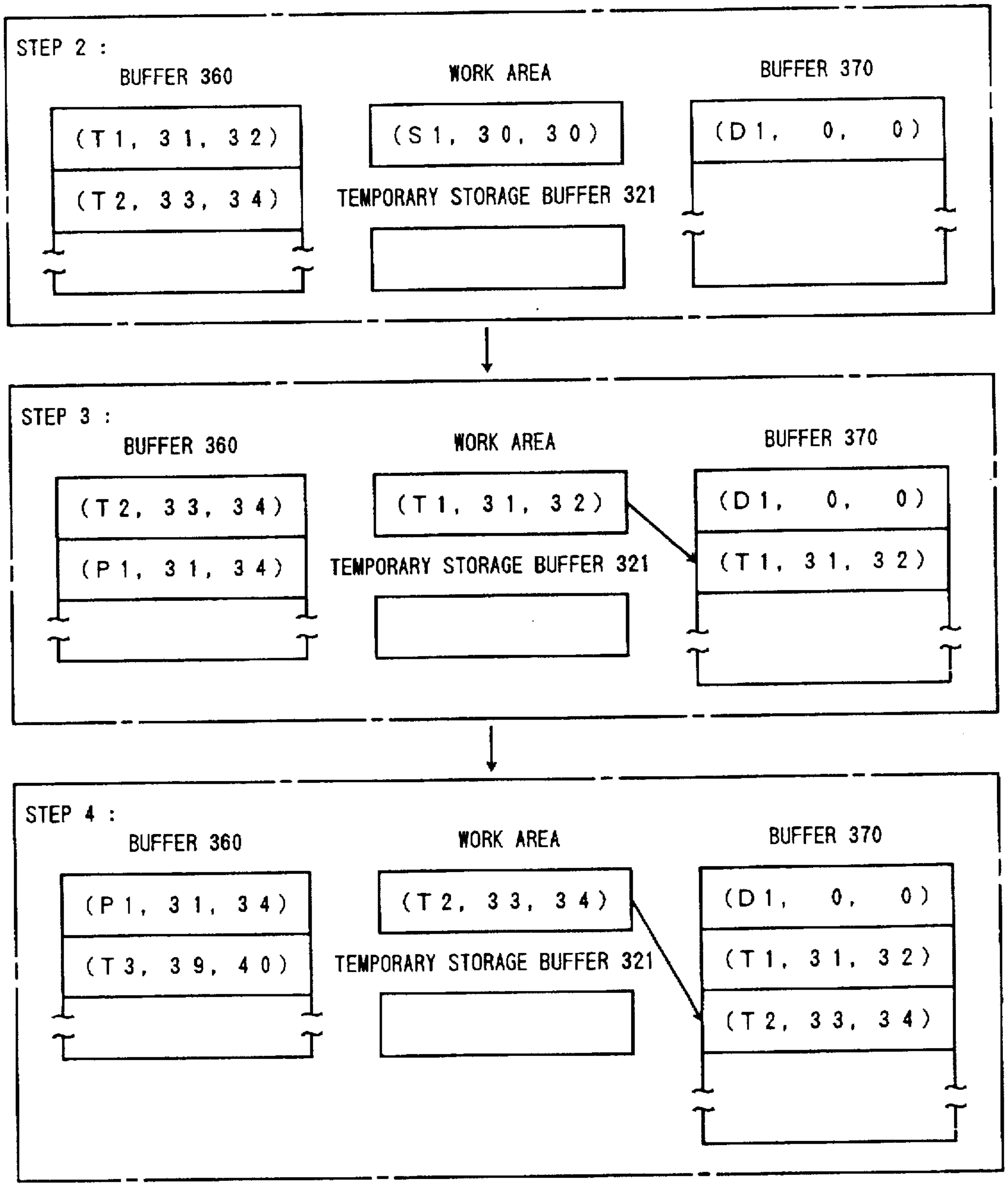

In a first step, a read or fetch processing step 1101 (shown in FIG. 21) is executed, as a result of which the match result information (9-1), i.e. (D1, 0, 0), is loaded in the work area of the program, as shown in the step 1 of the FIGS. 22A and 22B. Next, a match result information identifying processing step 1102 is executed to check whether or not the match result information (9-1), i.e. (D1, 0, 0), is the match term ID information. Since two rear terms of the match result information (D1, 0, 0) are both "0" (zero), i.e. since the 32 LSBs are "0" (zero), the match result information is decided to be the document ID information. Accordingly, because the match result information (D1, 0, 0) is not the match term ID information it is decided in a contextual marker identifying processing step 1110*a* that the match result information is irrelevant to the contextual marker. Consequently, a succeeding step of match result information output processing 1110 is executed, whereby the match result information is output intact to the buffer 370.

In a second step, the match result information read processing step 1101 is again executed, as a result of which the match result information (9-2), i.e. (S1, 30, 30), is fetched. Next, the match result information identifying processing step 1102 is executed to thereby check whether the match result information (S1, 30, 30) represents the match term ID information. Since 32 LSBs of this match result information (S1, 30, 30) are not "0" (zero), it is decided that the match result information of concern is not the document ID information but the match term ID information. Subsequently, in the context marker identifying processing step 1103, it is checked whether or not the match term ID information corresponds to the context marker designated in the contextual condition. Since the match term identifier S1 of the match result information (S1, 30, 30) corresponds to "." designated by the context marker, a post-processing step 1104 is executed.

In the post-processing step 1104, the end position information of the sentence having a punctuation mark represented by the context marker S1 is set. Subsequently, it is checked whether or not the match result information is stored in the temporary storage buffer 321. When the information is found as stored, all the contents of the buffer 321 are placed in the work area. In this conjunction, it is to be noted that the temporary storage buffer 321 stores as the match result information the contextual condition ID information corresponding to the designated contextual condition, as will be described later on. Since no match result information is stored in the buffer 321 at this time point, no information transfer to the work area is effectuated.

Thereafter, pre-processing 1104*a* is executed, whereby concurrence counters a and b corresponding to the contextual conditions for the sentence, that is "C1: P1 [S] T3" and "C2: T1 [s] T4", respectively, are set to zero. Next, the start position information "30" of the context marker S1 is set as the sentence start position information.

Now, a work area repetition (loop) processing step 1106 is executed. In the case of the instant example, the match term identifier "S1" is not designated in the contextual condition. Consequently, the contextual condition identifying processing step 1107 is not executed. Further, a context marker identifying processing step 110*a* is executed. However, since the match term identifier "S1" is that for the context marker, a match term ID information output processing step 1110 is not executed. Thus, no match term ID information for the context marker is output to the buffer 370.

In a third step, the read processing step 1101 is executed through the loop processing step 1100, whereby the third match result information (9-3) or (T1, 31, 32) is fetched to be loaded in the work area. Subsequently, a match result information identifying processing step 1102 is executed to check whether or not the match result information (T1, 31, 32) is the match term ID information. Since this match result information (T1, 31, 32) is the match term ID information, the context marker identifying processing step 1103 is executed. The match term identifier T1 of the match term ID information (T1, 31, 32) differs from the match term identifier S1 of the context marker. Accordingly, no post-processing is executed. Instead, the work area repetition processing step 1106 is executed, whereon concurrence decision processing steps 1107 to 1110 are performed on the match term ID information stored in the work area. More specifically, in the contextual condition designation identifying processing step 1107, the match term identifier T1 of the match term ID information (T1, 31, 32) stored in the work area is checked as to whether it represents the match term designated in the contextual condition. Since the match term identifier T1 is designated in the contextual condition "C1: T1 [s] T4", the concurrence decision processing step 1108 is executed. Thus, the concurrence counter a associated with the contextual condition "C2: T1 [s] T4" is incremented, whereby the value of the concurrence counter a is updated from "0" to "1". However, the value of the concurrence counter a is not "2". This means that the concurrence condition is not satisfied. Next, the context marker identifying processing step 1110*a* is executed. However, since the match term ID information of the context marker is not identified, the match term ID information output processing step 1110 is executed, whereby the match term ID information (T1, 31, 32) is output to the buffer 370.

In a fourth step, the read processing step 1101 is executed in the repetition loop 1100, whereby the fourth match result information (9-4) or (T2, 33, 34) is fetched to be loaded in the work area. Subsequently, the match result information identifying processing step 1102 is executed to check whether or not the match result information (T2, 33, 34) is the match term ID information. Since the match result information (T2, 33, 34) contains the match term ID information, the context marker identifying processing step 1103 is executed. However, because the match term identifier of this match term ID information (T2, 33, 34) is not "S1", the post-processing step 1104 is not executed. Instead, through the work area loop processing step 1106, the contextual condition designation identifying processing steps 1107 is executed to check whether the match term ID information stored in the work area is designated in the contextual condition. Since the match term identifier T2 of the match term ID information (T2, 33, 34) stored in the work area is not designated in the contextual condition, the concurrence decision processing step 1108 is not executed. The match term ID information does not contain the context marker either. Accordingly, the match term ID information output processing step 110 is executed, as a result of which the match term ID information (T1, 33, 34) is output to the buffer 370.

In a fifth step, the read processing step 1101 is executed through the loop processing step 1100, whereby the fifth match result information (9-5) or (P1, 31, 34) is fetched to be loaded in the work area. Subsequently, the match result information identifying processing step 1102 is executed to check whether or not the match result information (P1, 31, 34) is the match term ID information. Since this match result information (P1, 31, 34) contains the match term ID information, the context marker identifying processing step 1103 is executed. The match term identifier of the match term ID information (P1, 31, 34) differs from the match term identifier S1. Consequently, the work area repetition or loop processing step 1106 is executed, whereon the concurrence decision processing steps 1107 to 1110 are performed on the match term ID information stored in the work area. More specifically, in the contextual condition designation identifying processing step 1107, the match term identifier P1 of the match term ID information (P1, 31, 34) stored in the work area is checked as to whether it represents the search term designated in the contextual condition. In this case, the value of the conccurrence counter b corresponding to the contextual condition "C1: P1 [S] T3" is "0", and the match term identifier P1 is designated as the zeroth match term identifier of the contextual condition "C1: P1 [S] T3". Consequently, the concurrence decision processing step 1108 is executed. Thus, the concurrence counter b is incremented, whereby the value of the concurrence counter b is updated from "0" to "1". However, the value of the concurrence counter b is not "2". This means that the concurrence condition is not satisfied. Further, the match term ID information of the context marker is not identified. Accordingly, the match term ID information output processing step 1110 is executed, whereby the match term ID information (P1, 31, 34) is output to the buffer 370.

Further, as a sixth step, the read processing step 1101 is executed in the loop processing step 1100, whereby the sixth match result information (9-6) or (T3, 39, 40) is fetched to be loaded in the work area. Subsequently, the match result information identifying processing step 1102 is executed to check whether or not the match result information (T3, 39, 40) contains the match term ID information. Since this match result information (T3, 39, 40) contains the match term ID information, the context marker identifying processing step 1103 is executed. However the match term identifier of the match term ID information (T3, 39, 40) is not the context marker. Accordingly, the post-processing is not executed. Instead, the work area repetition or loop processing step 1106 is executed, whereon the concurrence decision processing steps 1107 to 1110 are performed on the match term ID information stored in the work area. More specifically, in the contextual condition designation identifying processing step 1107, the match term identifier T3 of the match term ID information (T3, 39, 40) stored in the work area is checked as to whether it represents the search term designated in the contextual condition. In this case, the value of the concurrence counter b corresponding to the contextual condition "C1: P1 [S] T3" is "1", and the match term identifier T3 is designated as the first identifier of the contextual condition "C1: P1 [S] T3". Consequently, the concurrence counter b is incremented, whereby the value of the concurrence counter b is updated from "1" to "2". Because the concurrence counter b now assumes the value of "2", it is decided that the concurrence decision can be performed. To this end, a temporary storage processing step 1109 is executed, whereby the contextual condition ID information (C1, 30, Xe1) of the contextual condition "C1: P1 [S] T3" is stored in the temporary storage buffer 321. At this time point, the position information of the context marker for the rear punctuation mark of the sentence is not yet determined. Accordingly, the sentence end position information is set to "Xe1". The sentence end position information is established later on in the post-processing step 1104, when the match term ID information of the context marker appears. Since the match term ID information is not of the context marker, the match term ID information output processing step 1110 is executed, whereby the match term ID information (T3, 39, 40) is output to the buffer 370.

In a seventh step, the read processing step 1101 is executed in the loop or repetition processing step 1100, whereby the seventh match result information (9-7) or (T4, 41, 46) is fetched to be loaded in the work area. Subsequently, the match result information identifying processing step 1102 is executed to check whether or not the match result information (T4, 41, 46) is the match term ID information. Since this match result information (T4, 41, 46) contains the match term ID information, the context marker identifying processing step 1103 is executed. However, the match term identifier of the match term ID information (T4, 41, 46) is not the context marker. Accordingly, the post-processing is not executed, but the work area loop processing step 1106 is executed, whereon the concurrence decision processing steps 1107 to 1110 are performed on the match term ID information stored in the work area. In the contextual condition designation identifying processing step 1107, the match term identifier T4 of the match term ID information (T4, 41, 46) stored in the work area is checked as to whether it represents the search term designated in the contextual condition. In this case, the term identifier T4 is designated in the contextual condition "C2: T1 [s] T4". Consequently, the concurrence decision processing step 1108 is executed. At this time, the match term identifier T4 designated in the contextual condition "C2: T1 [s] T4" appears. Thus, the concurrence counter a is incremented, whereby the value of the concurrence counter a is updated from "1" to "2", meaning that the concurrence condition is satisfied. Accordingly, the temporary storage processing step 109 is executed, whereby the contextual condition ID information (C2, 30, Xe2) of the contextual condition "C2: T1 [s] T4" just satisfied is stored in the temporary storage buffer 321. Since the sentence end position information is not yet determined, the term Xe2 is set temporarily.

Thereafter, the match term ID information output processing step 1110 is executed to output the match term ID information (T4, 41, 46) to the buffer 370, since the match term ID information of concern is not that of the context marker.

Finally, in an eighth step, the match result information fetch processing step 1101 is again executed, whereby the eighth match result information (9-8) or (S1, 48, 48) is fetched. Next, the match result information identifying step 1102 is executed to check whether or not the match result information (S1, 48, 48) is the match term ID information. Since this match result information (S1, 48, 48) represents the match term ID information, the succeeding context marker identifying processing step 1103 is executed, to thereby check whether this match term ID information is relevant to the context marker designated in the contextual condition. Since the match term identifier is S1, it is decided that the match term ID information corresponds to the context marker "." for the designated sentence, which is then followed by the post-processing step 1104.

Figure 23A:
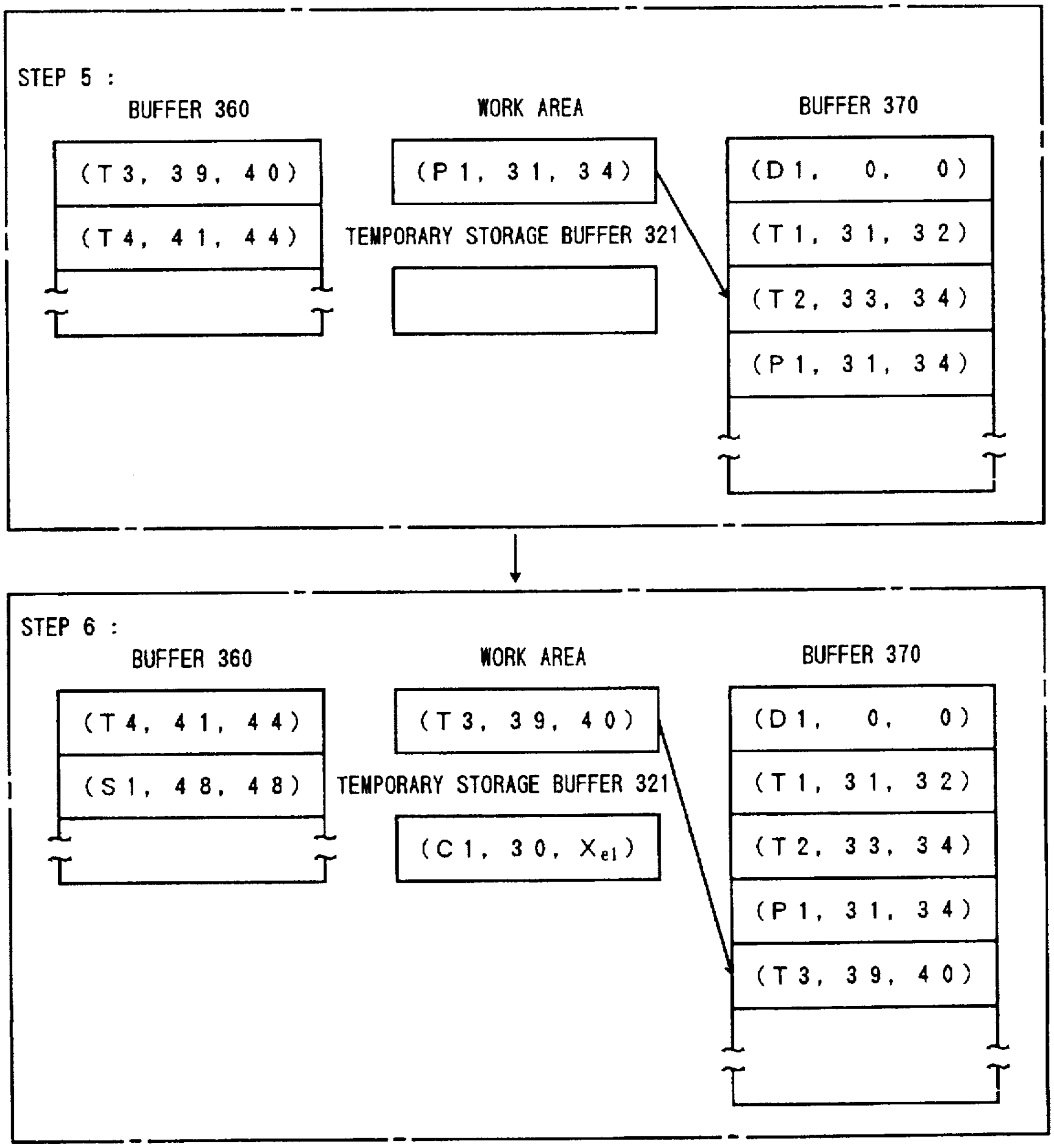
FIGS. 23A and 23B are views for illustrating a second part of the contextual condition processing steps.
Figure 23B:
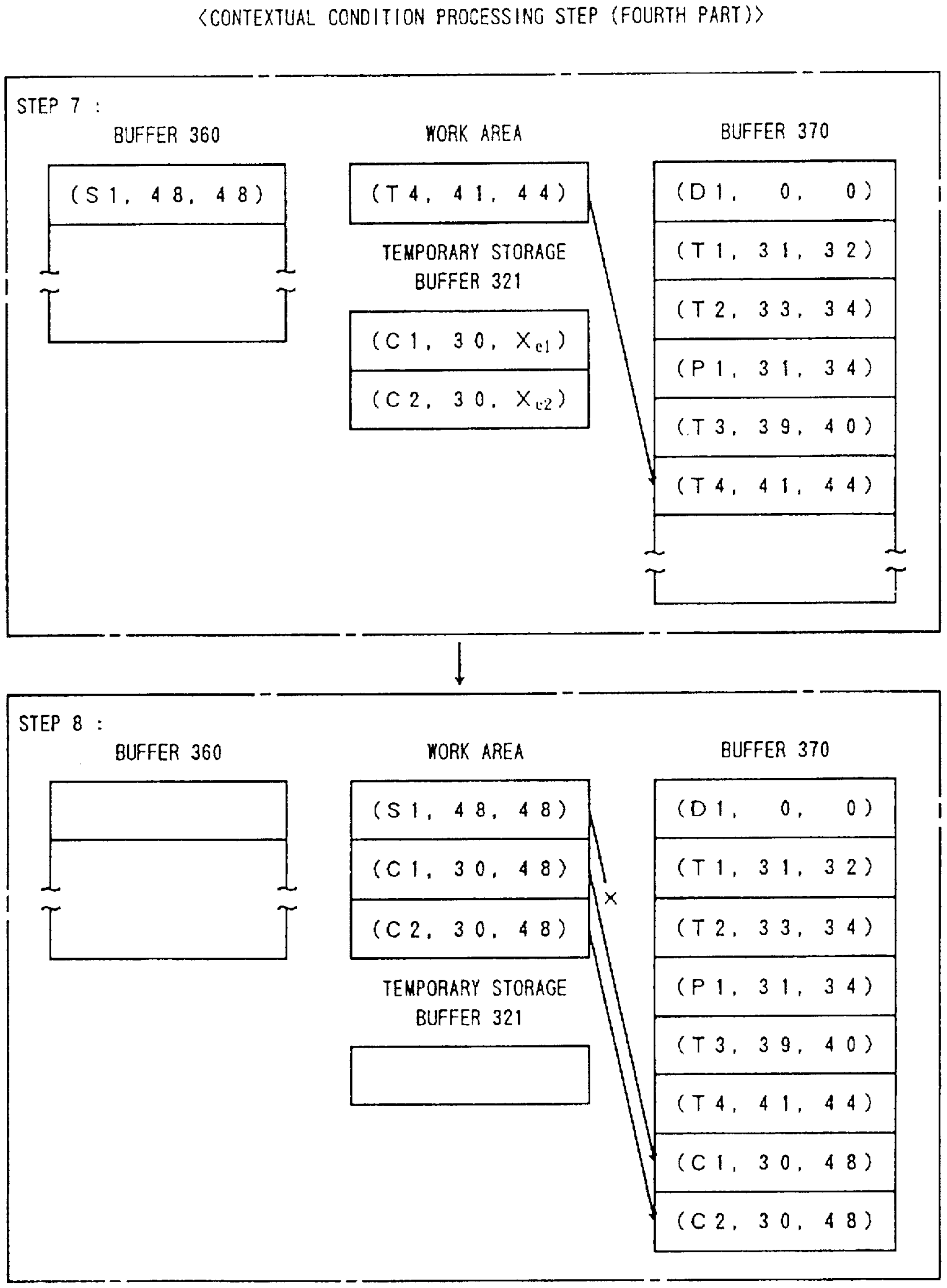

In the post-processing step 1104, the end position information "48" of the context marker is set as the sentence end position information. In succession, the sentence end position information "48" is placed in the temporary storage buffer 321 in which the contextual condition ID information (C1, 30, Xe1) and (C2, 30, Xe2) of the sentence is stored. The processing results in (C1, 30, 48) and (C2, 30, 48), as illustrated in the eighth step in FIGS. 23A and 23B. The results of the processing are stored in the work area.

Furthermore, the pre-processing step 1104a is executed to clear the concurrence counters to zero for the contextual condition of the sentence, while setting the start position information "48" of the context marker as the sentence start position information.

The work area loop processing step 1106 is again executed. At first, the contextual condition designation identifying step 1107 is performed on the contextual condition ID information (C1, 30, 48). However, since the match term identifier C1 is not designated in the contextual condition, the concurrence decision processing 1108 is not executed, but the match term ID information output processing step 1110 is carried out to output the contextual condition ID information (C1, 30, 48) to the buffer 370. Thus, the position information of the contextual condition ID information contains the sentence start position information "30" and the sentence end position information "48" as the punctuation marks given by the context marker identifiers (9-2) and (9-8), respectively.

Once again, the work area loop processing step 1106 is executed, whereon the contextual condition designation identifying step 1107 is executed for the contextual condition ID information (C2, 30, 48). However, since the match term identifier C2 is not designated in the contextual condition, the match term ID information output processing step 1110 is carried out, for outputting the contextual condition ID information (C2, 30, 48) to the buffer 370.

Figure 24:
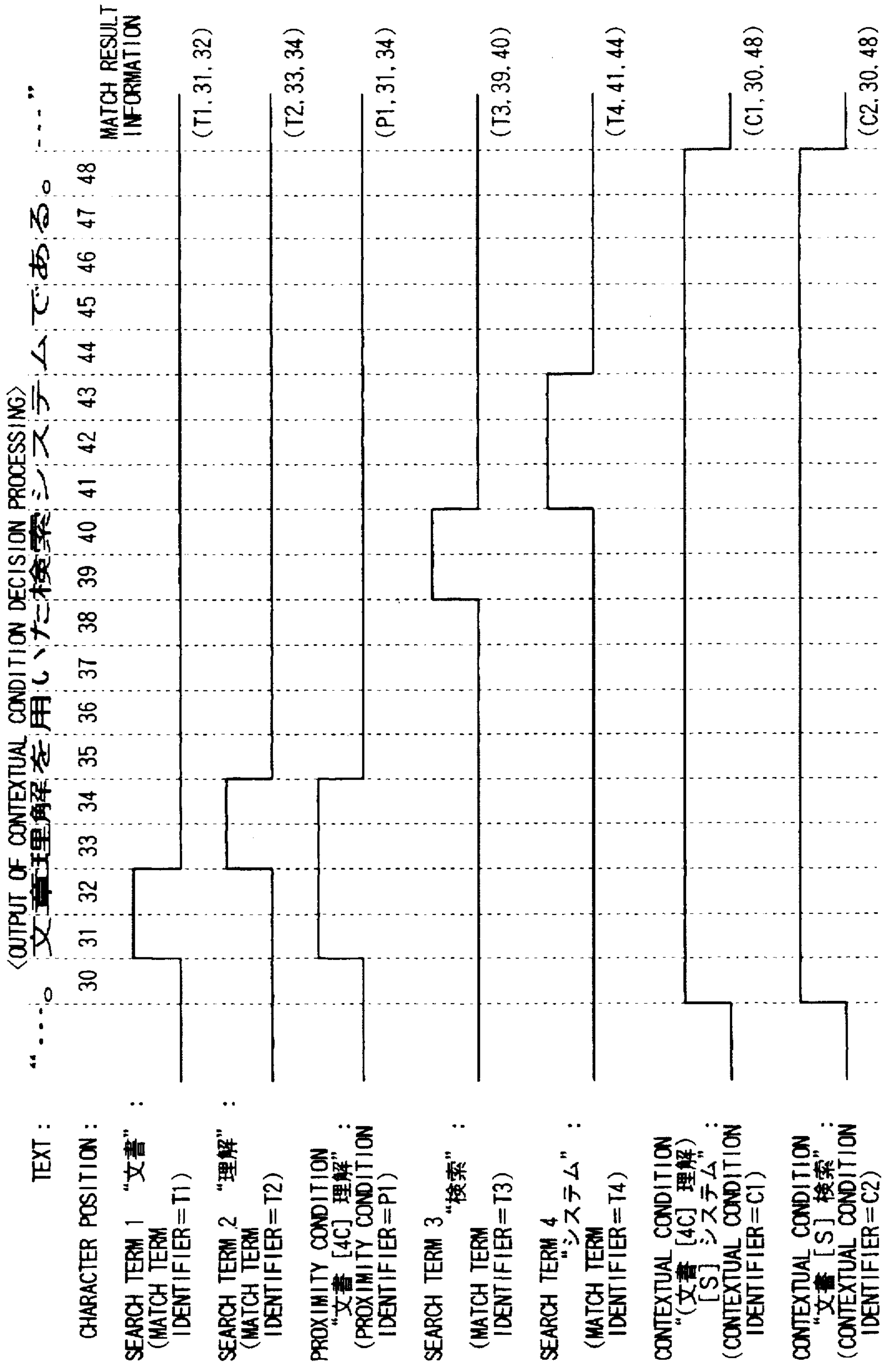

Through the contextual condition decision processing described above, the match result information (10-1) to (10-8) mentioned below and illustrated in FIG. 24 is output to the buffer 370.

| | |
|---|---|
| (D1, 0, 0) | (10-1) |
| (T1, 31, 32) | (10-2) |
| (T2, 33, 34) | (10-3) |
| (P1, 31, 34) | (10-4) |
| (T3, 39, 40) | (10-5) |
| (T4, 41, 44) | (10-6) |
| (C1, 30, 48) | (10-7) |
| (C2, 30, 48) | (10-8) |

where the expression (10-7) represents the contextual condition ID information "(文書 [4C] 理解) [S] システム", and the expression (10-8) represents the contextual condition ID information "文書 [s] 検索".

The match result information mentioned above is then furnished to the logical condition decision program 330.

Finally, description will be directed to the decision processing contents of the logical condition decision program 330. Upon execution of the logical condition decision program 330, the match result information stored in the buffer 370 as the result of execution of the contextual condition decision program 320 is read out to thereby determine, by the search control circuit 101, whether or not the match result information satisfies the logical condition designated by the search query information 202.

As an example of the logical condition, there may be mentioned a condition or query statement reading "文書 [AND] 検索", which commands that such a document be searched in which two search terms "文書" and "検索" appear concurrently. The identifier identifying this logical condition (hereinafter referred to as the logical condition identifier) is represented by Li. The identifier Li is assigned with a code which can be discriminated from that assigned to the search term identifier. On the basis of the definitions mentioned above, the logical condition can be described as follows:

"Li: Ta [AND] Tb"

Description which follows will be made in conformance with the above definition.

It should however be noted that as other logical conditions, there may be mentioned "Li: Ta [OR] Tb" and "Li: Ta [NOT] Tb". With the logical condition "Li: Ta [OR] Tb", it means that a document or text be searched in which the search term "Ta" or "Tb" occurs, while the logical condition or query statement "Li: Ta [NOT] Tb" means that such a document be searched in which the search term "Ta" appears and in which the term "Tb" does not appear.

These logical conditions are translated by the search control circuit 101 into general product-type expressions mentioned below, which are then supplied to the logical condition decision program 330 as the search query information.

$$
\begin{aligned}
\text{Li:}\quad & (A11 + A12 + \ldots + A1j)\\
* \quad & (A21 + A22 + \ldots + A2k)\\
* \quad & \ldots\\
* \quad & (An1 + A22 + \ldots + Anm) \qquad (10\text{-}1)
\end{aligned}
$$

In the above expression (10-1), a symbol "+" represents a logical sum or OR operation, and "*" represents a logical product or AND operation. Further, "Anm" is referred to as the element while "(An1+A22+ . . . +Anm)" is referred to as the term. The elements "Anm" may include negated elements which are represented by "¬Anm". Similarly, the terms may include negated terms which are represented "¬(An1+A22+ . . . +Anm)".

Further, the element represented by "¬Anm" is termed the element of negative logic, while the element which is not negated is termed as the element of positive logic. Similarly, the term "¬(An1+A22+ . . . +Anm) is referred to as the term of negative logic with the other term being referred to as the term of positive logic.

Since the expression (10-1) is in the form of a logical product of individual terms, it is necessary that all the terms are true in order that the expression (10-1) is satisfied (i.e. true). For this reason, a counter is provided for counting the terms which are true. When the value of this counter (hereinafter referred to as the term counter) is equal to the number of the terms constituting the expression (10-1), this means that the expression (10-1) is true (i.e. condition given by this expression is satisfied). The term of negative logic which includes no element of negative logic and the term of positive logic including the element of negative logic are intrinsically true. Accordingly, the term counter is set to an initial value equal to a sum of the number of the terms of negative logic including no element of negative logic and the number of the terms of positive logic including the element of negative logic. The decision as to whether the condition given by the expression (10-1) is satisfied or not can be realized by controlling the term counter in a manner described below. Namely, the number of terms of negative logic is set as the initial value for the term counter. Every time a given one of the terms changes from "false" to "true", the term counter is incremented by "1" (one). On the contrary, when the term changes from "true" to "false", the term counter is decremented by "1". So far as the term continues not to change the state as mentioned above, the value of the term counter is not updated. By controlling the term counter in this manner and checking, on a document-by-document basis, whether the value of the term counter is equal to the number of the individual terms, it can be decided whether or not the expression (10-1) is true (i.e. whether the condition given by this expression is satisfied or not satisfied). In the case where the whole expression is negated, decision as to satisfaction of the expression (10-1) can be realized by checking whether or not the value of the term counter is smaller than the number of the individual terms.

On the other hand, each of the terms is in the form of a logic sum of the elements. Accordingly, it is sufficient that any one of the elements constituting a term is true in order to ascertain that the term is true (i.e., satisfaction of the condition given by the term). A method of deciding whether a term is true or false may be effectuated in a manner described below. Namely, a counter is used for checking whether the term is true or false by counting the number of the elements which are designated in that term and which are true. When the value of this counter (hereinafter referred to as the element counter) is greater than "1" inclusive, indicating at least one of the elements is true, then the term is regarded to be true. Since the element of negative logic may be considered to be intrinsically true, the element counter is loaded with the number of the elements of negative logic as the initial value. Needless to say, the element counter is provided in one-to-one correspondence with the term. In other words, the element counters are provided in a number equal to that of the terms in correspondence thereto, respectively.

By controlling the element counter in a manner described below, the decision can be made as to whether the associated term is true or false. As mentioned above, as the initial value of the element counter, the number of the elements of logic elements is set. When any one of the element changes from "false" to "true", the element counter is incremented by "1", while upon change of any element from "true" to "false," the element counter is decremented by "1". Since the element corresponds to the match term identifier, the element is either false or true. In that case, the element which changes from "false" to "true" is the only element of positive logic, while the element susceptible to the change from "true" to "false" is the only element of negative logic. Accordingly, upon occurrence of the match term ID information corresponding to the element of positive logic, the element counter is incremented by "1". On the contrary, when the match term ID information corresponding to the element of negative logic appears, the element counter is decremeted by "1".

By controlling the element counter in this way and by checking whether the value of the element counter exceeds "1" every time the match term ID information is input, it can be decided whether the associated term is true or false. On the contrary, in case negation is applied to the term, validity thereof (i.e. whether the term is true or false) can be decided by checking whether or not the value of the corresponding element counter is zero.

Subsequently, on the basis of the results of the term validness decision, the term counter is incremented by "1" when the term changes from "false" to "true" while the term counter is decremented by "1" when the term changes from "true" to "false". Further, when the term including of the negated term undergoes no change in validity, the value of the term counter remains not updated.

As will be understood from the above, by controlling the term counter in this manner and checking on the document basis whether the value of the term counter is equal to the number of the terms, it is possible to decide whether the condition given by the expression (10-1) is satisfied or not (i.e. whether this expression is true or false, to say in another way).

By way of example, the query statement "Li: Ta [AND] Tb" or "Li: Ta×Tb" mentioned previously is translated into $$\text{"Li: } \neg((\neg\ \text{Ta})+(\neg\ \text{Tb}))\text{"}$$

to be subsequently transferred to the logical condition decision program 330 as the search query information 202.

Figure 25:
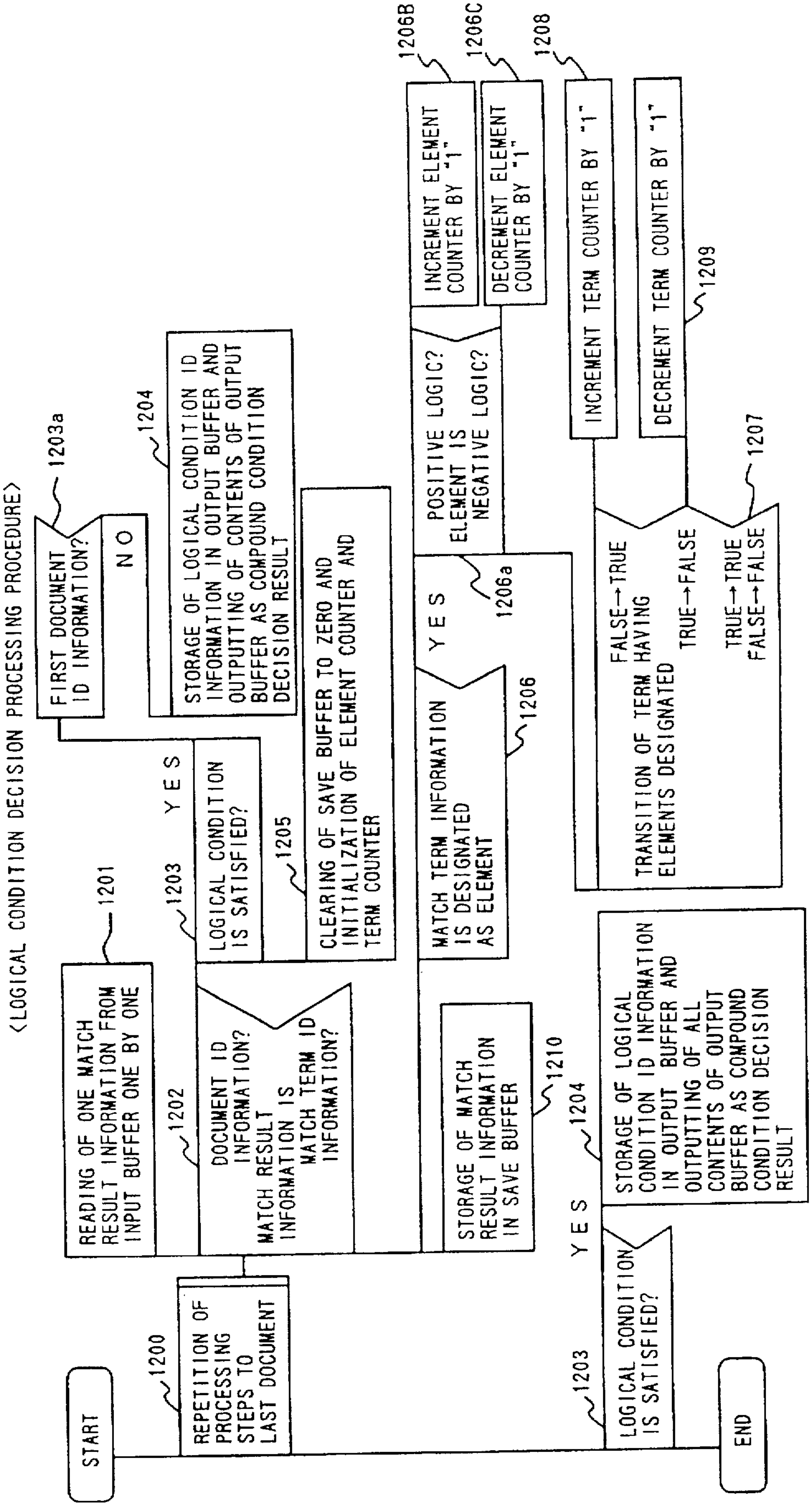

A processing procedure of this logical condition will be elucidated in detail by reference to FIG. 25.

The logical query statement "Li: Ta [AND] Tb", i.e. "Li: Ta ✱ Tb" mentioned above, for example, is translated into $$\text{"Li: } \neg\ ((\neg\ \text{Ta})+(\neg\ \text{Tb}))\text{"} \quad (10\text{-}2)$$

and then transferred to the logical condition decision program 330 as the search query information 202. It will be seen that there exists one term of negative logic in the instant logical condition now under consideration and that the term includes two elements of negative logic. In the case of the instant example, a single element counter is used because the number of the term is one. As the initial value for the term counter, there is set a sum of the number of the terms of negative logic including no element of negative logic and the number of the terms of positive logic including the element of negative logic. On the other hand, the element counter is loaded with "2" representing the number of the elements of negative logic as the initial value. Since the term of the expression (10-2) is affixed with the negative logic symbol "¬", the element counter is decremented (or counted down), and decision is made that the term is true when the value of the element counter becomes "0". Further, since no negative logic symbol "¬" is affixed to the expression (10-2) as a whole, the decision is made that the logic condition statement represented by the expression (10-2) is true when the value of the term counter is "1".

At first, in a repetition or loop processing step 1200, steps 1201 to 1210 are repeatedly executed until all the match result information stored in the buffer 370 has been completely read out, including that of the last document.

In the match result information fetch processing step 1201, the match result information is read out from the buffer 370 to be transferred to a work area of the read program.

In the match result information identifying processing step 1202, it is checked whether or not the match result information fetched in the match result information fetch processing step 1201 is the document ID information or the match term ID information. Namely, when the two rear terms of the match result information are both zero, i.e. when 32 LSBs (less significant bits) are zero, the match result information is decided as the document ID information.

In this case, a logical condition satisfaction/dissatisfaction decision step 1203 is executed. When the logical condition is satisfied, this is indicated by the value "1" of the term counter in the case of the logical condition given by the expression (10-2).

When the logical condition is satisfied, a document ID information decision processing step 1203*a* is executed. Unless the document ID information is the first information, a search result output processing step 1204 is executed. In the document ID information decision processing step 1203*a*, no decision processing is performed for the first document ID information, because any decision processing is not yet performed concerning the logical condition at this stage. In the result output processing step 1204, the content of an output buffer 331 storing the match result information, as will be described later on, as well as the result of logical condition decision (hereinafter referred to as the logical condition ID information) are output as the compound condition decision result 206. The reason why the logical condition decision processing is performed upon detection of the document ID information can be explained by the necessity of making decision as to satisfaction or dissatisfaction of the designated logical condition on a document-by-document basis.

The logical condition decision result information as output is the match result information containing the document start and end position information as the position information and the logical condition identifier (i.e. in the form of "Li", start position information, end position information"). The document start position information necessarily assumes "0" (zero), because the position information is always cleared to zero at the start of the document. Accordingly, the abovementioned logical condition ID information can be written as "(Li, 0, document end position information)".

After the logical condition satisfaction/dissatisfaction decision processing step 1203, an initialization processing step 1205 is executed to clear the output buffer 331 to zero while initializing the element counter and the term counter. In the case of the instant example, the element counter is set to "2" with the term counter being set to "0".

When the match result information is decided as being the match term ID information in the match result information identifying processing step 1202, a match term identifying step 1206 is executed to check whether or not the match term identifier contained in the match term ID information is designated as an element of the logical condition.

When the match term identifier is designated as the element of the logical condition, an element decision processing step **1206*a* is executed, whereby the element as found is checked in the light of the logical condition. Unless the negative logic symbol "¬" is affixed to the element, a count-up processing step 1206*b* is executed to thereby increment the element counter by "1". On the other hand, when the element of concern is affixed with the symbol "¬", a count-down processing 1206*c*** is executed to decrement the element counter by "1". At this juncture, it should be recalled that the element counter value of "0" indicates that the relevant term is false while the counter value greater than "1" inclusive indicates that the term is true. On the contrary, in the case where the negative logic symbol "¬" is affixed to the term, the element counter value of "0" indicates that the term is true while the counter value not smaller than "1" indicates falseness of the term.

Next, a term validness (true/false) decision processing step 1207 is executed in order to check whether the term containing the designated element has changed from "false" to "true" or vice versa. To this end, when the element counter indicates the change from "false" to "true", this means that the true term increases by one. Accordingly, the term counter is incremented by "1", while it is decremented by "1" when the element counter indicates the transition from "true" to "false".

In the case of the instant example, the value of the element counter in the initial state is "2" with that of the term counter being "0". Assuming now that an element Ta has been found, the element counter is decremented by "1", because the element Ta is affixed with the negative logic symbol "¬". Consequently, the value of the element counter is "1". In this conjunction, it is noted that the term is also affixed with the negative logic symbol "¬", which means that the term makes transition from "true" to "false". Accordingly, the term counter is not updated. Further, when an element "Tb" is found, the element counter is decremented by "1" because of the negative logic symbol "¬" affixed to this element. Thus, the value of the element counter becomes "0", indicating that the term has made transition from "false" to "true". The term counter is thus incremented by "1", which results in that the term counter now contains the value of "1". Through the procedure described above, the term validness (true/false) decision processing can be effectuated.

After execution of the match result information identifying step 1202, a match result information save processing step 1210 is executed to allow the match result information to be output to the output buffer 331. This buffer 331 is destined to store the match result information for one document, and output the content as the compound condition decision result 206 when it is determined that the logical condition is satisfied at the logical condition satisfaction/dissatisfaction decision processing step 1203.

The logical condition decision processing can be realized by performing repeatedly the processing steps described above for the match result information stored in the buffer 370.

It is however noted that upon completion of the repetition or loop processing step 1200, the logical condition decision is not performed on the document processed last. This is because the logical condition decision is executed for the document fetched before the document ID information being currently input. Accordingly, it is necessary to execute again the logical condition satisfaction/dissatisfaction decision step 1203 upon completion of the loop processing step 1200, to thereby perform the logical condition decision for the document fetched last.

The processing procedures outlined above will be explained in more detail in connection with a concrete example.

It is assumed that the query condition reads

"Q=((文書 [4C] 理解) [S] システム) [AND] (文書 [s] 検索)"

given by the expression (7-1) mentioned hereinbefore. For each of the condition decision programs, there are set separately the individual condition statements, respectively, which are obtained from the analysis performed by the search control circuit 101. More specifically, the logical condition decision program 330 is supplied with the logical condition part "((文書 [4C] 理解) [S] システム) [AND] (文書 [s] 検索)".

In this case, the logical condition part "文書 [4C] 検索) [s] システム" of the expression (7-1) is represented in the form of "L1: C1 [AND] C2", where C1 represents the identifier of the contextual condition "(文書 [4C] 検索) [S] システム", C2 represents the identifier of the contextual condition "文書 [s] 検索" and L1 represents the identifier of the logical condition. The logical condition part "L1: C1 [AND] C2" is further transformed into "L1: ¬ ((¬ C1)+(¬ C2))" which is then set in the logical condition decision program 330.

Assuming now that a text (7-2) reading ". . . · 文書理解を用いた検索システムである · . . ." is input, the contextual condition decision program 320 outputs to the buffer 370 the match result information (11-1) to (11-8) illustrated in FIG. 22 and mentioned below.

| | |
|---|---|
| (D1, 0 0) | (11-1) |
| (T1, 31, 32) | (11-2) |
| (T2, 33, 34) | (11-3) |
| (P1, 31, 34) | (11-4) |
| (T3, 39, 40) | (11-5) |
| (T4, 41, 44) | (11-6) |

-continued

| | |
|---|---|
| (C1, 30, 48) | (11-7) |
| (C2, 30, 48) | (11-8) |

In the expression (11-1) representing the document ID information, D1 represents the document identifier and two succeeding terms are constants each of "0" (zero).

The expressions (11-2), (11-3), (11-5) and (11-6) represent the match term ID information for "文書", "理解", "検索" and "システム", respectively. Further, T1, T2, T3 and T4 represent the match term identifiers of "文書", "理解", "検索" and "システム", respectively. The expression (11-4) represents the proximity condition ID information of the proximity condition "文書 [4C] 理解", where P1 represents the relevant proximity condition identifier. The expression (11-7) represents the contextual condition ID information of the contextual condition "(文書 [4C] 理解) [S] システム", where C2 represents the relevant contextual condition identifier. Finally, the expression (11-8) represents the contextual condition ID information of the contextual condition "文書 [s] 検索", where C2 represents the contextual condition identifier.

On these assumptions, description will be made of the logical condition decision processing stepwise by referring to FIGS. 26A; 26B and FIG. 27. In the initial state illustrated in FIGS. 26A and 26B, the match result information (11-1) to (11-8) are stored in the buffer 360, while the output buffer 331 and the buffer 370 are cleared to zero.

Upon execution of the logical condition decision processing program 330, the abovementioned match result information is read out from the buffer 370 one by one, whereon the decision processing is performed for the logical condition "L1: ¬ ((¬ C1)+(¬ C2))".

Figure 26A:
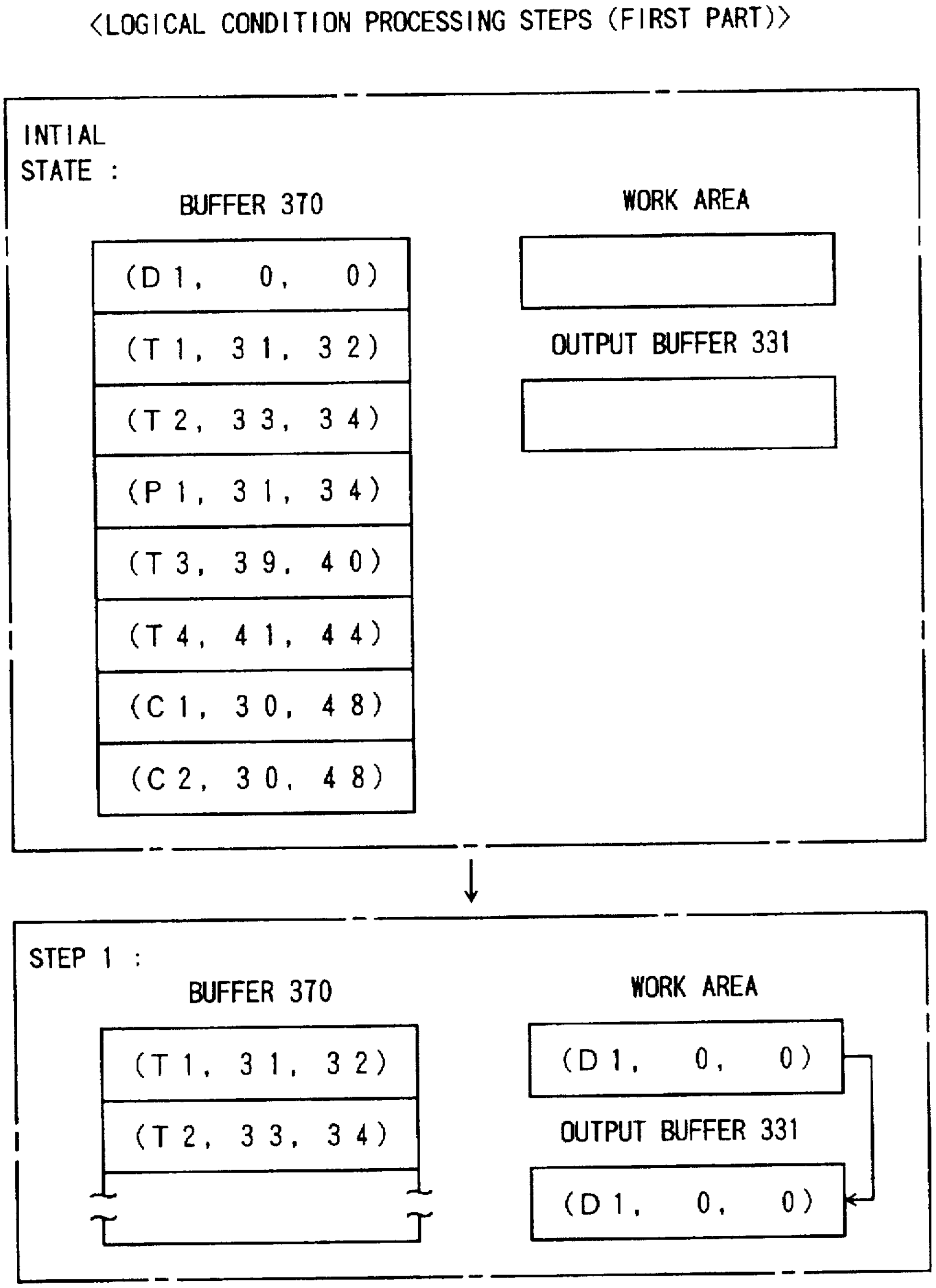
FIGS. 26A and 26B are views for illustrating a first part of logical condition decision processing steps.
Figure 26B:
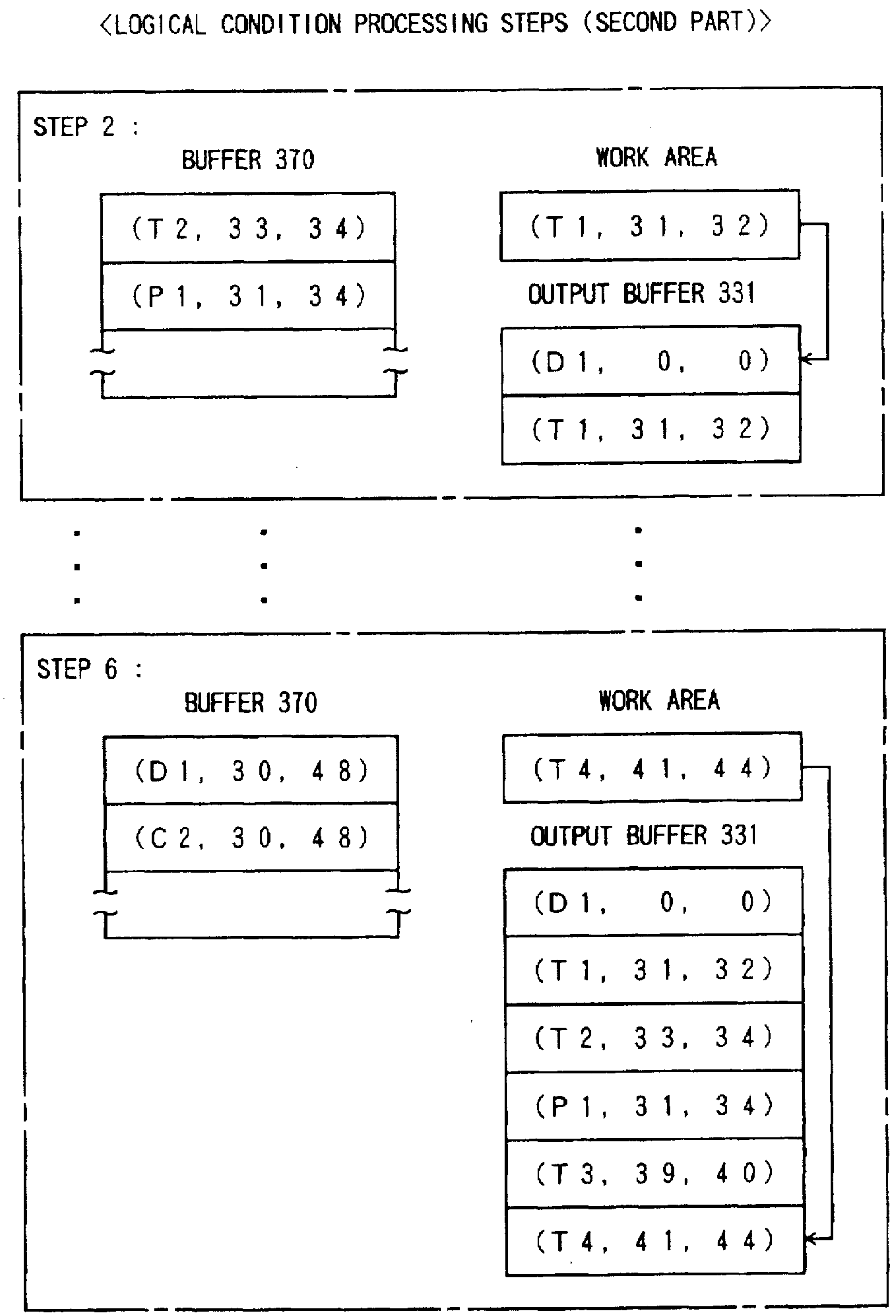
Figure 27A:
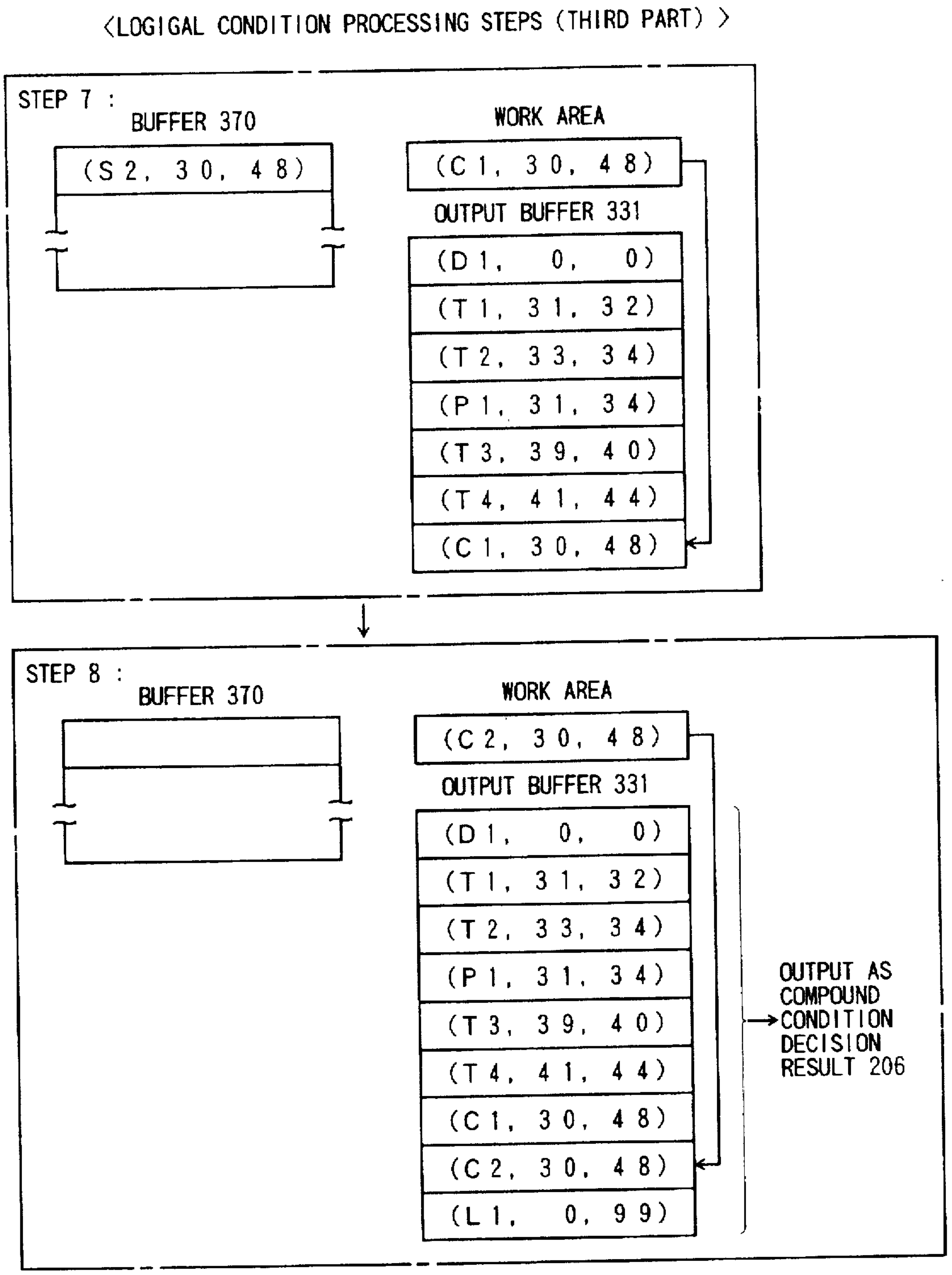
FIG. 27A is a view for illustrating a second part of logical condition decision processing steps.

In a first step, a read or fetch processing step 1201 is executed, as a result of which the match result information (11-1), i.e. (D1, 0, 0), is placed in the work area of the program, as shown in the step 1 of the FIGS. 26A and 26B. Next, a match result information identifying step 1202 is executed to check whether the match result information (11-1), i.e. (D1, 0, 0), is the document ID information or the match term ID information. Since two rear terms of the match result information (D1, 0, 0) are both "0" (zero), this information is decided to be the document ID information.

Accordingly, the logical condition satisfaction/dissatisfaction decision processing step 1203 as well as the document ID information decision processing step 1203a is executed. However, since this is the first document ID information, the result output processing step 1204 is not executed. Next, the initialization processing step 1205 is executed to thereby clear to zero the output buffer 331 while initializing the element counter and the term counter. In the case of the instant example, "2" is placed in the element counter as the initial value because there exist two logically negative elements (¬C1) and (¬C2). Apparently, the term ((¬C1)+(¬C2)) affixed with the symbol "¬" contains the elements attached with the symbol "¬". Accordingly, "0" is set as the initial value of the term counter, because neither the term affixed with "¬" and containing no element affixed with "¬" nor the term not affixed with "¬" and containing the elements affixed with "¬" exists. After having executed the match result information identifying step 1202, the match result information save processing step 1210 is executed, whereby the match result information (D1, 0, 0) is stored in the output buffer 331.

In a second step, the match result information read processing step 1201 is again executed, as a result of which the match result information (11-2), i.e. (T1, 31, 32), is fetched. Next, the match result information identifying step 1202 is executed to thereby check whether the match result information (T1, 31, 32) represents the match term ID information. Since 32 LSBs of this match result information (T1, 31, 32) are not "0" (zero), it is decided that the match result information of concern is the match term ID information. In a next match term identifying processing step 1206, it is checked whether or not the match term ID information corresponds to any one of the elements designated in the logical condition. Since the identifier T1 of the match result information (T1, 31, 32) is not designated in the logical condition of concern, the processing steps 1206a to 1209 are not executed. Upon completion of the match result information identifying step 1202, the match result information save processing step 1210 is executed, whereby the match result information (T1, 31, 32) is stored in the output buffer 331.

Since the identifier of the match result information is not designated in the logical condition of concern up to the sixth step inclusive, only the match result information save processing step 1210 is executed, whereby the match result information (T2, 33, 34), (P1, 31, 34), (T3, 39, 40) and (T4, 41, 44), respectively, are stored in the output buffer 331.

In a seventh step, the match result information fetching processing step 1201 is again executed, whereby the match result information (11-7), i.e. (C1, 30, 48), is fetched. Next, the match result information identifying step 1202 is executed to check whether the match result information (C1, 30, 48) is the match term ID information. Since the match result information (C1, 30, 48) has 32 LSBs which are not zero, the former is decided to be the match term ID information. At the succeeding match term identifying step 1206, it is checked whether or not the match term ID information corresponds to the element designated in the logical condition. Since the logical condition under consideration designates the identifier C1 of the match result information (C1, 30, 48), processing steps 1206a to 1209 are executed.

At first, the element decision steps 1206a is executed. In the case of the logical condition under consideration, the initial value of the element counter is "2" with that of the term counter being "1". Since the element C1 is affixed with the symbol "¬", a count-down processing step 1206c is executed, as a result of which the element counter is decremented by "1". Thus, the value of the element counter is updated from "2" to "1".

Subsequently, a term decision processing step 1207 is executed. Since the element counter contains the value of "1" at this time point, the term transitions from "false" to "false". Consequently, the term counter is not updated.

Upon completion of the match result information identifying step 1202, the match result information (C1, 30, 48) is stored in the output buffer.

Finally, in an eighth step, the match result information read processing step 1201 is executed once more, whereby the match result information (11-8), i.e. (C2, 30, 48), is fetched. Next, the match result information identifying step 1202 is executed to check whether the match result information (C2, 30, 48) is the match term ID information. Since the match result information (C2, 30, 48) has 32 LSBs which are not zero, the former is decided to be the match term ID information. In the succeeding match term identifying step 1206, it is checked whether or not the match term ID information corresponds to the element designated in the logical condition. Since the logical condition under consideration designates the identifier C2 of the match result information (C2, 30, 48), the processing steps 1206*a* to 1209 are executed. At this time point, the value of the element counter is "0" with that of the term counter being "1".

At first, the element decision processing step 1206*a* is executed. Since the element C2 is affixed with the symbol "¬", the count-down processing step 1206*c* is executed, as a result of which the element counter is decremented by "1". Thus, the value of the element counter is updated from "1" to "0".

Subsequently, the term decision processing step 1207 is executed. Since the element counter contains currently the value of "0", the term affixed with the symbol "¬" changes from "false" to "true". Consequently, the count-up processing step 1202 is executed, whereby the term counter is incremented by "1" to be thereby updated to "1" from "0".

Thereafter, the match result information save processing step 1210 is executed, whereby the match result information (C2, 30, 48) is stored in the output buffer 331.

The loop processing 1200 now comes to an end. However, the logical condition satisfaction/dissatisfaction decision processing step 1203 is executed for the last document. The term counter contains "1". This means that the logical condition is satisfied. Thus, the result output processing step 1204 is executed, whereby the contents of the output buffer 331 storing the match result information and the logical condition decision result information (L1, 0, 99) is output as the compound condition decision result 206, wherein L1 represents the logical condition identifier, "0" represents the document start position information and "99" represents the end position information.

As the result of the logical condition decision processings described above, there are output, as the compound condition decision result 206 for the search query statement (7-1)

"Q=((文書 [4C] 理解) [S] Z,50 テム) [AND] (文書 [s] 検索)", the match result information (11-1) to (11-9) mentioned below.

| | |
|---|---|
| (D1, 0, 0) | (11-1) |
| (T1, 31, 32) | (11-2) |
| (T2, 33, 34) | (11-3) |
| (P1, 31, 34) | (11-4) |
| (T3, 39, 40) | (11-5) |
| (T4, 41, 44) | (11-6) |
| (C1, 30, 48) | (11-7) |
| (C2, 30, 48) | (11-8) |
| (L1, 0, 99) | (11-9) |

In the above expressions, (11-1) represents the document ID information with Di representing the document identifier. Further, (11-2), (11-3), (11-5) and (11-6) represent the match term ID information of "Z,1 ", "理解", "検索" and "システム", respectively. The expression (11-4) represents the proximity condition ID information for the proximity condition "文書 [4C] 理解". The expression (11-7) represents the contextual condition ID information for the contextual condition "(文書 [4C] 理解) [S] システム", while (11-8) represents the contextual condition ID information for the contextual condition "文書 [s] 検索". Finally, (11-9) represents the logical condition ID information for "((文書 [4C] 理解) [S] システム) [AND] (文書 [s] 検索)", where L1 represents the logical condition identifier.

In the foregoing, description has been made of a method of effectuating the compound condition decision processings executed by the proximity condition decision program 310, the contextual condition decision program 320 and the logical condition decision program 330.

At this juncture, it should be mentioned that with the arrangement described above in conjunction with the first embodiment of the invention, it is equally possible to realize the decision processing for an inter-word distance condition in English documents or texts (e.g. "text [8] search" and so forth) by changing the output of the character number counting circuit from the character position information to the word position information.

In the case of English documents, the individual words are punctuated from one another by delimiters such as "space", ".", ",", "!", "?", ")" and "(". Accordingly, the position of a given word in a sentence or sub-sentence (phrase and clause) can be arithmetically determined by counting a number of changes intervening between a delimiter and a character constituting the given word. To this end, boundaries between the delimiters and the character constituting the given word are counted, because the space serving as one of the delimiters makes appearance in succession. An exemplary configuration of the word number counting circuit will be described below by reference to FIG. 27A.

Referring to the figure, the word number counting circuit 230*a* is composed of a delimiter table 231*a*, an inverter 231*b*, a flip-flop 231*c* and a word number counter 231*e*.

Figure 27B:
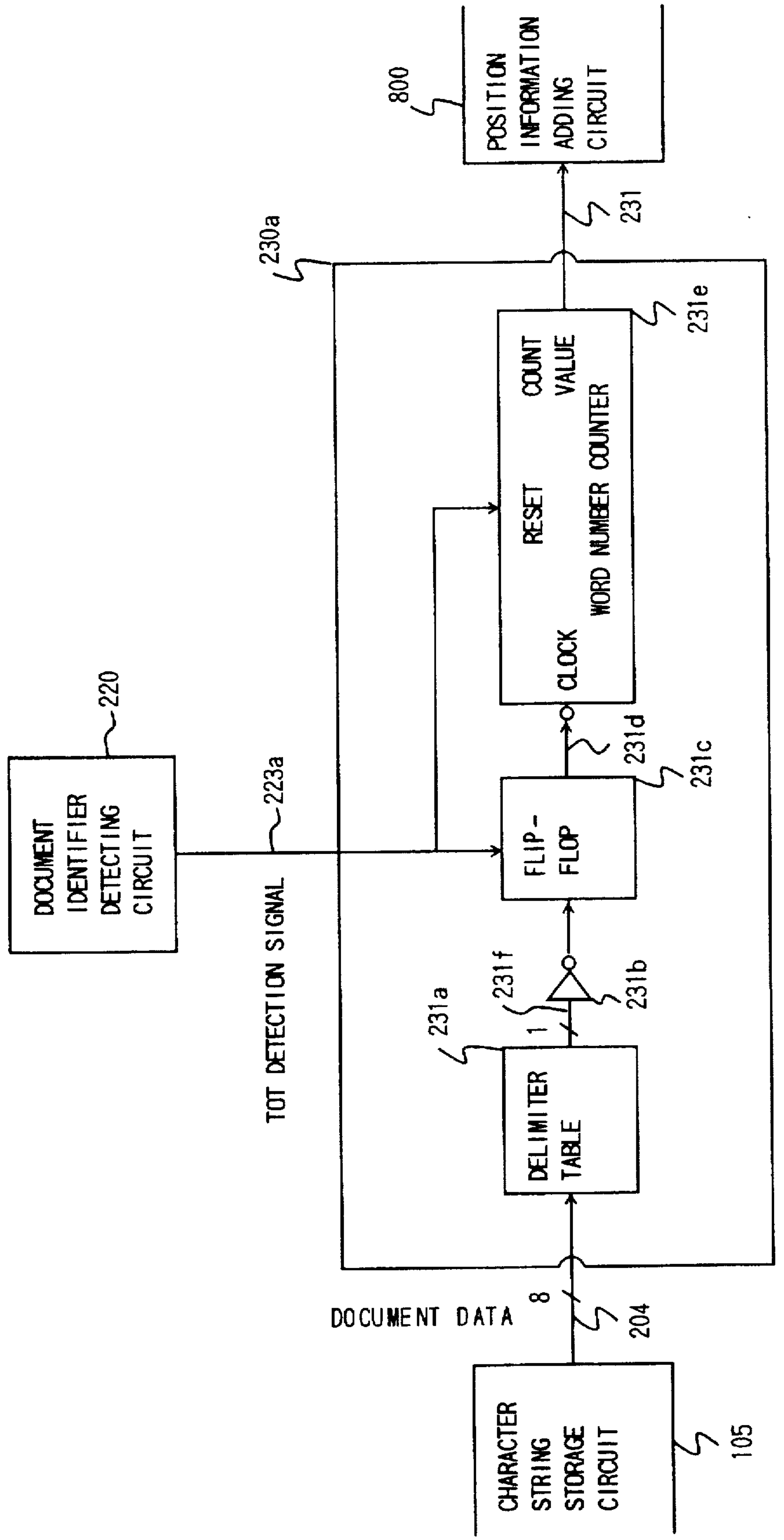
FIG. 27B is a block diagram showing an exemplary configuration of a word number counting circuit.

An exemplary structure of the delimiter table 231*a* is illustrated in FIG. 27B. Addresses of this table correspond to character codes. Since ASCII code is assumed to be used in the case of the instant example, there are provided 256 slots. For numerals and alphabets which can not serve as the delimiter, "0" is set as a delimiter flag, while "1" is set as the delimiter flag for the delimiters mentioned previously.

Operation of the word number counting circuit 230*a* will be described below.

At first, the delimiter table 231*a* is initialized. To this end, those slots of the delimiter table 231*a* which correspond to the characters or symbols serving as the delimiters for punctuating the words are placed with "1", respectively, while the other slots are set to "0".

In the matching operation, the delimiter table 231*a* is accessed every time the document data 204 is supplied, whereby the delimiter flag 231*f* is read out to be held by the flip-flop 231*c* via the inverter 231*b*. The word number counter 231*e* is counted up only when the delimiter signal 231*d* changes from "1" to "0", i.e. only when transition takes place from the intrinsic character to the delimiter. The count value of the word number counter 231*e* is supplied to the position information adding circuit 800 as the word position information 231. When the TOT detection signal 223*a* is output from the document identifier detecting circuit 220, the flip-flop 231*c* and the word number counter 231*e* are reset to zero, which means that they are reset to zero in response to the inputting of a start word of a document. Consequently, the word position information 231 of the start word assumes the value of "0".

Owing to the operation of the word number counting circuit 230*a*, the match result information output from the character string matcher circuit 200 is given by (Ti, Ws, We), wherein Ti represents the match term identifier, Ws represents the start position information of the match result information and We represents the end position information. In other words, Ws and We represent the start word position and the end word position, respectively.

By virtue of the abovementioned structure of the match result information (Ti, Ws, We), the inter-word distance query condition can be ascertained by calculating the distance between the search terms in terms of the number of the words intervening therebetween. Accordingly, the inter-word condition ID information as well as the position information output as the result of decision for the inter-word distance query condition can be expressed in terms of the word positions.

In the succeeding contextual condition decision processing, the match result information for the context marker is transformed to that for the word position. By using the match result information thus obtained, the position information contained in all the match result information resulting from the contextual condition decision processing represent the word positions. Thus, by executing the contextual condition decision processing in a similar manner as described hereinbefore, there can be obtained the codocument ID information which includes the word positions as the position information. Similarly, since the position information contained in all the match result information input to the logical condition decision processing represents the word position, the logical condition ID information including the word positions as the position information can be outputted from the logical condition decision processing. In this manner, the compound condition decision facility can be implemented in which the word positions are utilized as the position information.

As will now be appreciated from the foregoing description, according to the first embodiment of the invention which incorporates the character string matcher circuit 200 and the compound condition decision circuit 300 implemented in the structures described above, there can be realized a fine document search favorable to the full document search, because the compound condition decision processing including the proximity condition, contextual condition and logical condition decision processings can be carried out in a consistent manner.

Furthermore, by providing three microcomputers for executing the proximity condition decision program 310, the contextual condition decision program 320 and the logical condition decision program 330, respectively, the compound condition decision processing can be performed without need for establishing synchronization among these programs. In other words, a pipeline processing can be performed in which the abovementioned programs start the respective condition decision processings in response to storage of the match result information in the associated input buffers, respectively, whereby the compound condition decision processing can be sped up significantly to a great advantage.

Figure 28A:
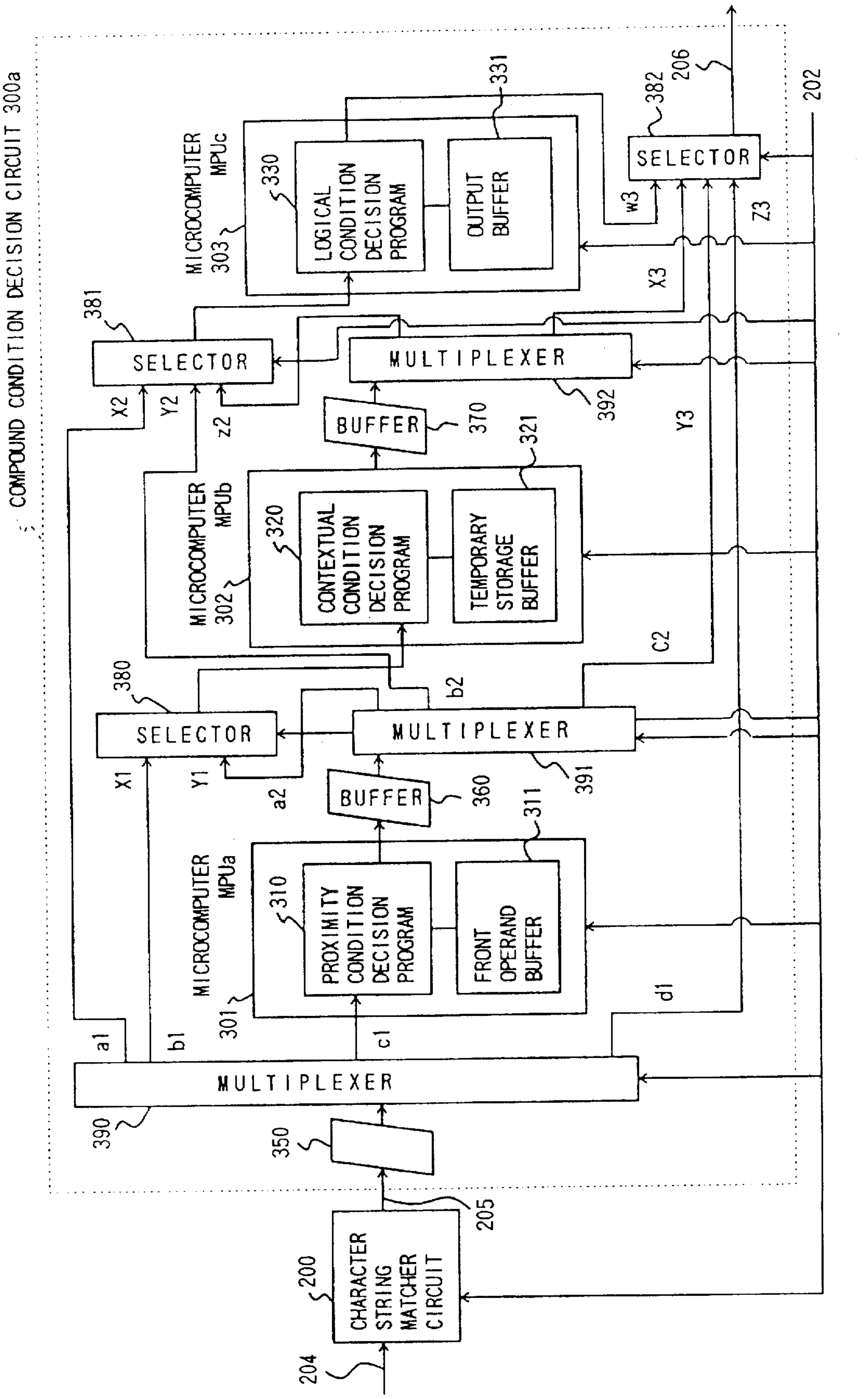
FIG. 28A is a block diagram showing an arrangement of the document retrieval system according to a second embodiment of the invention.

Now, description will be made of a second embodiment of the invention by reference to FIG. 28A.

In conjunction with the compound condition decision facility according to the first embodiment of the invention described above, it is noted that even when only one of the conditions constituting the compound condition is even, the pipeline processing must always be performed for all the conditions constituting the compound conditions, even through no more than one microcomputer operates. With the second embodiment of the invention, it is contemplated to enhance the efficiency of the compound condition decision processing by bypassing the condition decision programs for which the condition is not designated in the given search query statement.

The document retrieval system according to the second embodiment of the invention is composed of a character string matcher circuit 200 and a compound condition decision circuit 300*a*, wherein the compound condition decision circuit 300*a* is instituted by three microcomputers MPUa301, MPUb302 and MPUc303, multiplexers 390 to 392, and selectors 380 to 382. The microcomputer MPUa301 is destined to execute the proximity condition decision program 310, while the microcomputer MPUb301 executes the contextual condition decision program 320 with the microcomputer MPUc303 executing the logical condition decision program 330. Interposed between the microcomputers MPUs are buffers 350, 360 and 370, each implemented by a first-in/first-out (FIFO) memory to be used for data transfer among the MPUs.

A bypass function of the compound condition decision circuit provided according to the instant (second) correspondingly controlling the multiplexers 390 to 392 and the selector 380 to 382. The control information to this end is supplied as the search query information 202 from the search control circuit 101 shown in FIG. 8.

Through the multiplexer 390, the match result information 205 output from the character string matcher circuit 200 is supplied to the logical condition decision program 330 when a port a1 of the multiplexer 390 is selected, while the information 205 is supplied to the contextual condition decision program 320 when a port b1 is selected. Further, when a port c1 of the multiplexer 390 is selected, the match result information 205 is supplied to the proximity condition decision program 310 while it is sent out as the compound condition decision result 206 of the compound condition decision circuit 300*a* when a port d1 of the multiplexer 390 is selected.

On the other hand, in the multiplexer 391, the output of the proximity condition decision program 310 is supplied to the contextual condition decision program 320 when a port a2 of that multiplexer is selected, while when a port b2 is selected, the output of the proximity condition decision program 310 is supplied to the logical condition decision program 330. Upon selection of a port c2 of the multiplexer 391, the output of the proximity condition decision program 310 is sent out straightforwardly as the output of the compound condition decision circuit 300*a*.

Finally, in the multiplexer 392, the output of the contextual condition decision program 320 is supplied to the logical condition decision program 330 when a port a3 of that multiplexer is selected while it is sent out as the compound condition decision result 206 when a port b3 is selected.

The selector 380 serves for selection of the input to the contextual condition decision program 320. More specifically, the selector 380 selects "X1", i.e. output 205 (result of the matching) of the character string matcher circuit 200 when the port b1 of the multiplexer 390 is enabled, while it selects "Y1", i.e. the output of the proximity condition decision program 310 when the port a2 of the multiplexer 391 is enabled.

The selector 381 serves for selecting the input to the logical condition decision program 330. More specifically, when the port a1 of the multiplexer 390 is enabled, the selector 381 selects "X2", i.e. the match result 205 output from the character string matcher circuit 200 as the input to the logical condition decision program 330. When the port b2 of the multiplexer 391 is enabled, the selector 381 selects "Y2", i.e. the output of the proximity condition decision program 310, while selecting "Z2", i.e. the output of the contextual condition decision program 320 when the port a3 of the multiplexer 392 is enabled.

The selector 382 serves for selecting the output to be sent out as the compound condition decision result 206. More specifically, the selector 382 selects "Z3", i.e. the matching result 205 output from the character string matcher circuit 200 as the compound condition decision result 206, when the port d1 of the multiplexer 390 is enabled, while the selector 382 selects "Y3", i.e. the output of the proximity condition decision program 310 when the port b3 of the multiplexer 391 is enabled. Furthermore, when the port b3 of the multiplexer 392 is enabled, the selector 382 selects "X3", i.e. the output of the contextual condition decision program 320. Otherwise, the selector 382 selects "W3", i.e. the output of the logical condition decision program 330.

The setting of the selectors 380 to 382 described above is controlled in correspondence with the control of the multiplexers 390 to 392.

Selection of the multiplexers is enabled in dependence on the compound condition in a manner mentioned below:

(1) No compound condition: selection of only d1.

(2) Only proximity condition: selection of c1 and c2.

(3) Only contextual condition: selection of b1 and b3.

(4) Only logical condition: selection of only a1.

(5) Proximity and contextual conditions: selection of c1, a2 and b3.

(6) Proximity and logical conditions: selection of c1 and b2.

(7) Contextual and logical conditions: selection of b1 and a3.

(8) Proximity, contextual and logical conditions: selection of c1, a2 and a3.

As will be understood from the above description, by selectively connecting the proximity condition decision program 310, the contextual condition decision program 320 and the logical condition decision program 330, by using the multiplexers 390 to 392 and the selectors 380 to 382 in dependence on the enabling information derived from the search query information 202 supplied from the search control means 101, the compound condition decision processing with an enhanced efficiency can be realized because it is now unnecessary to consistently carry out the pipeline processing of the three compound condition decision programs notwithstanding of the fact that only one microprocessor is actually operated when no more than one of the compound conditions is given.

Next, a version of the second embodiment of the invention will be described. This version may be identified by a twelfth embodiment.

In the case of the second embodiment of the invention described above, it is previously determined in accordance with the search query statement how to set the multiplexers 390, 391 and 392 and the selectors 380, 381 and 382. Assuming, by way of example, that when the search query statement (7-1) is given, i.e. when "((文書 [4C] 理解) [S] システム) [AND] (文書 [S] 検索)" is given, the match result information is forced to undergo all the processings for all the conditions given by the above statement. For example, the match result information of the term "Z,30 " is caused to pass all the condition decision processings regardless of the fact that only the proximity condition is imposed on this term, which in turn means that useless processing is performed.

This problem can be solved by assigning or distributing dynamically the match result information to the appropriate processing paths upon inputting of the match result information to the multiplexers 390, 391 and 392. To this end, it is taught, as a modification of the second embodiment of the invention, to add the match result information a three-bit flag (hereinafter referred to as compound condition flag) indicating which of the compound condition decision facilities is to be used for the match result information. More specifically, a $2^0$-bit compound condition flag is allocated for indicating the logical condition decision, a $2^1$-bit compound condition flag is allocated for indicating the contextual condition decision, and a $2^2$-bit compound condition flag is allocated for indicating the proximity condition decision. Accordingly, when the compound condition flag of given match result information is "5", this means that the given match result information is used in both of the proximity condition decision and the logical condition decision. Further, when the compound condition flag is "0", it is indicated that the relevant match result information is not used in any one of the compound condition decisions.

For the match term ID information, the compound condition flag is determined previously by the search control circuit 101 to be added to the match term identifier and set at the term comparator 210 of the character string matcher circuit 200 so that the compound condition flag is outputted as a part of the match processing result. On the other hand, the document identifier which is used as the control information by all the compound condition decision facilities is affixed with the compound condition flag of "7" for all the document ID information. This can be accomplished by affixing the compound condition flag to the document identifier output from the document identifier detection circuit 220. In this way, the compound condition flag can be added or affixed to the match result information.

Figure 28B:
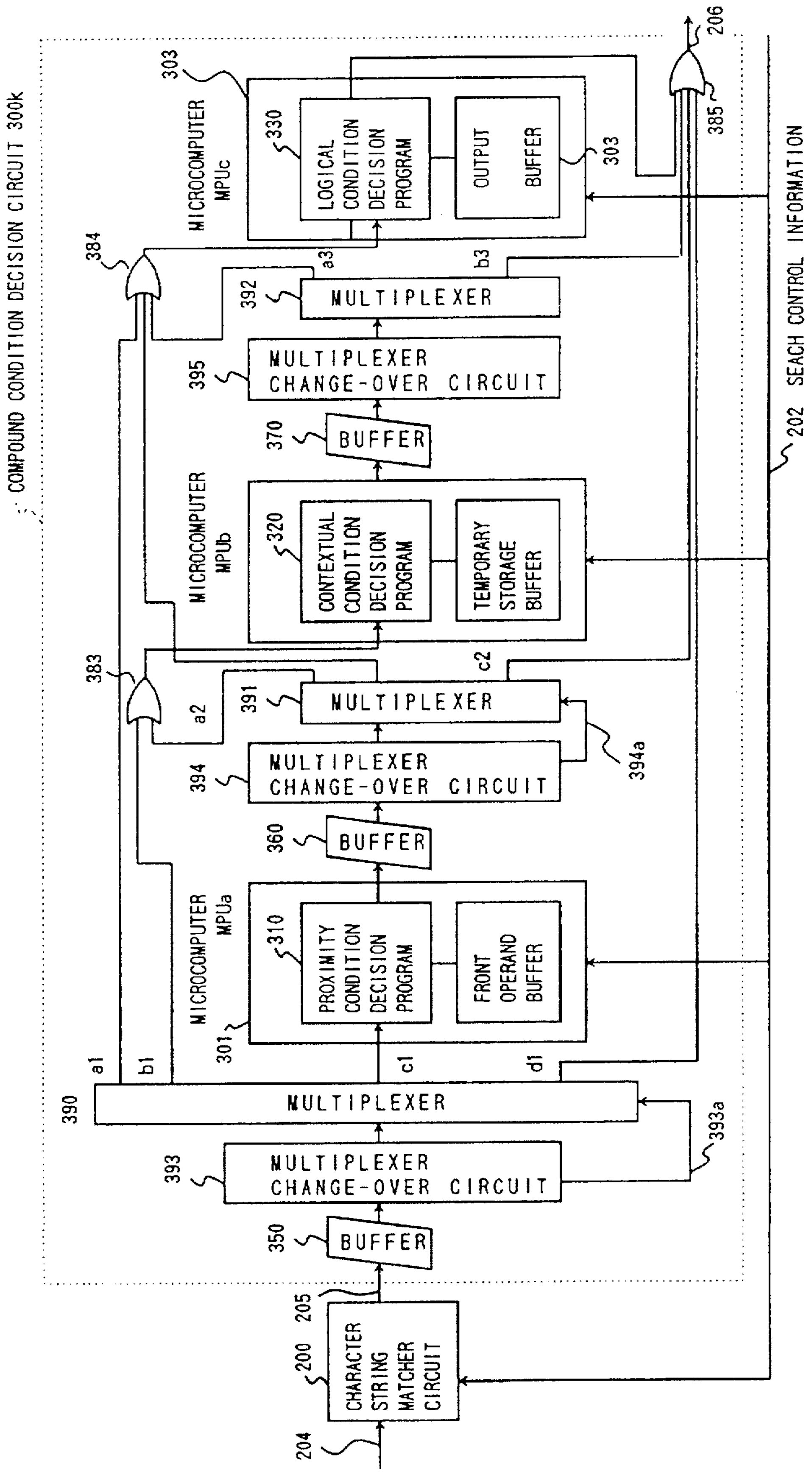
FIG. 28B is a block diagram showing a version of the document retrieval system shown in FIG. 28A according to a twelfth embodiment of the invention.

A structure of the compound condition decision circuit 300*k* in which the compound condition flags mentioned above are used is shown in FIG. 28B. This circuit configuration differs from the circuit according to the second embodiment shown in FIG. 28A in that multiplexer change-over circuits 393, 394 and 395 are additionally provided while OR gates 383, 384 and 385 are employed in place of the selectors 380 to 382. The OR gate 383 serves for supplying one of the match result information output from the multiplexers 390 and 391 to the contextual condition decision facility. The OR gate 384 serves to deliver one of the match result information output from the multiplexers 391, 392 and 393 to the logical condition decision facility. Finally, the OR gate 385 serves to output the match result information obtained from the multiplexers 391, 392 and 393 and the logical condition decision facility as the compound condition decision result 206.

On the other hand, the multiplexer change-over circuit 393, 394 and 395 perform select control of the respective multiplexers 390, 391 and 392. FIG. 28C shows select signals output by the multiplexer change-over circuits 393, 394 and 395 in response to the compound condition flags as input. Assuming, for example, that the search query statement (7-1) is given and that the match result information of the term "文書" is output from the character string matcher circuit 200, this match result information is added with the compound condition flag condition flag of "6". Thus, the match result information is represented by (T1, 32, 32, 6), wherein "T1" represents the match term ID information of "文書", while "31" and "32" represent the start position information and the end position information, respectively, of the match result information with "6" representing the value of the compound condition flag. The reason why the compound condition flag is "6" ("110" in decimal notation) is explained by the fact that the term "文書" of the search query statement (7-1) is designated in both of the proximity condition and the contextual condition and thus the $2^0$-bit is set to "1" $2^1$-bit is set to "1" and the $2^2$-bit is set to "1".

When the match result information of the term "文書" is input to the multiplexer change-over circuit 393, a signal 393*a* for selecting the port c1 is output, whereby the match result information of the port c1 of the multiplexer 390 is output. Thus, the match result information of the term "文 書" is input to the proximity condition decision program 310.

Subsequently, the match result information (T1, 31, 32, 6) of "文 書" output from the proximity condition decision program 310 is input to the multiplexer change-over circuit 394. At this time, the multiplexer change-over circuit 394 produces a signal 394*a* for selecting the port a2 of the multiplexer 390. Thus, the match result information of "文 書" is output from the port a2 of the multiplexer 390 to be input to the contextual condition decision program 320 via the OR gate 383.

The match result information of the term "文 書" is then supplied to the multiplexer change-over circuit 395 from the contextual condition decision program 320, resulting in that a signal for selecting the port b3 is output. Consequently, the match result information of the term "文 書" is output as a part of the compound condition decision result 206 by way of the OR gate 385.

By changing over or switching dynamically the multiplexers in dependence on the match result information by using the multiplexer change-over circuits 393, 394 and 395 and the OR gates 383, 384 and 385 in the manner described above, it is impossible to speed up the compound condition decision processing as a whole when compared with that of the second embodiment to thereby allow a high-speed document retrieval system to be realized. This is because the match result information of a search term is not forced to pass the compound condition decision circuit in which no decision condition relevant to the search term is set, whereby useless condition decision processing can be spared.

Figure 29:
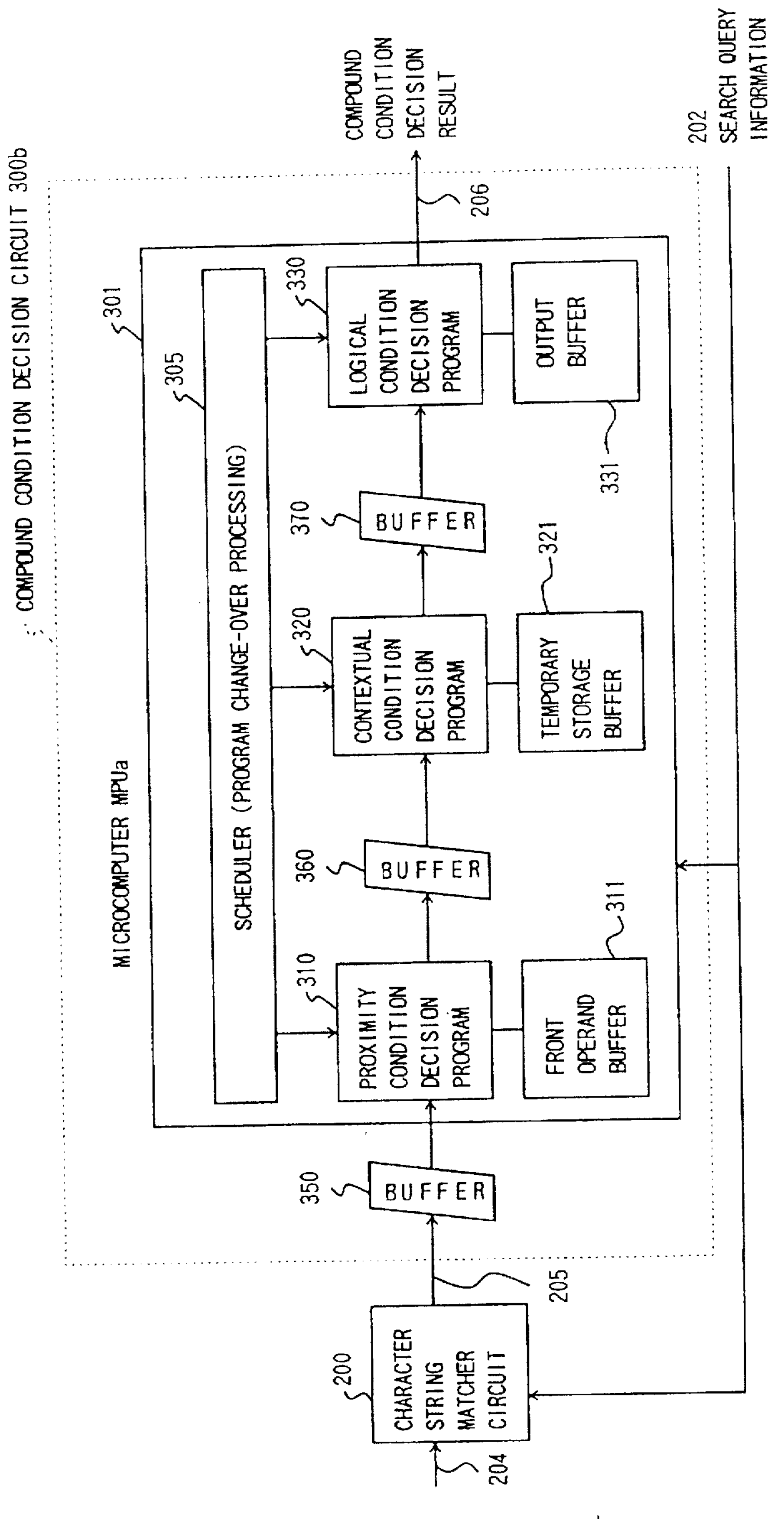
FIG. 29 is a block diagram showing a general arrangement of the document retrieval system according to a third embodiment of the invention.

Next, referring to FIG. 29, a third embodiment of the present invention will be described.

With the third embodiment, it is contemplated to run the three compound condition decision programs, including the proximity condition decision program 310, the contextual condition decision program 320 and the logical condition decision program 330, on a single microcomputer constituting a part of the compound condition decision circuit 300*b* to thereby sequentially execute these compound condition decision processing by changing them over correspondingly. Although the instant embodiment of the invention is inferior to the first embodiment in respect to the processing speed, the former can enjoy advantage of cost reduction because the compound condition decision processings can be executed with only one microcomputer.

The document retrieval system according to the instant embodiment includes the character string matcher circuit 200 and a compound condition decision circuit 300*b*, wherein the compound condition decision circuit 300*b* is constituted by a microcomputer MPUa301 and a buffer 350 provided for data transfer with the character string matcher circuit 200.

The microcomputer MPUa301 incorporates three compound condition decision programs including the proximity condition decision program 310, the contextual condition decision program 320 and the logical condition decision program 330 together with a scheduler 340 for changing over these programs. Buffers 360 and 370 are secured as work areas for the programs to be utilized as first-in/first-out (FIFO) memories, whereby similar functions as described hereinbefore in conjunction with the first embodiment can be realized.

The compound condition decision programs are changed over by the scheduler 340 in such a sequence in which the proximity condition decision program 310 is first executed, being then followed by execution of the contextual condition decision program 320 and then that of the logical condition decision program 330, upon completion of which execution of the proximity condition decision program 310 is regained. The timing for changing over these compound condition decision programs by the scheduler 340 may be selected such that the program change-over takes place every time n match result information or n documents have been processed. In that case, the program change-over timing should be determined by taking into account the time taken for the scheduler 340 to change over the programs as well. If the programs are changed over frequently, the time taken for the program change-over processing will occupy a large proportion relative to the time taken for execution of the compound condition decision programs. In practical applications, the program change-over should preferably be effected every time several hundred or several thousand match result information or alternatively several ten or several hundred documents have been processed.

Owing to the structure of the compound condition decision circuit 300*b* described above, there can be realized, inexpensively, the document retrieval system even at the expense of the processing speed when compared with that of the first embodiment, because the compound condition decision programs including the proximity condition decision program 310, the contextual condition decision program 320 and the logical condition decision program 330 can be executed by a single microcomputer.

Figure 30:
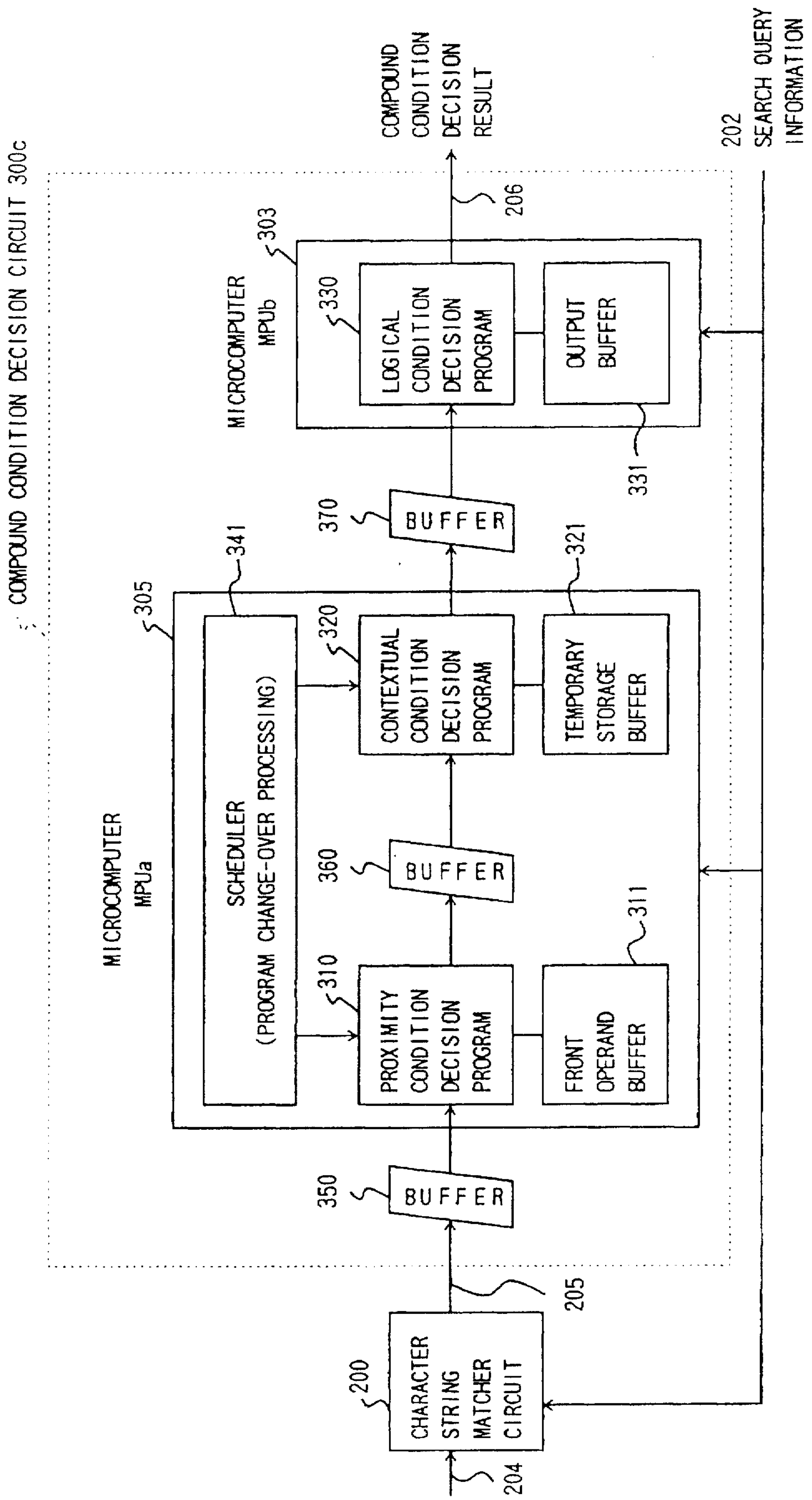
FIG. 30 is a block diagram showing a general arrangement of the document retrieval system according to a fourth embodiment of the invention.

Referring to FIG. 30, a fourth embodiment of the present invention will be described.

With the instant embodiment, it is contemplated to run the two compound condition decision programs including the proximity condition decision program 310 and the contextual condition decision program 320 on a single microcomputer constituting a part of the compound condition decision circuit 300*b* to thereby execute sequentially these compound condition decision processings by changing over them correspondingly. The logical condition decision program 330 is executed by another microcomputer MPUb303. Although the instant embodiment of the invention is inferior to the first embodiment in respect to the processing speed, the former can enjoy advantage of cost reduction because the compound condition decision processings can be executed with two microcomputers.

The document retrieval system according to the fourth embodiment includes the character string matcher circuit 200 and a compound condition decision circuit 300*c*, wherein the compound condition decision circuit 300*c* is constituted by microcomputers MPUa301 and MPUb303 and buffers 350 and 370 provided for data transfer with the character string matcher circuit 200.

The microcomputer MPUa301 incorporates two compound condition decision programs including the proximity condition decision program 310 and the contextual condition decision program 320 and a scheduler 341 for changing over these programs 310 and 320. A buffer 360 is secured as a work area for the programs to be utilized as a FIFO memory, whereby a similar function as described hereinbefore in conjunction with the first embodiment can be realized. The compound condition decision programs are changed over by the scheduler 341 in such a sequence in which the proximity condition decision program 310 is first executed, being then followed by execution of the contextual condition decision program 320, upon completion of which execution of the proximity condition decision program 310 is regained. The timing for changing over these compound condition decision programs by the scheduler 341 may be selected such that the program change-over takes place every time n match result information or n documents have been processed. In that case, the program change-over timing should be determined by taking into account the time taken for the scheduler 341 to change over the programs as well. If the programs are changed over frequently, the time taken for the program change-over processing will occupy a large proportion relative to the time taken for execution of the compound condition decision programs. In practical applications, the program change-over should preferably be effected every time several hundred or several thousand match result information or alternatively several ten or several hundred documents have been processed.

Owing to the structure of the compound condition decision circuit 300*c* described above, there can be realized, inexpensively, the document retrieval system even at the expense of the processing speed when compared with that of the first embodiment, because the compound condition decision programs including the proximity condition decision program 310, the contextual condition decision program 320 and the logical condition decision program 330 can be executed by two microcomputers.

Next, description will be made of a fifth embodiment of the invention by reference to FIG. 31.

In the case of the compound condition decision facility according to the fourth embodiment described above, it is noted that even when only one of the compound conditions is given, the pipeline processing must always be performed for the compound conditions by operating two microcomputers. With the fifth embodiment of the invention, it is contemplated to provide a compound condition decision circuit 300*d* which can enhance the efficiency of the compound condition decision processing by bypassing the condition decision program for which the decision condition is not designated in the given search query statement.

The document retrieval system according to the fifth embodiment of the invention is composed of the character string matcher circuit 200 and the compound condition decision circuit 300*d*, wherein the compound condition decision circuit 300*d* is constituted by microcomputers MPUa305 and MPUb303, buffers 350 and 370 for data transfer with the character string matcher circuit 200, multiplexers 391 and 392, and selectors 380 and 381.

The bypass function of the compound condition decision circuit provided according to the instant embodiment of the invention is to bypass the microprocessor on which the decision program corresponding to the condition not designated in the search query statement is to run, by controlling correspondingly the multiplexers and the selectors, to thereby allow only the program for the designated condition to be executed.

By way of example, it is assumed that the search query condition or statement "文書 [4C] 理解" is given. This means that only the proximity condition is of concern for the document retrieval. In this case, since only the proximity condition is valid, the match result information 205 output from the character string matcher circuit 200 is supplied to the proximity condition decision program 310 and the contextual condition decision program 320 via the buffer 350, whereon the match result information output from these programs is sent out directly as the compound condition decision result 206 via the buffer 370.

On the other hand, when there is given, for example, the search query statement "理解 [AND] システム", the match result information 205 output from the character string matcher circuit 200 is supplied directly to the logical condition decision program 330 by way of the buffer 350, and the match result information resulting from execution of this logical condition decision program 330 is sent out as the compound condition decision result 206.

Such compound condition bypass function as described above can be realized by correspondingly controlling the multiplexers 391 and 392 and the selectors 380 and 381. This control information is supplied as the search query information 202 from the search control circuit 101 shown in FIG. 8.

Through the multiplexer 391, the match result information 205 output from the character string matcher circuit 200 is supplied to the logical condition decision program 330 when a port a2 of the multiplexer 391 is enabled, while the information 205 from the character string matcher 200 is supplied to the proximity condition decision program 310 when a port b2 is enabled. Further, when a port c2 is selected, the match result information 205 is sent out as the output of the compound condition decision circuit 300*d*.

On the other hand, in the multiplexer 392, the output of the contextual condition decision program 320 is supplied to the logical condition decision program 330 when a port a3 of that multiplexer is selected, while when a port b3 is selected, the output of the contextual condition decision program 320 is sent out straightforwardly as the compound condition decision result 206.

The selector 380 serves for selection of the input to the logical condition decision program 330. More specifically, the selector 380 selects "X1", i.e. output 205 of the character string matcher circuit 200 when the port a2 of the multiplexer 391 is enabled, while the selector 380 selects "Y1", i.e. the output of the contextual condition decision program 320, when the port a3 of the multiplexer 392 is enabled.

The selector 381 serves for selecting the output to be sent out as the compound condition decision result 206. More specifically, the selector 381 selects "X2", i.e. the matching result 205 output from the character string matcher circuit 200 as the compound condition decision result 206, when the port c2 of the multiplexer 391 is selected, while the selector 381 selects "Y2", i.e. the output of the contextual condition decision program 320, when the port b3 of the multiplexer 392 is enabled. Otherwise, the selector 381 selects "Z2", i.e. the output of the logical condition decision program 330.

The setting of the selectors 380 and 381 described above is controlled in correspondence with the control of the multiplexers 391 and 392.

Selection of the multiplexers is enabled in dependence on the compound condition in a manner mentioned below:

(1) No compound condition: selection of only c2.

(2) Only logical condition: selection of only a2.

(3) Proximity and contextual conditions: selection of b2 and b3.

(4) Proximity, contextual and logical conditions: selection of b2 and a3.

As will be understood from the above description, by selectively connecting the proximity condition decision program 310, the contextual condition decision program 320 and the logical condition decision program 330 by using the multiplexers 391 and 392 together with the selectors 381 and 382 in dependence on the enabling information derived from the search query information 202 supplied from the search control circuit 101, there can be realized an increased efficiency of the compound condition decision processing when compared with the fourth embodiment because it is now unnecessary to consistently carry out the pipeline processing of the two compound condition decision programs notwithstanding of the fact that only one microprocessor is operated actually when no more than one of the compound conditions is given. Thus, there can be implemented a relatively high-speed document retrieval system at relatively low costs.

Figure 32:
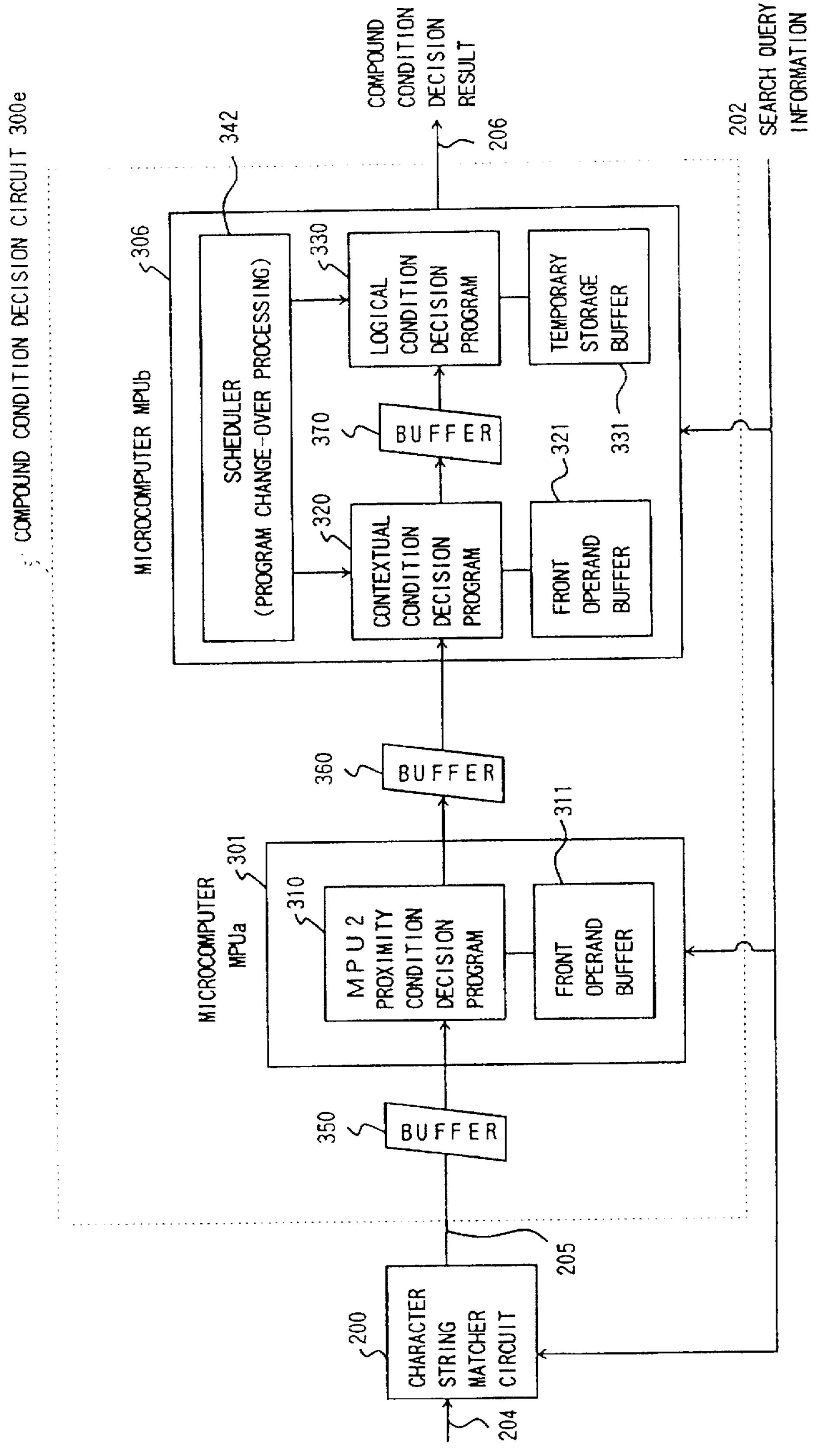
FIG. 32 is a block diagram showing a general arrangement of the document retrieval system according to a sixth embodiment of the invention.

Referring to FIG. 32, a sixth embodiment of the invention will be described.

With the instant embodiment, it is contemplated to run the two compound condition decision programs including the contextual condition decision program 320 and the logical condition decision program 330 on a single microcomputer constituting a part of a compound condition decision circuit 300*e* to thereby execute sequentially these compound condition decision processings by changing over them correspondingly. The proximity condition decision program 310 is executed by another microcomputer. Although the instant embodiment of the invention is inferior to the first embodiment in respect to the processing speed, it can enjoy the advantage of cost reduction because the compound condition decision processings can be executed with two microcomputers.

The document retrieval system according to the sixth embodiment includes the character string matcher circuit 200 and the compound condition decision circuit 300*e*, wherein the compound condition decision circuit 300*e* is constituted by microcomputers MPUa301 and MPUb306 and buffers 350 and 360 provided for data transfer with the character string matcher circuit 200.

The microcomputer MPUa301 incorporates two compound condition decision programs including the contextual condition decision program 320 and the logical condition decision program 330 and a scheduler 342 for changing over these programs 320 and 330. A buffer 370 is secured as a work area for the programs to be utilized as a FIFO memory, whereby similar function as described hereinbefore in conjunction with the first embodiment can be realized.

The compound condition decision programs are changed over by the scheduler 342 in such a sequence in which the contextual condition decision program 320 is first executed, being then followed by execution of the logical condition decision program 330, upon completion of which return is made to the execution of the contextual condition decision program 320. The timing for changing over these compound condition decision programs by the scheduler 342 may be selected such that the program change-over takes place every time n match result information or n documents have been processed. In that case, the program change-over timing should be determined by taking into account the time taken for the scheduler 341 to change over the programs as well. If the programs are changed over frequently, the time taken for the program change-over processing will occupy a large proportion relative to the time taken for execution of the compound condition decision programs. In practical applications, the program change-over should preferably be effected every time several hundred or several thousand match result information or alternatively several ten or several hundred documents have been processed.

Owing to the structure of the compound condition decision circuit 300*e* described above, there can be realized, inexpensively, a relatively high-speed document retrieval system although it is more or less inferior to the first embodiment in respect to the processing speed, because the compound condition decision programs including the proximity condition decision program 310, the contextual condition decision program 320 and the logical condition decision program 330 can be executed by using two microcomputers.

Figure 33:
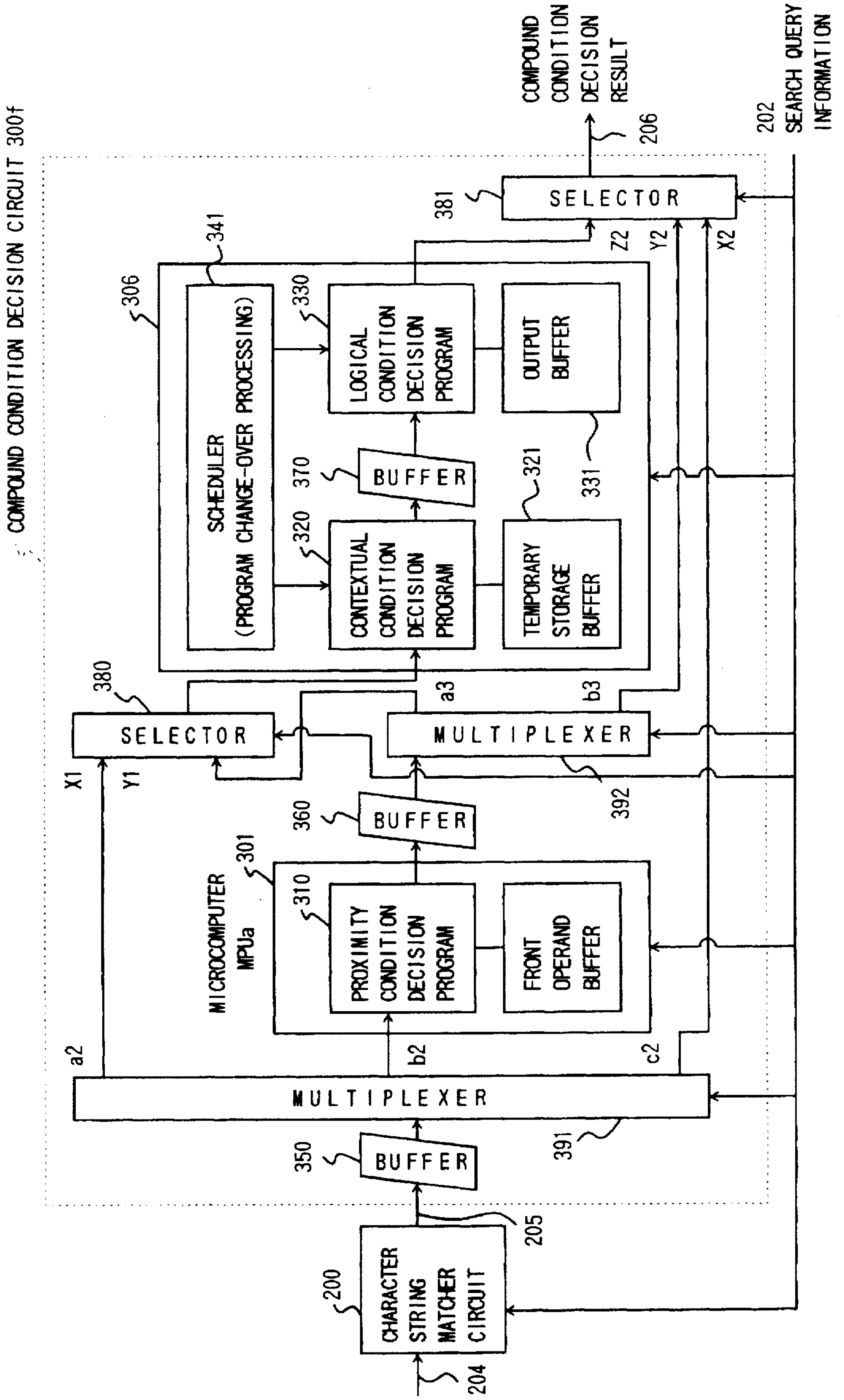
FIG. 33 is a block diagram showing a general arrangement of the document retrieval system according to a seventh embodiment of the invention.

Next, description will be made of a seventh embodiment of the invention by reference to FIG. 33.

In the case of the sixth embodiment described above, the pipeline processing must always be performed for the compound conditions by operating two microcomputers, even when only one of the compound conditions is given. With the seventh embodiment of the invention, it is intended to provide a compound condition decision circuit 300*f* which can enhance the efficiency of the compound condition decision processing by bypassing the condition decision program for which the decision condition is not designated in the given search query statement.

The document retrieval system according to the instant embodiment is composed of the character string matcher circuit 200 and the compound condition decision circuit 300*f*, wherein the compound condition decision circuit 300*f* is constituted by microcomputers MPUa301 and MPUb306, buffers 350 and 360 for data transfer with the character string matcher circuit 200, multiplexers 391 and 392, and selectors 380 and 381.

The bypass function of the compound condition decision circuit provided according to the instant embodiment is to bypass the microprocessor on which the decision program corresponding to the condition not designated in the search query statement is to run, by correspondingly controlling the multiplexers and the selectors, to thereby allow only the program for the designated condition to be executed.

By way of example, it is assumed that the search query statement "文書 [4C] 検索" is given. This means that only the proximity condition is of concern for the document retrieval. In this case, since only the proximity condition is valid, the match result information 205 output from the character string matcher circuit 200 is supplied to the proximity condition decision program 310 via the buffer 350, whereon the match result information output from these programs is sent out directly as the compound condition decision result 206 by way of the buffer 370.

On the other hand, when there is given, for example, the search query statement "検索 [AND] システム", this means that only the logical condition is of concern for document retrieval. Accordingly, the match result information 205 output from the character string matcher circuit 200 is supplied directly to the proximity condition decision program 310 by way of the buffer 350 and hence to the logical condition decision program 330 via the buffer 370. The match result information resulting from execution of this logical condition decision program 330 is sent out as the compound condition decision result 206.

Such compound condition bypass function as described above can be realized by correspondingly controlling the multiplexers 391 and 392 and the selector 380 and 381. The control information to this end is supplied as the search query information 202 from the search control circuit 101 shown in FIG. 8.

Through the multiplexer 391, the match result information 205 output from the character string matcher circuit 200 is supplied to the contextual condition decision program 320 when a port a2 of the multiplexer 391 is enabled, while the information 205 from the character string matcher 200 is supplied to the proximity condition decision program 310 when a port b2 is enabled. Further, when a port c2 is selected, the match result information 205 is sent out as the output of the compound condition decision circuit 300*f*.

On the other hand, in the multiplexer 392, the output of the proximity condition decision program 310 is supplied to the contextual condition decision program 320 when a port a3 of that multiplexer is selected, while when a port b3 is selected, the output of the proximity condition decision program 310 is sent out straightforwardly as the compound condition decision result 206.

The selector 380 serves for selection of the input to the contextual condition decision program 320. More specifically, the selector 380 selects "X1", i.e. output 205 of the character string matcher circuit 200, when the port a2 of the multiplexer 391 is enabled, while the selector 380 selects "Y1", i.e. the output of the proximity condition decision program 310, when the port a3 of the multiplexer 392 is enabled.

The selector 381 serves for selecting the output to be sent out as the compound condition decision result 206. More specifically, the selector 381 selects "X2", i.e. the matching result 205 output from the character string matcher circuit 200 as the compound condition decision result 206, when the port c2 of the multiplexer 391 is selected, while the selector 381 selects "Y2", i.e. the output of the proximity condition decision program 310, when the port b3 of the multiplexer 392 is enabled. Otherwise, the selector 381 selects "Z2", i.e. the output of the logical condition decision program 330.

The setting of the selectors 380 and 381 described above is controlled in correspondence with the control of the multiplexers 391 and 392. Selection of the multiplexers is enabled in dependence on the compound condition in a manner mentioned below:

(1) No compound condition: selection of only c2.

(2) Only proximity condition: selection of b2 and b3.

(3) Contextual and logical conditions: selection of only a2.

(4) Proximity, contextual and logical conditions: selection of b2 and a3.

As will be understood from the above description, by selectively connecting the proximity condition decision program 310, the contextual condition decision program 320 and the logical condition decision program 330 by using the multiplexers 391 and 392 together with the selectors 381 and 382 in dependence on the enabling information derived from the search query information 202 supplied from the search control circuit 101, there can be realized an enhanced efficiency of the compound condition decision processing when compared with the sixth embodiment because it is now unnecessary to consistently carry out the pipeline processing of the two compound condition decision programs notwithstanding of the fact that only one microprocessor is actually operated when no more than one of the compound conditions is given. Thus, there can be implemented a high-efficiency document retrieval system of relatively high processing speed at low costs.

Figure 34:
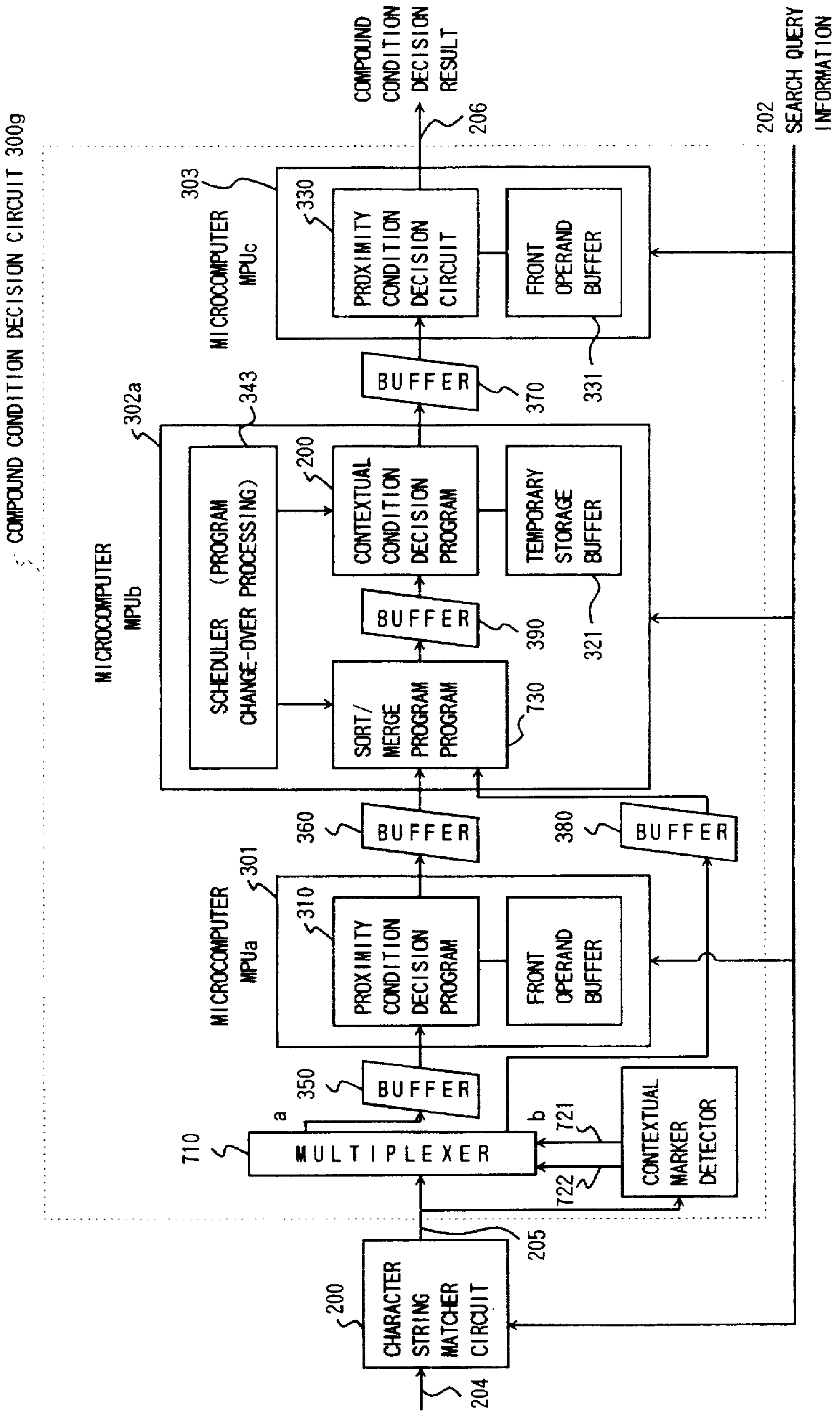
FIG. 34 is a block diagram showing a general arrangement of the document retrieval system according to an eighth embodiment of the invention.

Referring to FIG. 34, description will be turned to an eighth embodiment of the invention.

In the case of the document retrieval according to the first embodiment, the match result information output from the character string matcher circuit 200 contains the context identifying character string, i.e. the context marker which is not subject to the proximity condition decision processing. Consequently, the proximity condition decision program 310 will execute the proximity condition decision processing even for the match result information of the context marker, resulting in that the processing speed of the proximity condition decision is correspondingly lowered. The instant embodiment of the invention intends to solve this problem by providing a compound condition decision circuit 300*g* capable of performing the compound condition decision processing at a high speed by providing a buffer 380 destined for storing only the match result information of the context marker to thereby allow the context marker information to be supplied to the contextual condition decision processing program 320 which needs that information, while bypassing the proximity condition decision processing.

The document retrieval system according to the instant embodiment is composed of the character string matcher circuit 200 and a compound condition decision circuit 300*g*, wherein the compound condition decision circuit 300*g* is constituted by microcomputers MPUa301, MPUb302*a* and MPUc303, buffers 350, 360 and 370 serving for data transfer among these microcomputers, a multiplexer 710 and a context marker detector 720.

The multiplexer 710 usually selects the port a for supplying the match result information 205 originating in the character string matcher circuit 200 to the buffer 350 which serves for supplying the input information to the proximity condition decision program 310. Upon reception of a context marker detection signal 721 supplied from the context marker detector 720, as described hereinafter, a port b of the multiplexer 710 is enabled, whereby the context marker detection signal 721 is sent to the buffer 380 serving for input function to a sort/merge program 730, as will be described later on. Further, in response to a document ID information detection signal 722 supplied from the context marker detector 720, as described later, both ports a and b of the multiplexer 710 are selected, as a result of which the document ID information is supplied to both buffers 350 and 380, respectively.

The context marker detector 720 determines whether or not the output of the character string matcher circuit 200 is the match result information of the context marker. More specifically, the output match result information of the character string matcher circuit 200 is decided to be the match result information of the context marker, when the match result information identifier of the output match result information is same as the predetermined identifier of the context marker and when neither the start position information nor the end position information is "0" (zero). On the other hand, when both the start and end position information is "0" (zero), decision is made that the match result information outputted from the character string matcher circuit 200 is the document ID information.

The context marker detector 720 includes a comparator for detecting the document ID information, two comparators for identifying the match term information of the context marker, a register for storing the identifier of the context marker and a register for storing "0" (zero).

The document ID information detecting comparator checks whether or not the position information contained in the match result information is "0" (zero). When it is "0", the comparator outputs the document ID information detection signal 722. More specifically, the comparator compares the register storing "0" with the position information contained in the match result information to thereby output the document ID information detection signal 722, when the comparison results in coincidence.

On the other hand, for the comparison for identifying the match term information of the context marker, there are provided a comparator for checking the match term information identifier of the context marker and a comparator for determining whether or not the match result information being currently checked is the match term information. Only when coincidence signals are output from both the comparators mentioned just above, the context marker detection signal 721 is output. The comparator destined for making decision as to the match term information identifier of the context marker outputs the coincidence or validity (true) signal when the match result information identifier is identical with the context marker identifier, i.e. when the match result information identifier is found to be the same as the content of the context marker identifier storing register as the result of comparison. The comparator for checking the identity of the match term information outputs a validity (true) signal when the position information contained in the match result information is not "0", i.e. when the position information is found not to be identical with the content of the zero register as the result of comparison.

Structure of the context marker detector 720 will be understood from the above description.

When the match result information of the context marker is input to the context marker detector 720, the context marker detection signal 721 is outputted to the multiplexer 710. In response, the multiplexer changes over the destination or sink of the match result information 205 sent from the character string matcher circuit 200 to the buffer 380 from the buffer 350. If the match result information represents the document ID information, the document ID information detection signal 722 is output to the multiplexer 710. In this case, the multiplexer 710 selects both the buffers 350 and 380 as the sinks for the match result information 265 supplied from the character string matcher circuit 200.

The microcomputer MPUb302*a* is adapted to execute the sort/merge program 730, the contextual condition decision program 320 and a scheduler 342 for controlling these programs.

The sort/merge program 730 serves for merging the match result information output from the proximity condition decision program 310 and stored in the buffer 360 and the context marker information stored in the buffer 380 in the ascending order of the values of the end position information. More specifically, the sort/merge program 730 fetches one by one the match result information from the buffers 360 and 380, respectively, to compare the end position information. When the end position information of the match result information fetched from the buffer 360 is of a smaller value than that of the end position information fetched from the buffer 380, the match result information fetched from the buffer 360 is first output to the buffer 390. Thereafter, the match result information is fetched from the buffer 360 and compared with the match result information fetched from the buffer 380, whereon the match result information of a smaller value is output to the buffer 390. On the contrary, when the end position information of the match result information stored in the buffer 380 is of a smaller value than that of the match result information stored in the buffer 360, the match result information of the buffer 380 is output to the buffer 390, which is then followed by fetching the match result information from the buffer 350 for comparison with the match result information fetched previously from the buffer 360, whereby the match result information of a smaller value is output to the buffer 390. As to the document ID information, only the information fetched from the buffer 360 is output to the buffer 390 while the document ID information fetched from the buffer 380 is inhibited from being output to the buffer 390. It should be mentioned that the sort/merge processing is performed on a document-by-document basis.

As a result of the processings mentioned above, the match result information stored in the buffer 360 and 380 is sorted/merged through the medium of the end position information in the buffer 390, whereby the match result information similar to that output from the proximity condition decision program 310 in the document retrieval system according to the first embodiment is stored in the buffer 390.

The scheduler 343 changes over the programs in such sequence that the sort/merge program 730 is first executed, being followed by execution of the contextual condition decision program 320, whereupon return is made to the sort/merge program 730. The timing for changing over these programs by the scheduler 343 may be selected such that the program change-over take place every time n matching information or n documents have been processed.

In that case, the program change-over timing should be determined by taking into account the time taken for the scheduler 343 to change over the programs as well. If the programs are changed over frequently, the time taken for the program change-over processing will occupy a large proportion relative to the time taken for execution of the compound condition decision programs. In practical applications, the program change-over should preferably be effected every time several hundred or several thousand matching information or alternatively several ten or several hundred documents have been processed.

By implementing the compound condition decision circuit 300*g* in the manner described above, information of the context marker which is unnecessary for the proximity condition decision processing can bypass the processing performed by the proximity condition decision program 310, whereby there can be realized the document retrieval system capable of operating at a higher speed when compared with the system according to the first embodiment.

Figure 35:
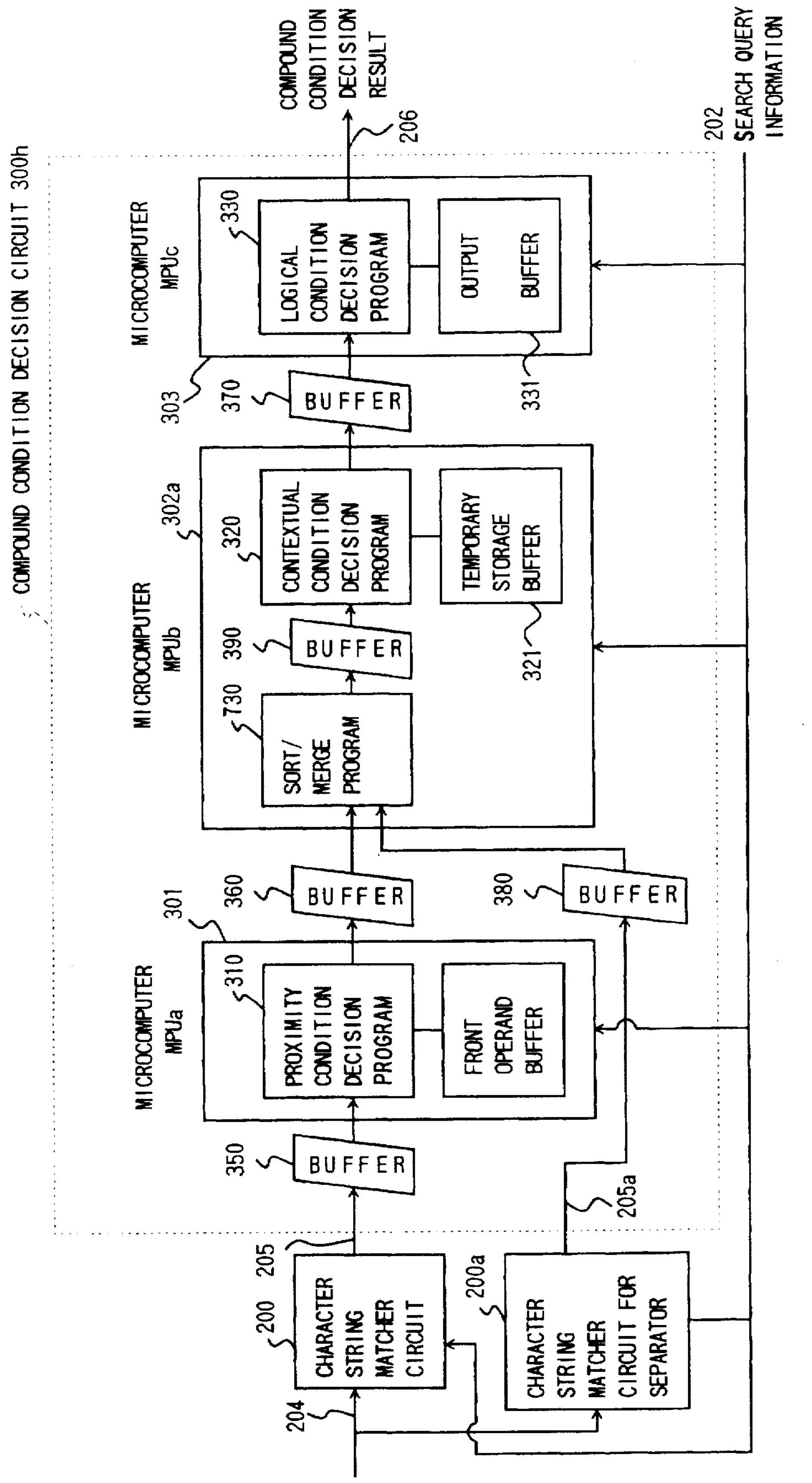
FIG. 35 is a block diagram showing a general arrangement of the document retrieval system according to a ninth embodiment of the invention.

Referring to FIG. 35, description will be made of a ninth embodiment of the invention.

As pointed out in conjunction with the eighth embodiment, the match result information output from the character string matcher circuit 200 contains the match result information of the context marker which is not subject to the proximity condition decision processing. Consequently, in the case of the document retrieval system according to the first embodiment, the proximity condition decision program 310 will execute the proximity condition decision processing even for the match result information of the context marker, resulting in that the processing speed of the proximity condition decision is correspondingly lowered. With the instant embodiment of the invention, it is intended to solve this problem by providing a compound condition decision circuit 300*h* capable of performing the compound condition decision processing at a high speed by providing a buffer destined for storing only the match result information of the context marker to thereby allow the context marker information to be supplied to the contextual condition decision processing program 320 which needs that information while bypassing the proximity condition decision processing.

The document retrieval system according to the instant embodiment differs from that of the eighth embodiment in that a context marker character string matcher circuit 200*a* dedicated for detection of the context marker is provided. In the case of the system according to the eighth embodiment, all the search terms inclusive of the context marker is loaded in the character string matcher circuit 200. Consequently, the character string matcher circuit 200 has to process a large number of search terms, possibly incurring such a situation that the number of the search terms input to the character string matcher circuit 200 exceeds the processing capability thereof. Besides, although it is sufficient to set only one search term for the context mark, it is repeatedly set every time the search query is given in the case of the eighth embodiment. This means that a lot of time is taken for creating and loading the search query information 202, to another problem.

The document retrieval system according to the instant embodiment is composed of a character string matcher circuit 200, a context marker-dedicated character string matcher circuit 200*a* and a compound condition decision circuit 300*h*.

The compound condition decision circuit 300*h* includes microcomputers MPUa301, MPUb302*a* and MPUc303, and buffers 350, 360, 370 and 380 for data transfers among the microcomputers.

The context marker dedicated character string matcher circuit 200 is of a similar structure as the character string matcher circuit 200, wherein the context marker is loaded as the search term in the context marker-dedicated character string matcher circuit 200*a*, while the search terms other than that for the context marker are loaded in the character string matcher circuit 200. Although the search control circuit 101 fetches the search query information 202 every time the search query condition is given to the character string matcher circuit 200, it is sufficient to load only once the search query information 202 for the context marker in the dedicated character string matcher circuit 200*a*.

Now, processing procedure in the instant embodiment will be described. In the first place, description is directed to operations of the character string matcher circuit 200 and the context marker dedicated character string matcher circuit 200*a* on the assumption that the query statement (7-1) is given, which reads:

"Q=((文書 [4C] 理解) [S] システム) [AND] (文書 [s] 検索)"

The above condition is analyzed by the search control circuit 101 to be decomposed into the individual query statements which are then supplied to the relevant compound condition decision programs, respectively.

In the case of the instant embodiment, four search terms "T1: 文書", "T2: 理解", "T3: 検索" and "T4: システム" are supplied to the character string circuit 200 from the search control circuit 101, whereas "S1: °" is loaded as the search term in the context marker-dedicated character string matcher circuit 200*a*.

Assuming now that the text (7-2) reading

"...文書理解を用いた検索システムである..."

is input, the match result information mentioned below is output to the buffer 350:

| | |
|---|---|
| (D1, 0, 0) | (13-1) |
| (T1, 31, 32) | (13-2) |
| (T2, 33, 34) | (13-3) |
| (T3, 39, 40) | (13-4) |
| (T4, 41, 44) | (13-5) |

On the other hand, output to the buffer 380 from the context marker-dedicated character string matcher circuit 200*a* as the match result information 205*a* of the context marker are those mentioned below:

| | |
|---|---|
| (D1, 0, 0) | (12-1) |
| (S1, 30, 30) | (12-2) |
| (S2, 48, 48) | (12-3) |

The match result information loaded in the buffers 360 and 380 as mentioned above are processed by the proximity condition decision program 310, the sort/merge program 730, the contextual condition decision program 320 and the logical condition decision program 330.

By providing the character string matcher circuit 200*a* dedicated for the context marker detection, as described above, the match result information of the context marker which is unnecessary for the proximity condition decision processing can be made to bypass the proximity condition decision program 310. Besides, the time taken for creating and loading the query information 202 for the context marker can be reduced when compared with the eighth embodiment. By virtue of these features, there can be realized the document retrieval system which can operate at a higher speed than the system according to the first embodiment.

Figure 36:
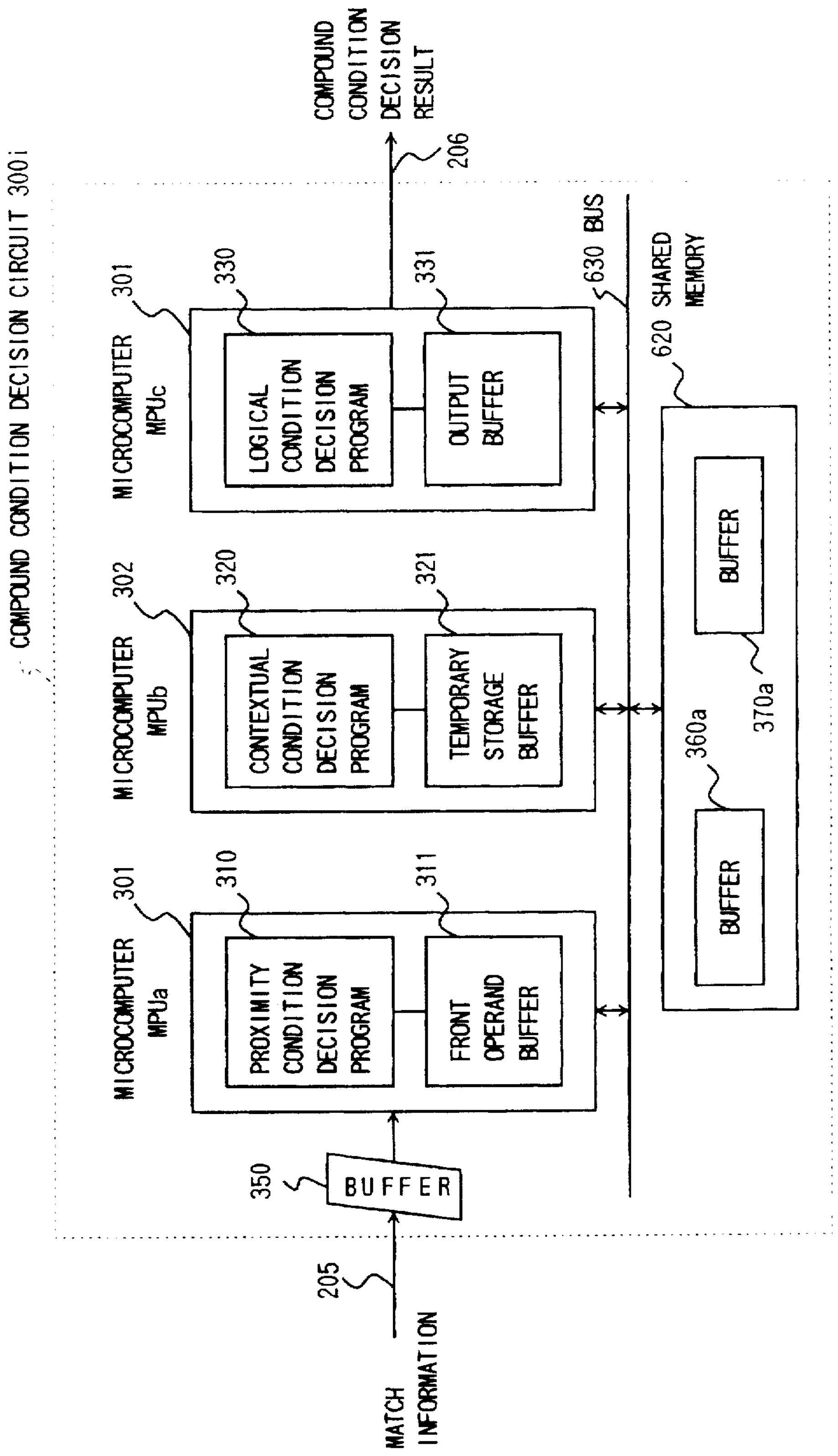
FIG. 36 is a block diagram showing a general arrangement of the document retrieval system according to a tenth embodiment of the invention.

Next, a tenth embodiment of the invention is described by reference to FIG. 36.

In the case of the compound condition decision circuit, 308 according to the first embodiment, the buffers 360 and 370 each constituted by a specific memory known as the first-in/first-out (FIFO) memory are used for the data transaction among the microcomputers MPUa301, MPUb302 and MPUc303. Consequently, cost per memory capacity will increase. With the instant embodiment, it is contemplated to realize more inexpensively the compound condition decision circuit (denoted by 300*i* in this instance) by using conventional memories for the buffers mentioned above in place of the FIFO memory.

The compound condition decision circuit 300*i* according to the instant embodiment includes microcomputers MPUa301, MPUb302 and MPUc303, a buffer 350, a bus 630 and a shared memory 620.

The microcomputer MPUa301 is destined to execute the proximity condition decision program 310, the microcomputer MPUb302 executes the contextual condition decision program 320, and the microcomputer NPUc303 executes the logical condition decision program 330.

The shared memory 620 is used for data transfer among the proximity condition decision program 310, the contextual condition decision program 320 and the logical condition decision program 330. More specifically, a buffer 360*a* implemented in the shared memory 620 is used for data transfer between the proximity condition decision program 310 and the contextual condition decision program 320, while a buffer 370*a* is used for data transfer between the contextual condition decision program 320 and a logical condition decision program 330. The buffers 360*a* and 370*a* can be imparted with the functions equivalent to those of the buffers 360 and 370 by using programwise the buffers 360*a* and 370*a* as the FIFO memory in execution of the proximity condition decision program 310, contextual condition decision program 320 and the logical condition decision program 330.

Now, operation of the compound condition decision processing according to the instant embodiment will be described.

The matching results of the character string matcher circuit 200 are sent to the buffer 350 as the match result information 205. The proximity condition decision program 310 processes the match result information stored in the buffer 350, the result of the processing being stored in the buffer 360*a* implemented in the shared memory 620, whereupon the contextual condition decision program 320 is executed, the result of which is stored in the buffer 370*a* incorporated in the shared memory 620. Further, upon storage of the match result information in the buffer 370*a*, the logical condition decision program 330 is executed, the result of which is sent out as the compound condition decision result 206.

By configuring the compound condition decision circuit 300*i* as described above, inexpensive conventional memory can be employed as the buffers 360*a* and 370*a* in place of the FIFO memory, whereby the document retrieval system can be realized more inexpensively.

Figure 37:
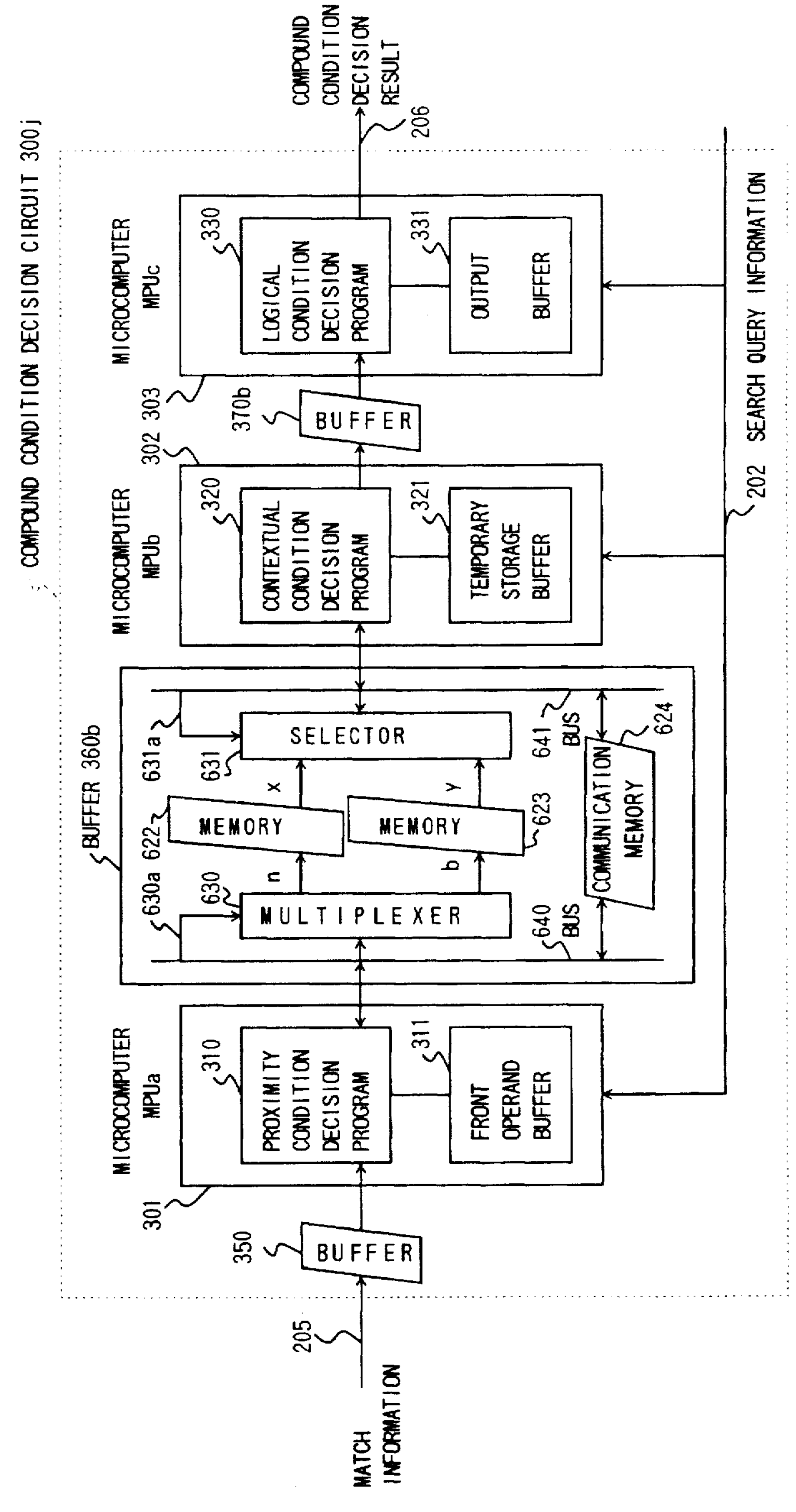
FIG. 37 is a block diagram showing a general arrangement of the document retrieval system according to a eleventh embodiment of the present invention.

Finally, an eleventh embodiment of the invention will be described by reference to FIG. 37.

In the case of the compound condition decision circuit 300 according to the first embodiment, the buffers 360 and 370 each constituted by a specific memory known as the first-in/first-out (FIFO) memory are used for the data transfer among the microcomputers MPUa301, MPUb302 and MPUc303. Consequently, cost per memory capacity will increase.

With the instant embodiment, it is contemplated to realize more inexpensively the compound condition decision circuit (denoted by 300*j* in this instance) by using a conventional memory for the buffers mentioned above in place of the FIFO memory. Further, in the case of the compound condition decision circuit according to the tenth embodiment, the shared memory 620 is accessed by three microcomputers on a time division basis. Accordingly, when the individual microcomputers each make access to the memory a same number of times, there may arise a problem that the memory access provides an obstacle in attaining a high processing speed, because the number of times the shared memory is accessed will become trebled. Under the circumstances, it is also contemplated with the instant embodiment of the invention to interpose two buffers each implemented by a conventional memory, respectively, between the microcomputers with a view to evading the abovementioned problem.

The compound condition decision circuit 300*j* according to the eleventh embodiment includes microcomputers MPUa301, MPUb302 and MPUc303 and buffers 350, 360*b* and 370*b*.

The microcomputer MPUa301 is allocated to execution of the proximity condition decision program 310, the microcomputer MPUb302 is allocated to execution of the contextual condition decision program 320, and the microcomputer MPUc303 is allocated to execution of the logical condition decision program 330.

The buffer 360*b* is used for data transfer between the proximity condition decision program 310 and the contextual condition decision program 320, while the buffer 370*b* is used for the data transfer between the contextual condition decision program 320 and the logical condition decision program 330.

The buffer 360*b* is constituted by a multiplexer 630, a selector 631, memories 622 and 623, buses 640 and 641 and a communication memory 624. The buffer 370 is implemented in a same configuration as the buffer 360*b*.

The memories 622 and 623 constituting the buffer 360*b* is used for transferring the match result information from the proximity condition decision program 310 to the contextual condition decision program 320. During a period in which the proximity condition decision program 310 outputs the match result information to the memory 622, the contextual condition decision program 320 fetches the match result information from the memory 623 which has previously been output from the proximity condition decision program 310. While the proximity condition decision program 310 is outputting the match result information to the memory 623, the contextual condition decision program 320 fetches the match result information from the memory 622 which has previously been output from the contextual condition decision program 320.

The communication memory 624 serves for transfer of control information used for changing over the buffer memories 622 and 623.

When a change-over signal 630*a* is set to "0", the multiplex 630 selects the port a, whereby the match result information output from the proximity condition decision program 310 is stored in the memory 622. On the other hand, when the change-over signal 630*a* is set to "1", the port b of the multiplexer 630 is selected, whereby the match result information output from the proximity condition decision program 310 is stored in the memory 623.

When a change-over signal 631*a* is set to "0", a port x of the selector 631 is enabled, allowing the contextual condition decision program 320 to read out the match result information from the memory 622. When the change-over signal 631*a* is set to "1", a port y of the selector 631 is enabled to allow the contextual condition decision program 320 to read out the match result information from the memory 622.

Description will be directed to a method of controlling the twin-memory buffer 360*b*.

At first, the proximity condition decision program 310 sends the change-over signal 630*a* of "0" to the multiplexer 630. Thus, the match result information output from the proximity condition decision program 310 is output to the memory 622.

When the proximity condition decision program 310 has written a predetermined amount of match result information, it sends to the contextual condition decision program 320 via the communication memory 624 a message that the memory 622 is now in the state ready for use. Upon reception of the message, the contextual condition decision program 320 sets to "0" the change-over signal 631*a* for the selector 631. Consequently, the memory 622 is selected from which the match result information is fetched by the contextual condition decision program 320 for carrying out the contextual condition decision processing.

Next, the proximity condition decision program 310 sets the change-over signal 630*a* to "1" which is then sent to the multiplexer 630. Consequently, the match result information output from the proximity condition decision program 310 is stored in a memory 623.

When the proximity condition decision program 310 has written a predetermined amount of the match result information in the memory 623, it sends to the contextual condition decision program 320, via the communication memory 624, a message of usability of the memory 623. Upon reception of this message, the contextual condition decision program 320 sets to "1" the change-over signal 631*a* to "1". Thus, the memory 623 from which the match result information is fetched by the contextual condition decision program 320 for carrying out the contextual condition decision processing is selected.

Thereafter, the proximity condition decision program 310 again sends to the multiplexer 630 the change-over signal 630*a* set to "0". At this time, the proximity condition decision program 310 cannot write the match result information in the memory 622 until the message of completion of reading the match result information from the memory 622 is sent from the contextual condition decision program 320. Accordingly, upon completion of reading the match result information from the memory 320, the contextual condition decision program 320 sends the corresponding message to the proximity condition decision program 310 via the communication memory 624.

By controlling the change-over of the buffer memories 622 and 623, the twin buffer arrangement in which the proximity condition decision program 310 and the contextual condition decision program 320 are inhibited from making access to a same memory can be realized.

The buffer 370*b* used for data transfer between the contextual condition decision program 320 and the logical condition decision program 330 can be implemented in a same configuration as the bùffer 360*b*.

Owing to the structure of the compound condition decision circuit **300*j* according to the eleventh embodiment in which the buffers 360*b* and 370*b*** are constituted by inexpensive conventional memories in place of the FIFO memories, there can be realized a high-speed document retrieval system at a reduced cost.

As will now be appreciated from the foregoing description of the illustrative embodiments, the document retrieval method and system according to the present invention can easily make decision as to satisfaction or dissatisfaction of the proximity condition, the contextual conditions and the logical condition which constitute the compound condition by themselves or in combination at an enhanced processing speed, to thereby allow a fine search or retrieval favorable to the full text search to be realized.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A scan-type document retrieval method for retrieving, from a document database storing respective document data in the form of character strings, a document which contains a plurality of search terms and which meets a search query condition required to exist among said plurality of search terms, said method comprising the steps of:

searching character strings from said document database on a respective document basis to determine whether or not character string match terms which match with said plurality of search terms, respectively, exist in said character strings, wherein when said match terms are found to exist in said character strings, match information including position information concerning positions of said match terms in a relevant document including said character strings is generated to be output on a respective document basis; and determining, on the basis of said position information in said output match information, whether or not a positional relation among said search terms as specified in said search query condition is met, wherein, only when said positional relation is met, identification information indicating satisfaction of said search query condition is added to said match information on a respective document basis, to thereby specify a relevant document which meets said search query condition imposed on said plurality of search terms.

2. A scan-type document retrieval method according to claim 1, wherein said search query condition comprises a proximity condition concerning a distance between said search terms, and said determining step includes a proximity condition decision step for deciding whether or not said match terms satisfy said proximity condition specified in said search query condition, wherein, only when said match terms satisfy said proximity condition, identification information indicating satisfaction of said proximity condition is added to said match information for the relevant document on a respective basis, to thereby specify the relevant document which satisfies the proximity condition imposed on said plurality of search terms.

3. A scan-type document retrieval method according to claim 1, wherein said search query condition comprises a concurrence condition specifying either of concurrence of said plurality of search terms in a same sentence and a set of contextualized characters, and said determining step includes a contextual condition decision step for deciding whether or not said match terms satisfy said concurrence condition specified in said search query condition, wherein, only when said concurrence condition is satisfied, identification information indicating satisfaction of said concurrence condition is added to said match information for the relevant document on a respective document basis, to thereby specify the relevant document which satisfies the concurrence condition imposed on said plurality of search terms.

4. A scan-type document retrieval method according to claim 1, wherein said search query condition comprises a logical condition imposed on said search terms, and said determining step includes a logical condition decision step for deciding whether or not said match terms satisfy the logical condition imposed on said search terms and specified in said search query condition, wherein, only when said logical condition is satisfied, identification information indicating satisfaction of said logical condition is added to said match information for the relevant document on a respective document basis, to thereby specify the relevant document which satisfies the logical condition imposed on said plurality of search terms.

5. A scan-type document retrieval method according to claim 1, wherein said search query condition comprises a proximity condition imposed on said search terms and a concurrence condition concerning concurrence of said search terms in a same sentence, and said determining step includes:

a proximity condition decision step for deciding whether or not said match terms satisfy said proximity condition specified in said search query condition, wherein, only when said match terms satisfy said proximity condition, identification information indicating satisfaction of said proximity condition is added to said match information for the relevant document on respective document basis, and a contextual condition decision step for deciding whether or not said match terms satisfy said concurrence condition specified in said search query condition, wherein, only when said concurrence condition is satisfied, identification information indicating satisfaction of said concurrence condition is added to said match information for the relevant document on a respective document basis.

6. A scan-type document retrieval method according to claim 1, wherein said search query condition comprises a concurrence condition specifying concurrence of said search terms in a same sentence and a logical condition imposed on said search terms, and said determining step includes:

a contextual condition decision step for deciding whether or not said match terms satisfy said concurrence condition specified in said search query condition, wherein, only when said concurrence condition is satisfied, identification information indicating satisfaction of said concurrence condition is added to said match information for the relevant document on a respective document basis, and a logical condition decision step for deciding whether or not said match terms satisfy the logical condition imposed on said search terms and specified in said search query condition, wherein, only when said logical condition is satisfied, identification information indicating satisfaction of said logical condition is added to said match information for the relevant document on a respective document basis.

7. A scan-type document retrieval method according to claim 1, wherein said search query condition comprises a proximity condition imposed on said search terms, and said determining step includes:

a proximity condition decision step for deciding whether or not said match terms satisfy said proximity condition specified in said search query condition, wherein, only when said match terms satisfy said proximity condition, identification information indicating satisfaction of said proximity condition is added to said match information for the relevant document on a respective document basis, and a logical condition decision step for deciding whether or not said match terms satisfy the logical condition imposed on said search terms and specified in said search query condition, wherein, only when said logical condition is satisfied, identification information indicating satisfaction of said logical condition is added to said match information for the relevant document on a respective document basis.

8. A scan-type document retrieval method according to claim 1, wherein said search query condition comprises a proximity condition imposed on said plurality of search terms, a concurrence condition concerning concurrence of said plurality of search terms in a same sentence, and a logical condition among said plurality of search terms, and said determining step includes:

a proximity condition decision step for deciding whether or not said match terms satisfy said proximity condition specified in said search query condition, wherein, only when said match terms satisfy said proximity condition, identification information indicating satisfaction of said proximity condition is added to said match information for the relevant document on a respective document basis, a contextual condition decision step for deciding whether or not said match terms satisfy said concurrence condition specified in said search query condition, wherein, only when said concurrence condition is satisfied, identification information indicating satisfaction of said concurrence condition is added to said match information for the relevant document on a respective document basis, and a logical condition decision step for deciding whether or not said match terms satisfy said logical condition imposed on said search terms and specified in said search query condition, wherein, only when said logical condition is satisfied, identification information indicating satisfaction of said logical condition is added to said match information for the relevant document on a respective document basis.

9. A scan-type document retrieval method according to claim 2, wherein said database includes documents written in Japanese, and wherein, further, in said proximity condition decision step, said proximity decision is made based on a proximity condition designated in terms of a number of characters existing between said search terms specified in said search query condition.

10. A scan-type document retrieval method according to claim 2, wherein said database includes documents written in a European language, and wherein, further, in said proximity condition decision step, said proximity decision is made based on a proximity condition designated in terms of a number of words existing between said search terms specified in said search query condition.

11. A scan-type document retrieval method according to claim 5, wherein said database includes documents written in Japanese, and wherein, further, in said proximity condition decision step, said proximity decision is made based on a proximity condition designated in terms of a number of characters existing between said search terms specified in said search query condition.

12. A scan-type document retrieval method according to claim 5, wherein said database includes documents written in a European language, and wherein, further, in said proximity condition decision step, said proximity decision is made based on a proximity condition designated in terms of a number of words existing between said search terms specified in said search query condition.

13. A scan-type document retrieval method according to claim 7, wherein said database including documents written in Japanese, and wherein, further, in said proximity condition decision step, said proximity decision is made based on a proximity condition designated in terms of a number of characters existing between said search terms specified in said search query condition.

14. A scan-type document retrieval method according to claim 7, wherein said database including documents written in a European language, and wherein, further, in said proximity condition decision step, said proximity decision is made based on a proximity condition designated in terms of a number of words existing between said search terms specified in said search query condition.

15. A scan-type document retrieval method according to claim 8, wherein said database including documents written in Japanese, and wherein, further, in said proximity condition decision step, said proximity decision is made based on a proximity condition designated in terms of a number of characters existing between said search terms specified in said search query condition.

16. A scan-type document retrieval method according to claim 8, wherein said database including documents written in a European language, and wherein, further, in said proximity condition decision step, said proximity decision is made based on a proximity condition designated in terms of a number of words existing between said search terms specified in said search query condition.

17. A scan-type document retrieval method according to claim 8, wherein, in said searching step, start character positions and end character positions of said match terms indicate the position information of said match terms, identifiers of sentence identifying character strings including start and end positions of a sentence designated by said contextual condition as well as start character positions of said sentence identifying character strings in the relevant document and end character positions of said sentence identifying character strings in the relevant document indicate sentence identifying character string identification information, and said match information including both of said position information and said sentence identifying character string identification information is generated on a respective document basis;

wherein, in said proximity condition decision step, a decision is made as to whether or not said match terms satisfy the distance condition imposed on the search terms as specified in said search query condition, and, only when said distance condition is satisfied, identification information indicating satisfaction of said distance condition and including an identifier corresponding to said proximity condition as well as start character position information of a start character of the match term corresponding to a leading one of said search terms designated by said proximity condition and end character position information of an end character of the match term corresponding to a trailing one of said search terms are added to said match information on a respective document basis, resultant match information being output to said contextual condition decision step;

wherein in said contextual condition decision step, a decision is made as to whether or not the match terms contained in said match information input from said proximity condition decision step on a respective document basis satisfy the condition for concurrence of said search terms designated in said search query condition in a same sentence, and, only when said match terms satisfy said concurrence condition, identification information indicating satisfaction of said concurrence condition and including an identifier corresponding to said sentence as well as information of position of a start character of a sentence identifying character string located at the start of said sentence and information of position of an end character located at the end of said sentence are added to said match information input from said proximity condition decision step on a respective document basis, resultant match information being output to said logical condition decision step; and wherein in said logical condition decision step, a decision is made as to whether or not the logical condition imposed on said search terms and specified in said search query condition is satisfied by the match terms contained in said match information input from said contextual condition decision step, and, only when said logical condition is satisfied, identification information indicating satisfaction of said logical condition and including an identifier corresponding to said logical condition as well as information of a start character position and an end character position of the relevant document is added to the match information input from said contextual condition decision step on a respective document basis.

18. A scan-type document retrieval method according to claim 8, wherein in said searching step, start word positions and end word positions of said match terms are detected as the position information of said match terms, while identifiers of sentence identifying character strings which indicate start and end positions of a sentence designated by said contextual condition as well as start word positions of said sentence identifying character strings in the relevant document and end word positions of said sentence identifying character strings in the relevant document are detected as sentence identifying character string identification information, and said match information including both of said position information and said sentence identifying character string identification information is generated on a respective document basis;

wherein, in said proximity condition decision step, a decision is made as to whether or not said match terms satisfy the distance condition imposed on the search terms as specified in said search query condition, and only when said distance condition is satisfied, identification information indicating satisfaction of said distance condition and including an identifier corresponding to said proximity condition as well as start word position information of a start word of the match term corresponding to a leading one of said search terms designated by said proximity condition and end word position information of an end word of the match term corresponding to a trailing one of said search terms are added to said match information on a respective document basis, resultant match information being output to said contextual condition decision step;

wherein, in said contextual condition decision step, a decision is made as to whether or not the match terms contained in said match information input from said proximity condition decision step on a respective document basis satisfy the condition for concurrence of said search terms designated in said search query condition in a same sentence, and only when said match terms satisfy said concurrence condition, identification information indicating satisfaction of said concurrence condition and including an identifier corresponding to said sentence as well as information of position of a start word of a sentence identifying character string located at the start of said sentence and information of position of an end word located at the end of said sentence are added to said match information input from said proximity condition decision step on a respective document basis, resultant match information being output to said logical condition decision step; and wherein, in said logical condition decision step, a decision is made as to whether or not the logical condition imposed on said search terms and specified in said search query condition is satisfied by the match terms contained in said match information input from said contextual condition decision step, and, only when said logical condition is satisfied, identification information indicating satisfaction of said logical condition and including an identifier corresponding to said logical condition as well as information of a start word position and an end word position of the relevant document is added to the match information input from said contextual condition decision step on a respective document basis.

19. A scan-type document retrieval method according to claim 2, wherein in said proximity condition decision step, identification information including identifiers corresponding to the match terms specified in said search query condition and match term position information of positions of said match terms in said document are sequentially fetched from the match information output from said searching step on a respective document basis;

said match term position information being sequentially collated with the match terms each corresponding to a leading one of said search terms for each of the match terms corresponding to the trailing search term; and wherein identification information including the position information of the match term corresponding to said leading search term and the position information of the match term corresponding to said trailing search term, both of said match terms satisfying said distance condition imposed on said search terms, is added to said match information output from said character string matching step as information representing a result of the decision concerning said proximity condition.

20. A scan-type document retrieval method according to claim 3, wherein in said searching step, start character positions and end character positions of said match terms indicate match position information of said match terms, and sentence identifying character string identification information comprising identifiers of sentence identifying character strings indicating start and end of a sentence designated by said contextual condition as well as start character positions and end character positions of said sentence identifying character strings in the relevant document is generated, said sentence identifying character string identification information, said match position information and match term identification information including identifiers of the match terms corresponding to said search terms designated in said search query condition as well as positions of said match terms in said relevant document being sequentially output as the match information from said character string match step on a respective document basis; and wherein, in said contextual condition decision step, the match term identifiers and the match position information which satisfy said contextual condition are taken out from said match information output from said character string match step, to thereby screen the match term identifiers and the match position information which correspond to the search terms designated by said contextual condition, wherein identification information including the match position information of said sentence identifying character string indicating the start of the sentence satisfying said contextual condition and the match position information of the sentence identifying character string indicating end of said sentence are added to said match information as a result of said contextual condition decision on a respective document basis.

21. A scan-type document retrieval method according to claim 4, wherein, in said searching step, start character positions and end character positions of said match terms indicate match position information of said match terms, and sentence identifying character string identification information comprising identifiers of sentence identifying character strings indicating start and end of a sentence designated by said contextual condition as well as start character positions and end character positions of said sentence identifying character strings in the relevant document is generated, said sentence identifying character string identification information, said match position information and match term identification information including identifiers of the match terms corresponding to said search terms designated in said search query condition as well as positions of said match terms in said relevant document being sequentially output as the match information from said searching step on a respective document basis, wherein in said logical condition decision step, the match term identifiers and the match position information which satisfy said logical condition are taken out from said match information output from said searching step, to thereby screen the match term identifiers and the match position information which correspond to the search terms designated by said logical condition, and wherein identification information including the match position information of said sentence identifying character string indicating the start of the sentence satisfying said contextual condition and the match position information of the sentence identifying character string indicating end of said sentence are added to said match information as a result of said contextual condition decision on a respective document basis.

22. A scan-type document retrieval method for retrieving, from a document database storing document data in the form of character strings on a document-by-document basis, of a document which contains a plurality of search terms and which meets a search query condition required to exist among said plurality of search terms, said method comprising:

searching character strings from said document database on a respective document basis and determining whether character strings match terms match with said plurality of search terms, respectively, from said character strings as input, wherein when said match terms are found to exist, match information including match term identification information containing identifiers of the match terms and position information concerning position of said match terms in a relevant document as well as document identification information identifying document containing said match terms, is generated on a respective document basis.

23. A scan-type document retrieval system for retrieving, from a document database storing document data in the form of character strings on a respective document basis, a document which contains a plurality of search terms and which meets a search query condition required to exist among said plurality of search terms, said system comprising:

character string matching means for searching character strings from said document database on a respective document basis and determining whether or not character strings as match terms which match with said plurality of search terms, respectively, exist in said character strings, wherein when said match terms are found to exist, match information including position information concerning positions of said match terms in the relevant document is generated on a respective document basis; and a compound condition decision step for deciding, based on said position information, whether or not a positional relation among said search terms as specified in said search query condition is met, wherein, only when said positional relation is met, identification information indicating satisfaction of said search query condition is added to said match information on a respective document basis, to thereby specify a relevant document which meets said search query condition imposed on said plurality of search terms.

24. A scan-type document retrieval system according to claim 23, wherein said search query condition comprises a proximity condition concerning a distance between said search terms, and said compound condition decision means includes:

proximity condition decision means for deciding whether or not said match terms satisfy said proximity condition specified in said search query condition, wherein, only when said match terms satisfy said proximity condition, identification information indicating satisfaction of said proximity condition is added to said match information for the relevant document on a respective document basis, to thereby specify the relevant document which satisfies the proximity condition imposed on said plurality of search terms.

25. A scan-type document retrieval system according to claim 23, wherein said search query condition comprises a concurrence condition specifying either of concurrence of said plurality of search terms in a same sentence and a set of contextualized character strings, and said compound condition decision means includes contextual condition decision means for deciding whether or not said match terms satisfy said concurrence condition specified in said search query condition, wherein, only when said concurrence condition is satisfied, identification information indicating satisfaction of said concurrence condition is added to said match information for the relevant document on a respective document basis, to thereby specify the relevant document which satisfies the concurrence condition imposed on said plurality of search terms.

26. A scan-type document retrieval system according to claim 23, wherein said search query condition comprises a logical condition imposed on said search terms, and said compound condition decision means includes logical condition decision means for deciding whether or not said match terms satisfy the logical condition imposed on said search terms and specified in said search query condition, wherein, only when said logical condition is satisfied, identification information indicating satisfaction of said logical condition is added to said match information for the relevant document on a respective document basis, to thereby specify the relevant document which satisfies the logical condition imposed on said plurality of search terms.

27. A scan-type document retrieval system according to claim 23, wherein said search query condition comprises a proximity condition imposed on said search terms and a concurrence condition regarding concurrence of said search terms in a same sentence, and said compound condition decision means includes:

proximity condition decision means for deciding whether or not said match terms satisfy said proximity condition specified in said search query condition, wherein, only when said match terms satisfy said proximity condition, identification information indicating satisfaction of said proximity condition is added to said match information for the relevant document on a respective document basis; and contextual condition decision means for deciding whether or not said match terms satisfy said concurrence condition specified in said search query condition, wherein, only when said concurrence condition is satisfied, identification information indicating satisfaction of said concurrence condition is added to said match information for the relevant document on a respective document basis.

28. A scan-type document retrieval system according to claim 23, wherein said search query condition comprises a concurrence condition specifying concurrence of said search terms in a same sentence and a logical condition imposed on said search terms, and said compound condition decision means includes:

contextual condition decision means for deciding whether or not said match terms satisfy said concurrence condition specified in said search query condition, wherein, only when said concurrence condition is satisfied, identification information indicating satisfaction of said concurrence condition is added to said match information for the relevant document on a respective document basis; and logical condition decision means for deciding whether or not said match terms satisfy the logical condition imposed on said search terms and specified in said search query condition, wherein, only when said logical condition is satisfied, identification information indication satisfaction of said logical condition is added to said match information for the relevant document on a respective document basis.

29. A scan-type document retrieval system according to claim 23, wherein said search query condition comprises a proximity condition imposed on said search terms, and said compound condition decision means includes:

proximity condition decision means for deciding whether or not said match terms satisfy said proximity condition specified in said search query condition, wherein, only when said match terms satisfy said proximity condition, identification information indicating satisfaction of said proximity condition is added to said match information for the relevant document on a respective document basis; and logical condition means for deciding whether or not said match terms satisfy the logical condition whether or not said match terms satisfy the logical condition imposed on said search terms and specified in said search query condition, wherein, only when said logical condition is satisfied, identification information indicating satisfaction of said logical condition is added to said match information for the relevant document on a document-by-document basis.

30. A scan-type document retrieval system according to claim 23, wherein said search query condition comprises a proximity condition imposed on said plurality of search terms, an occurrence condition concerning concurrence of said plurality of search terms in a same sentence, and a logical condition among said plurality of search items, and said compound condition decision means includes:

proximity condition decision means for deciding whether or not said match terms satisfy said proximity condition specified in said search query condition, wherein, only when said match terms satisfy said proximity condition, identification information indicating satisfaction of said proximity condition is added to said match information for the relevant document on a respective document basis;

contextual condition decision means for deciding whether or not said match terms satisfy said concurrence condition specified in said search query condition, wherein, only when said concurrence condition is satisfied, identification information indicating satisfaction of said concurrence condition is added to said match information for the relevant document on a respective document basis; and logical condition decision means for deciding whether or not said match terms satisfy said logical condition imposed on said search terms and specified in said search query condition, wherein, only when said logical condition is satisfied, identification information indicating satisfaction of said logical condition is added to said match information for the relevant document on a respective document basis.

31. A scan-type document retrieval system according to claim 24, wherein said database includes documents written in Japanese, and wherein, further, said proximity condition decision means makes said proximity condition decision based on a proximity condition designated in terms of a number of characters existing between said search terms specified in said search query condition.

32. A scan-type document retrieval system according to claim 24, wherein said database includes documents written in a European language, and wherein, further, said proximity condition decision means makes said proximity condition decision based on a proximity condition designated in terms of a number of words existing between said search terms specified in said search query condition.

33. A scan-type document retrieval system according to claim 27, wherein said database includes documents written in Japanese, and wherein, further, said proximity condition decision means makes said proximity condition decision based on a proximity condition designated in terms of a number of characters existing between said search terms specified in said search query condition.

34. A scan-type document retrieval system according to claim 27, wherein said database includes documents written in a European language, and wherein, further, said proximity condition decision means makes said proximity condition decision based on a proximity condition designated in terms of a number of words existing between said search terms specified in said search query condition.

35. A scan-type document retrieval system according to claim 29, wherein said database includes documents written in Japanese, and wherein, further, said proximity condition decision means makes said proximity condition decision based on a proximity condition designated in terms of a number of characters existing between said search terms specified in said search query condition.

36. A scan-type document retrieval system according to claim 29, wherein said database includes documents written in a European language, and wherein, further, said proximity condition decision means makes said proximity condition decision based on a proximity condition designated in terms of a number of words existing between said search terms specified in said search query condition.

37. A scan-type document retrieval system according to claim 30, wherein said database includes documents written in Japanese, and wherein, further, said proximity condition decision means makes said proximity condition decision based on a proximity condition designated in terms of a number of characters existing between said search terms specified in said search query condition.

38. A scan-type document retrieval system according to claim 30, wherein said database includes documents written in a European language, and wherein, further, said proximity condition decision means makes said proximity condition decision based on a proximity condition designated in terms of a number of words existing between said search terms specified in said search query condition.

39. A scan type document retrieval method according to claim 8, further comprising the steps of:

a text registering step for storing in the data base while setting a text identifier at a specified position of an objective text for identifying the text and storing the number of characters of the objective text in the data base;

search query condition statement analyzing step for analyzing said search query condition statement and transferring to a character string collating step, including the steps of:

analyzing said search query condition statement, extracting the search term included in said search query condition statement and combining said search term with its corresponding search term identifier and transmitting to a proximity condition decision step, extracting said proximity condition when the proximity condition is included in said search query condition statement and combining said proximity condition with its corresponding proximity identifier and transferring to a contextual condition decision step, combining a number of search query term designated in said contextual condition with its corresponding contextual identifier when it is included in the search query condition statement, combining a start context identifying character string indicating the start of context assigned in said contextual condition with an end context identifying character string and transferring to character string collating step as a search term, converting said logical statement composed by connected assigned search query term by an OR operator into a logical statement item combined with an AND operator when said logical conditions are included in said search query condition statement and preparing a number for each item of said search query term which is provided with a NOT operator with a logical condition identifier for identifying said logical condition and transferring to logical condition decision step, and reading out the number of characters of the text stored in said text data base and transferring to logical condition collating information generating step;

wherein, in said character string matching step, start character position and end character positions of said match terms indicate the position information of said match terms, and said character string matching step includes the following steps:

a character code string reading step for reading character code string at each text from said text data base and transferring to character collating means;

a character string collating step for judging whether a character code string collating word coincides with the search query term transferred from said search condition analyzing step in the character code string of text, and if the coincided collating word does exist, preparing the transmitting search query term identifier of the search query term corresponding to said decision word and a start character position of the start word of the collating word in the text and an end character position of end character extracting text identifier assigned to the specific position of the text, and transferring to collating information generation step;

a collating information generating step for generating text discriminating information including said text identifier when said text identifier is sent from said character string collating step, including the steps of:

generating collating word identifying information including said collating word identifier and start character position and end character position when said collating word identifier and said start character position and said end character position is input from said character position collating step as an information concerned with said collating word, and preparing said text identifying information and collating word identifying information at each text to a proximity condition decision information reading step and transferring to a proximity condition collating information reading means;

a proximity condition decision reading step for sequentially reading said decision information at each text and transmitting to contextual condition decision step and contextual condition decision result generation step;

a proximity condition decision step for comparing the start character position of the collating word corresponding search query term positioned after the proximity condition when decision information is concerned with the search query term positioned after the proximity condition sent from search query condition analyzing step and end character position of collating word read from said collating information generating means corresponding search query term positioned in front of said proximity condition in the collating information to determine whether there is coincidence thereof with said proximity condition, and if it is judged that there is coincidence with said proximity condition, preparing the proximity condition identifier indicating said proximity condition and start character position of said collating word corresponding to search query term positioned in front of said proximity condition and end character position of said collating term corresponding to the search query term positioned after said proximity condition and transferring to proximity condition decision result generating step;

a proximity condition judgement result generation step for generating collating information including the proximity condition identifier and the start character position and the end character position when said proximity condition identifier and start character position of the collating word corresponding to the search query word positioned before the proximity condition and the end character position of the collating word corresponds to the search query term positioned after the proximity condition, when transferred from said proximity condition decision step and preparing as collating information of a proximity condition judgement result to contextual condition collating information reading step while being added with said collating information, and transferring to contextual condition collating information reading step;

a contextual condition collating information reading step for sequentially reading collating information of each text from said proximity condition decision result generation step, and transferring to contextual condition decision result generation step;

a contextual condition judgement step for counting the kinds of collation word that correspond to the search term designated in said contextual condition when said collating information which is concerned with collating word corresponds to the start contextual identifying character string of context designated by said contextual condition, including the steps of:

counting the kinds of collating word that correspond to the search term designated in said contextual condition when said collating information which is concerned with collating word corresponds to search term designated in said contextual condition, judging coincidence of the contextual condition by judging whether the number of search terms designated in said contextual condition is equal to the count value of the kinds of said collating word when said collating information is concerned with the collating word corresponding to the end context discriminating character string of said context designated in said contextual condition, and when coincidence of contextual condition has been judged, combining said contextual condition identifier expressing said contextual condition and start character position of said collating word corresponding to the start contextual discriminating character string of said context and end character position of the collating word corresponding to the end context discriminating character string, and transferring to contextual condition decision result generation step;

a contextual condition judgement result generating step, including the steps of:

generating collating information including said contextual condition identifier and said start character position and said end character position when said contextual condition identifier and said start character position and said end character position are transferred from said contextual condition decision step, and combining with said collating information, and transferring to logical condition collating information reading step as the result of collating information of contextual condition decision for each text;

a logical condition collating information reading step for sequentially reading said collating information for each text transferred from contextual condition judgement result generation step, and transferring to a logical condition decision step and to a logical condition decision result generation step;

generating step for carrying out count processing to count the kinds of search terms at each item, including search terms corresponding to said collating word when said collating information is concerned with collating words corresponding to search terms designated in said logical condition, including the steps of:

subtracting one count value of said kind of search term corresponding to said item when the NOT operand is added to the search term corresponding to said collating term included in said item in said logical condition from the value of kind of each said item of said search term added with said NOT operand, and increasing one count number of said kind of search term corresponds to said item when said NOT operand is not added, when said collating information is concerned with said text discriminating information, judging whether said logical condition is established by judging whether the count value of said kind of search term which corresponds to said item assigned with said NOT operand in said logical condition of more than 1 or judging whether the count value of said kind of search term which corresponds to said item not assigned with said NOT operand in said logical condition is 0 exists, and when said logical condition is judged to be established, generating the logical condition identifier indicating said logical condition, and transferring to logical condition decision result generation step; and a logical condition decision result generation step for generating collating information, when the logical condition identifier identifying said logical condition from said logical condition decision steps, including said logical condition identifier, character position of start character of a predetermined text, and character position of end character of said text indicated by added value of said logical condition identifier and character position of start character of a predetermined text, length of said text and said character position of said start word, and further adding collating information to generate the collating information as the result of logical condition decision at each text.

* * * * *